US007062576B2

(12) United States Patent
Ohmura et al.

(10) Patent No.: US 7,062,576 B2
(45) Date of Patent: *Jun. 13, 2006

(54) DIGITAL CAMERA HAVING IMAGING PORTION, FIRST TERMINAL, AND SECOND TERMINAL FOR OUTPUTTING SIGNALS BASED ON IMAGE DATA IN ACCORDANCE WITH SAME DATA COMMUNICATION INTERFACE STANDARD

(75) Inventors: Akira Ohmura, Tokyo (JP); Tetsushi Nomoto, Tokyo (JP); Yukinobu Ishino, Tokyo (JP); Masahide Tanaka, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/957,591

(22) Filed: Oct. 5, 2004

(65) Prior Publication Data

US 2005/0057658 A1 Mar. 17, 2005

Related U.S. Application Data

(60) Continuation of application No. 10/065,266, filed on Sep. 30, 2002, which is a division of application No. 09/576,221, filed on May 22, 2000.

(30) Foreign Application Priority Data

| May 28, 1999 | (JP) | ............................................ 11-149972 |
| Jun. 10, 1999 | (JP) | ............................................ 11-163988 |
| Jun. 10, 1999 | (JP) | ............................................ 11-163989 |
| Jun. 10, 1999 | (JP) | ............................................ 11-163990 |

(51) Int. Cl.
*G06F 12/02* (2006.01)

(52) U.S. Cl. .............................. 710/35; 710/36; 710/38; 348/207.1; 348/207.11; 348/207.2; 348/211.1

(58) Field of Classification Search ................... 710/35, 710/36, 38; 348/207.1, 207.11, 207.2, 211.1
See application file for complete search history.

(56) References Cited

U.S. PATENT DOCUMENTS 4,420,773 A 12/1983 Toyoda et al.

(Continued)

FOREIGN PATENT DOCUMENTS

| EP | 0 659 017 A2 | 12/1994 |
| EP | A 0 644 690 | 3/1995 |

(Continued)

OTHER PUBLICATIONS

Brochure for Camedia Digital Photo Editor VS100MO by Olympus, Sep., 1998.
Brochure for Digital Photo Station PA–200 by Canon, Dec. 15, 1998.

* cited by examiner

*Primary Examiner*—Rehana Perveen
(74) *Attorney, Agent, or Firm*—Oliff & Berridge PLC

(57) ABSTRACT

A digital image storage system includes a digital camera having a first terminal for data communication in accordance with a data communication interface standard and an adapter for the digital camera for communicating with the digital camera. The adapter has a second terminal for data communication in accordance with the same data communication interface standard as in the first terminal. The digital image storage system further includes a data storage having a third terminal for data communication in accordance with the same data communication interface standard as in the first terminal. The data storage is capable of communicating with the digital camera by way of the adapter through a connection between the third and the second terminals and also capable of directly communicating with the digital camera through a connection between the third and the first terminals.

10 Claims, 51 Drawing Sheets

U.S. PATENT DOCUMENTS

| | | | |
|---|---|---|---|
| 4,498,107 A | 2/1985 | Yoshimaru et al. | 358/256 |
| 4,888,648 A | 12/1989 | Takeuchi et al. | 358/335 |
| 5,341,171 A | 8/1994 | Mori et al. | |
| 5,465,117 A | 11/1995 | Ide et al. | |
| 5,493,335 A | 2/1996 | Parulski et al. | |
| 5,498,949 A | 3/1996 | Dowe | |
| 5,528,285 A | 6/1996 | Morikawa | 348/14 |
| 5,568,198 A | 10/1996 | Sakurai et al. | |
| 5,602,458 A | 2/1997 | Dowe | |
| 5,633,678 A | 5/1997 | Parulski et al. | |
| 5,724,579 A | 3/1998 | Suzuki | |
| 5,841,424 A | 11/1998 | Kikinis | |
| 5,844,400 A | 12/1998 | Ramsier et al. | |
| 5,844,606 A | 12/1998 | Suemoto et al. | |
| 5,875,034 A | 2/1999 | Shintani et al. | |
| 5,903,700 A | 5/1999 | Fukushima | |
| 6,043,625 A | 3/2000 | Dowe | |
| 6,075,566 A | 6/2000 | Suemoto et al. | |
| 6,111,604 A | 8/2000 | Hashimoto et al. | |
| 6,127,810 A | 10/2000 | Sato et al. | |
| 6,135,809 A | 10/2000 | Asakawa | |
| 6,151,067 A | 11/2000 | Suemoto et al. | |
| 6,188,431 B1 | 2/2001 | Masahiro | |
| 6,208,380 B1 | 3/2001 | Misawa | |
| 6,237,106 B1 | 5/2001 | Koyama | |
| 6,256,059 B1 | 7/2001 | Fichtner | |
| 6,259,858 B1 | 7/2001 | Ando et al. | |
| 6,272,532 B1 * | 8/2001 | Feinleib | 709/206 |
| 6,272,533 B1 | 8/2001 | Browne | |
| 6,275,882 B1 | 8/2001 | Cheever et al. | |
| 6,292,273 B1 | 9/2001 | Dow et al. | |
| 6,301,106 B1 | 10/2001 | Helot et al. | |
| 6,337,712 B1 | 1/2002 | Shiota et al. | |
| 6,362,851 B1 | 3/2002 | Lavelle et al. | |
| 6,408,095 B1 | 6/2002 | Maeda et al. | |
| 6,411,874 B1 | 6/2002 | Morgan et al. | |
| 6,429,869 B1 | 8/2002 | Kamakura et al. | |
| 6,429,896 B1 | 8/2002 | Aruga et al. | |
| 6,469,737 B1 * | 10/2002 | Igarashi et al. | 348/211.3 |
| 6,516,099 B1 | 2/2003 | Davison et al. | |
| 6,538,758 B1 | 3/2003 | Ikegawa | |
| 6,571,271 B1 | 5/2003 | Savitzky et al. | |
| 6,580,460 B1 | 6/2003 | Takahashi et al. | |
| 6,628,325 B1 | 9/2003 | Steinberg et al. | |
| 6,648,661 B1 | 11/2003 | Byrne et al. | |
| 6,654,051 B1 | 11/2003 | Fujita et al. | |
| 6,668,134 B1 | 12/2003 | Niikawa | |
| 6,686,958 B1 | 2/2004 | Watanabe et al. | |
| 6,693,665 B1 | 2/2004 | Shindo et al. | |
| 6,721,001 B1 | 4/2004 | Berstis | |
| 6,765,612 B1 | 7/2004 | Anderson et al. | |
| 6,771,896 B1 | 8/2004 | Tamura et al. | |
| 6,812,961 B1 | 11/2004 | Parulski et al. | |
| 6,819,355 B1 | 11/2004 | Niikawa | |
| 6,947,075 B1 | 9/2005 | Niikawa | |
| 6,950,142 B1 | 9/2005 | Soumi et al. | |
| 2001/0013890 A1 | 8/2001 | Narayanaswami | |
| 2002/0106199 A1 | 8/2002 | Ikeda | |
| 2002/0186319 A1 | 12/2002 | Whitby et al. | |
| 2003/0112337 A1 | 6/2003 | Sato et al. | |
| 2003/0122932 A1 * | 7/2003 | Shiohara | 348/207.2 |
| 2003/0122940 A1 | 7/2003 | Myojo | |
| 2003/0174213 A1 | 9/2003 | Matsumoto et al. | |
| 2003/0181168 A1 | 9/2003 | Herrod et al. | |
| 2003/0193602 A1 | 10/2003 | Satoh et al. | |
| 2004/0056967 A1 | 3/2004 | Eto et al. | |
| 2004/0212822 A1 | 10/2004 | Schinner | |
| 2004/0252198 A1 | 12/2004 | Hatanaka | |

FOREIGN PATENT DOCUMENTS

| | | |
|---|---|---|
| JP | 62-21379 | 1/1987 |
| JP | A 2-270475 | 11/1990 |
| JP | A 4-213436 | 8/1992 |
| JP | A 6-86122 | 3/1994 |
| JP | A 6-343137 | 12/1994 |
| JP | A 7-75040 | 3/1995 |
| JP | A-7-87432 | 3/1995 |
| JP | A 7-135627 | 5/1995 |
| JP | A 7-177454 | 7/1995 |
| JP | A-7-182366 | 7/1995 |
| JP | A-7-282077 | 10/1995 |
| JP | 08-69684 | 3/1996 |
| JP | A 8-69684 | 3/1996 |
| JP | 8-69684 | 3/1996 |
| JP | A-08-069684 | 3/1996 |
| JP | A 8-102897 | 4/1996 |
| JP | 8-102897 | 4/1996 |
| JP | A 8-116481 | 5/1996 |
| JP | A 8-140027 | 5/1996 |
| JP | 8-214182 | 8/1996 |
| JP | 09037125 | 2/1997 |
| JP | 9-120666 | 5/1997 |
| JP | 9-121313 | 5/1997 |
| JP | A 10-70561 | 3/1998 |
| JP | A-10-248038 | 9/1998 |
| JP | A 10-295047 | 11/1998 |
| JP | A-11-32285 | 2/1999 |
| JP | A 11-103405 | 4/1999 |
| JP | 2004246126 A | 9/2004 |
| JP | 2005130655 A | 5/2005 |
| WO | WO 99/42029 | 8/1999 |

| FOLDER No. | RECHARGED DATE | PHOTOGRAPHY DATE | FOLDER NAME PHOTOGRAPHER ID | TITLE MEMO | NUMBER OF IMAGE | USED MEMORY (KB) |
|---|---|---|---|---|---|---|
| 1 | 1999.01.20 | 1999.01.20 | TARO | GOLF | 26 | 15132 |
| 2 | 1998.10.18 | 1998.10.18 | HANAKO | * | 3 | 1236 |
| 3 | 1998.07.20 | 1998.07.20 | HANAKO | ENTRANCE CEREMONY | 13 | 8886 |
| 4 | 1998.04.05 | 1998.04.05 | TARO | FISHING | 3 | 1544 |

RETRIEVAL
0: FOLDER/ IMAGE RETRIEVAL

SORTING CONDITION
(1: PHOTOGRPHY DATE   2: NAME OF PHOTOGRAPHER   3: TITLE )

PRINT MODE      TELEVISION MODE

Fig. 35

SEARCH CONDTION

PHOTOGRAPHER : TARO HANAKO ICHIRO

PHOTOGRPHY DATE : APRIL 4,1999 - APRIL 5,1999

TITLE : FISHING , ENTRANCE CEREMONY , GRADUATION CEREMONY , FAMILY , PTA

MEMO :(POSSIBLE TO SEARCH WITH FREE KEYWORD)

STOEING PRIORITY
  1. PHOTOGRPHY DATE    2. PHOTOGRAPHER
               3.TITLE

☐ ALBUM
  0:READ OUT  1:STORE  2:SEARCH CONDITION ITEM/ DERETE/ADD/ENTER OF SELECTED ITEM

☐ AI DISPLAY CODE TABLE FOR CREATING LETTER ( PRINT MODE )    ( TELEVISION MODE )

Fig. 38

| FOLDER No. | ALBUM NAME | PHOTOGRAPHY DATE | CREATOR | MEMORY CAPACITY (KB) |
|---|---|---|---|---|
| 1 | COOKING SCHOOL | 1999.01.20 | HANAKO | 6 |
| 2 | TRAVEL | 1998.10.18 | HANAKO | 8 |
| 3 | FISHING | 1998.07.20 | HANAKO | 3 |
| 4 | ENTRANCE CEREMONY | 1998.04.05 | TARO | 5 |
| ... | ... | ... | ... | ... |

( PRINT MODE )   ( TELEVISION MODE )

Fig. 40

DIGITAL CAMERA HAVING IMAGING PORTION, FIRST TERMINAL, AND SECOND TERMINAL FOR OUTPUTTING SIGNALS BASED ON IMAGE DATA IN ACCORDANCE WITH SAME DATA COMMUNICATION INTERFACE STANDARD

CROSS-REFERENCE TO RELATED APPLICATION

This is a Continuation of application Ser. No. 10/065,266 filed Sep. 30, 2002, which is a Divisional of U.S. application Ser. No. 09/576,221, filed May 22, 2000. The entire disclosure of the prior applications are hereby incorporated by reference herein in its entirety.

BACKGROUND OF THE INVENTION

1. Field of Invention

The present invention relates to a digital image storage system and digital camera system, and more particularly to a digital image storage system and digital camera system capable of data communication between a digital camera and a data storage.

2. Description of Related Art

In this field of art, various types of image storage system capable of data communication between a digital camera and a data storage have been proposed.

For example, U.S. Pat. No. 5,493,335 has proposed a docking adapter for transferring stored images from an electronic still camera to a host computer. U.S. Pat. No. 5,493,335 has proposed a parallel port that provides on the docking adapter and connected with the host computer. U.S. Pat. No. 5,493,335 has also proposed a serial port that provides on the electronic still camera body itself for direct connection with the host computer.

However, there have been problems and disadvantages still left in the related arts. For example, the related arts have not proposed the same data communication interface that provides on the adapter and on the digital camera.

SUMMARY OF THE INVENTION

In order to overcome the problems and disadvantages, the invention provides a digital image storage system including a digital camera having a first terminal for data communication in accordance with a data communication interface standard and an adapter for the digital camera for communicating with the digital camera. The adapter has a second terminal for data communication in accordance with the same data communication interface standard as in the first terminal. The digital image storage system further includes a data storage having a third terminal for data communication in accordance with the same data communication interface standard as in the first terminal. The data storage is capable of communicating with the digital camera by way of the adapter through a connection between the third and the second terminals and also capable of directly communicating with the digital camera through a connection between the third and the first terminals.

According to the another feature of the invention, a digital camera system in association with a data storage includes a digital camera having a first terminal for data communication in accordance with a data communication interface standard and an adapter for the digital camera for communicating with the digital camera. The adapter has a second terminal for data communication in accordance with the same data communication interface standard as in the first terminal. The digital camera is capable of data communication with the data storage by way of the adapter and also capable of directly communicating with the data storage through the first terminal.

Other features and advantages according to the invention will be readily understood from the detailed description of the preferred embodiment in conjunction with the accompanying drawings.

BRIEF DESCRIPTION OF THE DRAWINGS

FIG. 35 is an example of schedule display on the monitor on information on all folders in Second Embodiment.

FIG. 38 is an example of the search condition setting menu displayed on the monitor of Second Embodiment.

FIG. 40 is an example of the page of the list of album titles displayed on the monitor of Second Embodiment.

DETAILED DESCRIPTION OF EXEMPLARY EMBODIMENTS

First Embodiment (1) System Design

Figure 1:
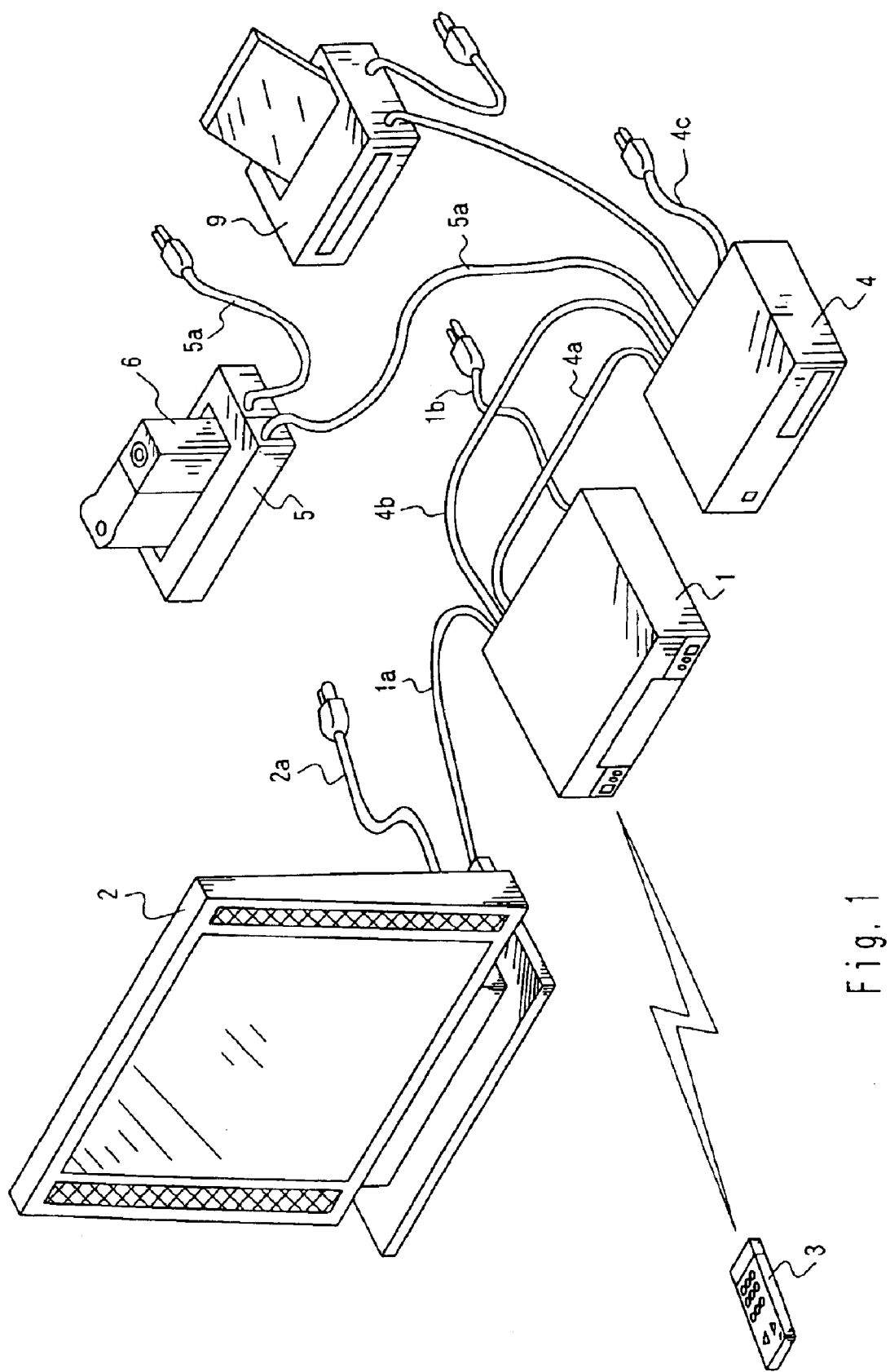
FIG. 1 is an exemplary perspective view of the system of First Embodiment.
Figure 2:
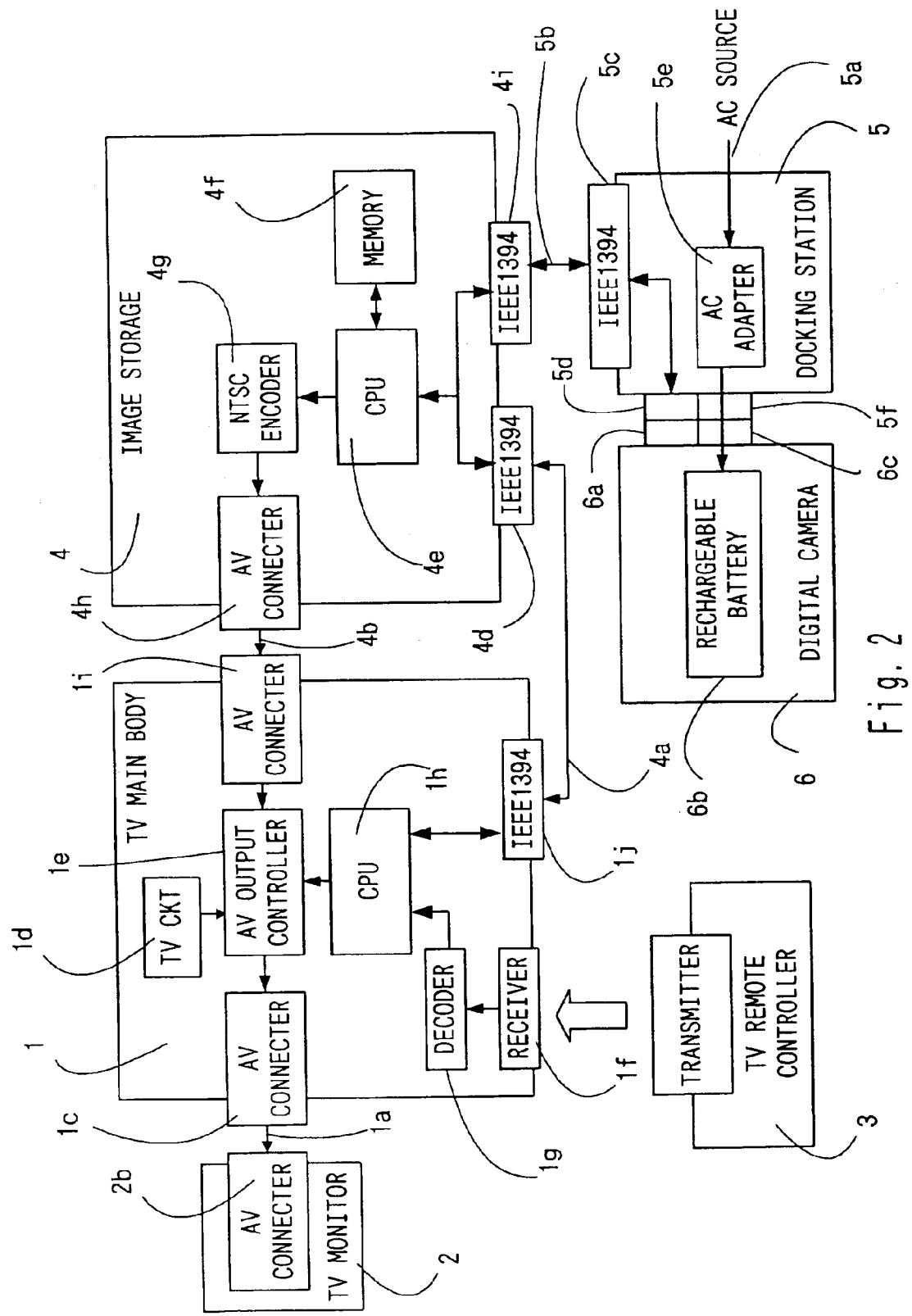
FIG. 2 is an exemplary schematic diagram of the system configuration of First Embodiment.

An exemplary perspective view and schematic diagram of the system design for First Embodiment are shown in FIGS. 1 and 2, respectively.

According to the television set in First Embodiment, a monitor 2 consisting of the plasma display panel, for example, is separated from a main body 1. The main body 1 is connected to the monitor 2 by a cable 1a for transmitting the audio and image signal from the former to the latter. The main body 1 is operated by means of a remote controller 3. The main body 1 and the monitor 2 are provided with the common power source by way of cables 1b and 2a, respectively.

An image storage 4 is connected to the main body 1 through a cable 4a for transmitting control signal from the main body 1 to the image storage 4, and further through a cable 4b for transmitting the audio and image signal from the image storage 4 to the main body 1 at AV input thereof. The image storage 4 includes a large capacity memory such as a hard disc for storing large number of digital image date with their identification data. The image storage is provided with the common power source by way of a cable 4c, and further connected to a printer 9 through a cable.

The remote controller 3 for usually controlling the ordinary television watching function in the television mode is switched into an album mode when a later mentioned album mode button is pressed. In the album mode, the main body 1 responsive to the operation of the remote controller 3 controls the image storage 4 to transmit image signal ordered by the remote controller 3 for the display of the image on the monitor 2.

A docking station 5 has a mounting portion for a digital still camera (hereinafter referred to as a digital camera) 6. The mounting portion is provided with a power supply connector 5f and a signal connector 5d, which are automatically made in contact with corresponding connectors of the digital camera 6 when it is mounted on the mounting portion of the docking station 5. The docking station 5 includes an AC adapter 5e, which is fed with the common power source through a cable 5a and has an output connected to power connector 5f. An IEEE 1394 connector 5c of the docking station 5 is directly connected to the image storage 4. Thus, the docking station 5 is of a simple design consisting of the mounting portion for the digital camera, the signal connector 5d, the IEEE 1394 connector 5c, power connector 5f, and the AC adapter 5e, and is dedicated to the digital camera 6 of a specific type. On the contrary, the image storage 4 is of a common use type interchangeably connected to any docking station dedicated to one of various types of digital cameras by means of standardizing the shape of the connector for a cable 5b.

In operation, in automatic response to the mounting of the digital camera 6 on the docking station 5, the data transmission is initially triggered to automatically transmit the entire digital image signal in the digital camera to the image storage 4 through the cable 4b. If the completion of the automatic transmission without error is confirmed, all contents of memory in the digital camera is automatically deleted, when the LED 5k is energized to inform the emptiness of the memory. On the completion of the data transmission, the power charging is automatically triggered, and automatically terminated on its completion, when the LED 5m is energized to inform the completion of the power charging. If a user merely mounts the digital camera 6 on the docking station 5 and lets it be, accordingly, the data transmission and the power charging will be completed to prepare for instant use of the digital camera 6 when it will be get back from the docking station 5. On getting back the digital camera 6, LED's 5k and 5m should be confirmed. If the power will be found to be naturally discharged while the digital camera 6 is left on the docking station 5, the power is automatically recharged, which will be repeated.

FIG. 2 represents an exemplary schematic diagram of the system design for First Embodiment, in which the cable 1a connects an AV connector 1c of the main body 1 to an AV connector 2b of the monitor 2. In the ordinary television mode, the main body 1 transmits signal generated from a TV circuit 1d including tuner to the AV connector 1c by way of an AV output controller 1e. A receiver 1f receives infrared signal from an emitter 3a of the remote controller 3 to transmit the received information to a CPU 1h through a decoder 1g. In the television mode, the necessary change in channel or volume is carried out by the TV circuit 1d in response to the operation at the remote controller 3.

When the CPU 1h detects a mode change from the television mode to the album mode in response to a signal form decoder 1g caused by a mode changing operation at the remote controller 3, the AV output controller 1e is made to transmit a signal from an AV connector 1i to the AV connector 1c in place of the signal from the TV circuit 1d. Further, in the album mode, the CPU responsive to the signal of the decoder 1g transmits control signal from an IEEE 1394 connector 1j to an IEEE 1394 connector 4d of the image storage 4 through the cable 4a designed according to the IEEE 1394 standard. Thus, the control of the image storage 4 by means of the remote controller 3 for the television set is made possible. For example, if the next still image is requested at the remote controller 3, the request is transmitted through the receiver 1f, the decoder 1g, the TV circuit 1h, the IEEE 1394 connector 1j and the cable 4a to the IEEE 1394 connector 4d of the image storage 4. Then, a CPU 4e connected to the IEEE 1394 connector 4d identifies the request to read out the next image from a memory 4f such as a hard disc. The read image is transmitted through an NTSC (National Television System Committee) encoder 4g, an AV connector 4h and the cable 4b to the AV connector 1i.

Cable 5e designed according to the IEEE 1394 standard is connected between an IEEE 1394 connector 4i of the image storage 4 and the IEEE 1394 connector 5c of the docking station 5. Within the docking station 5, the IEEE 1394 connector 5c directly leads to the signal connector 5d, which is of a specific mechanical shape dedicated to the digital camera 6 although electrically designed under the IEEE 1394 standard. The output of the AC adapter 5e fed with the common power source is connected to the power supply connector 5f. The signal connector 5d and the power supply connector 5f are formed as a single connector unit, while a signal connector 6a and a power supply connector 6c of the digital camera 6 are correspondingly formed as a single connector unit. When the digital camera 6 is mounted on the docking station 5, accordingly, the signal connector 6a of the digital camera 6 is made in contact with the signal connector 5d of the docking station 5, while the power supply connector 6c connected to a rechargeable battery 6b of the digital camera 6 is made in contact with the power supply connector 5f of the docking station 5. Thus, the image signal of the digital camera 6 is transmitted to the TV circuit 4e of the image storage 4 by way of the signal connector 6a, the signal connector 5d, the IEEE 1394 connector 5c, the cable 5b and the IEEE 1394 connector 4i, and the rechargeable battery 6b is charged by the AC adapter 5e.

In the television set in First Embodiment, the monitor 2 is separated from the main body 1. According to the present invention, however, such a modification is possible that the main body 1 and the monitor 2 are combined within a single housing as in an ordinary television set.

Further, in the television set in First Embodiment, the image storage 4 transmits the AV signal formed by the NTSC encoder 4g to the main body 1 at the AV connector. According to the present invention, however, such a modification is possible that the digital image signal without the encoding is received by the main body 1 at the IEEE 1394 connector 1j, the digital image signal being encoded into AV signal by the TV circuit 1d within the main body 1.

Such a modification is also possible that the signal from the image storage 4 is directly transmitted to the monitor 2 at its AV connector, instead of transmitting the signal by way of the main body 1.

According to the present invention, the monitor 2 has an IEEE 1394 interface and the IEEE 1394 connector (not shown). To such a monitor, the digital image signal may be transmitted to monitor 2 at the IEEE 1394 connector.

(2) Designs of Parts and Functions

The description will be advanced to individual designs for the parts, such as the image storage, the docking station and the digital camera in the system of the present invention, and to the functions thereof.

Figure 3:
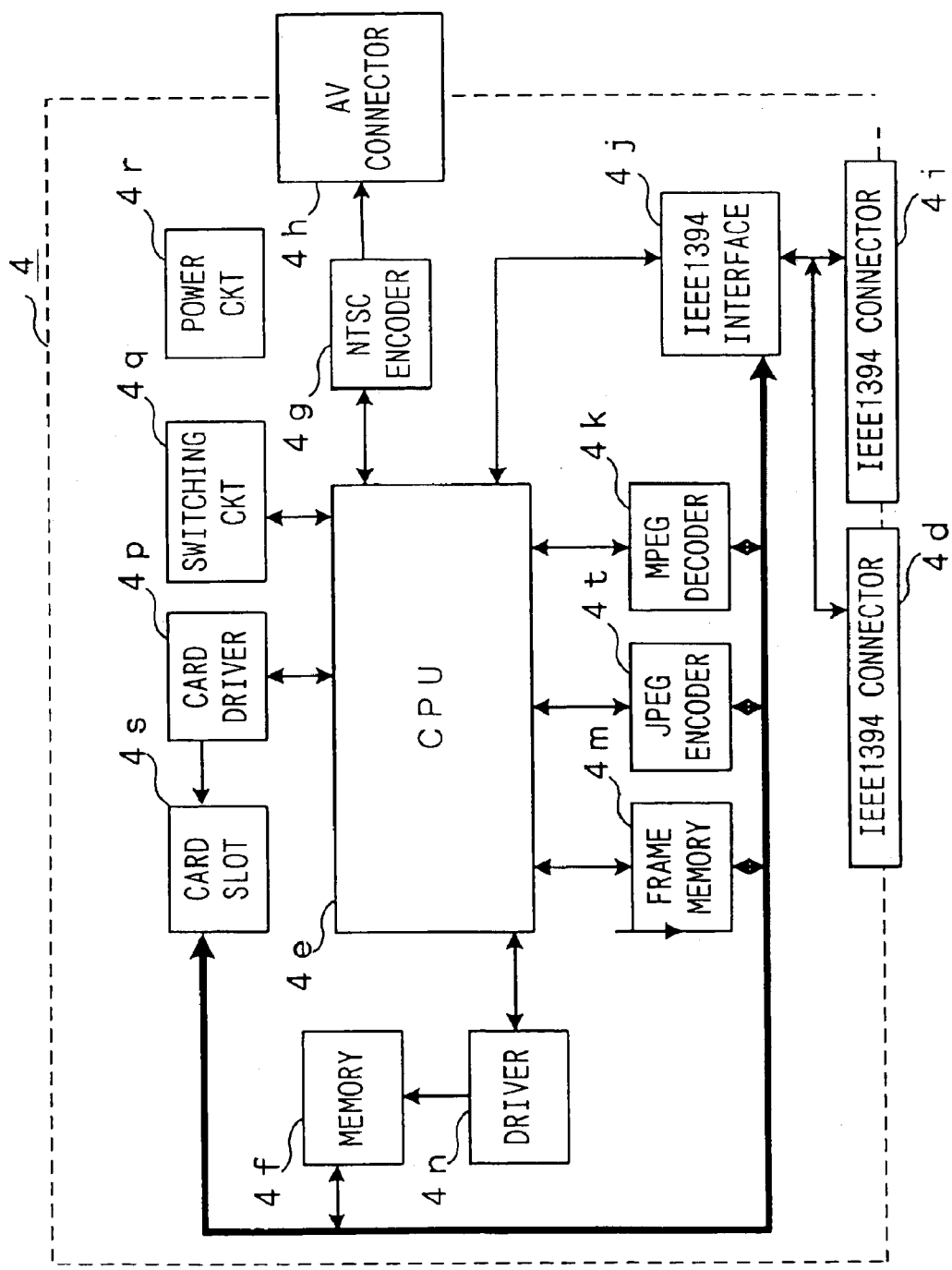
FIG. 3 is an exemplary block diagram of an image storage.

FIG. 3 represents an exemplary block diagram showing the design of the image storage 4 of First Embodiment. The following devices form the image storage 4 of First Embodiment according to the present invention. The CPU 4e controls devices in the image storage 4 and carries out the functions in the later explained flow charts in FIGS. 6 to 8 in cooperation with a CPU 6h of the digital camera 6. The CPU 4e has ROM for storing data such as image data. A card slot 4s is for reading image or audio signal from the card memories, such as COMPACT FLASH, SMART MEDIA and MEMORY STICK, which are the names of products from San Disc of the United States, Toshiba of Japan and Sony of Japan, respectively. A card driver 4p is for driving the card slot 4s in response to the direction of the CPU 4e. The memory 4f is of non-volatility and large capacity, such as a hard disc, which also stores the program to be carried by the CPU 4e.

Alternatively, the memory 4f of built-in type in the embodiment above may be replaced by a removable type such as a DVD.

A memory driver 4n is for driving the memory 4f in response to the direction of the CPU 4e.

An MPEG (Moving Picture Expert Group) decoder 4k is for expanding the motion picture data compressed in accordance with MPEG system for playing the motion picture. A JPEG (Joint Photographic Expert Group) decoder 4t is for expanding the still image data compressed in accordance with JPEG system for playing the still image. A frame memory 4m is a non-volatile semiconductor memory for temporally storing the image or audio signal. The frame memory 4m is used in transmitting the image or audio signal from the digital camera 6, and also in outputting the image data to the main body 1 of the television set or to the printer 9. A switch circuit 4q is for detecting the operation of switches provided in the image storage 4 to inform the CPU 4e of it. Power circuit 4r is connected to the common power source (not shown) for providing each device in the image storage 4 with the electric power.

An IEEE 1394 interface 4j is for communicating control signals and image audio signals with various IEEE 1394 interfaces located in the main body 1 of the television set, the digital camera 6 (the docking station 5) and the printer 9, and for receiving a signal from the remote controller 3 of the television set to inform the CPU 4e of it. The IEEE 1394 connectors 4i and 4d is for the connection with cables which connect to various IEEE 1394 interfaces located in the main body 1 of the television set, the digital camera 6 (the docking station 5) and the printer 9. The NTSC encoder 4g is for converting the digital image signal into the television signal of NTSC system, on which the television set without the IEEE 1394 interface is able to play the image. The connector 4h outputs the television signal encoded by The NTSC encoder 4.

Figure 4:
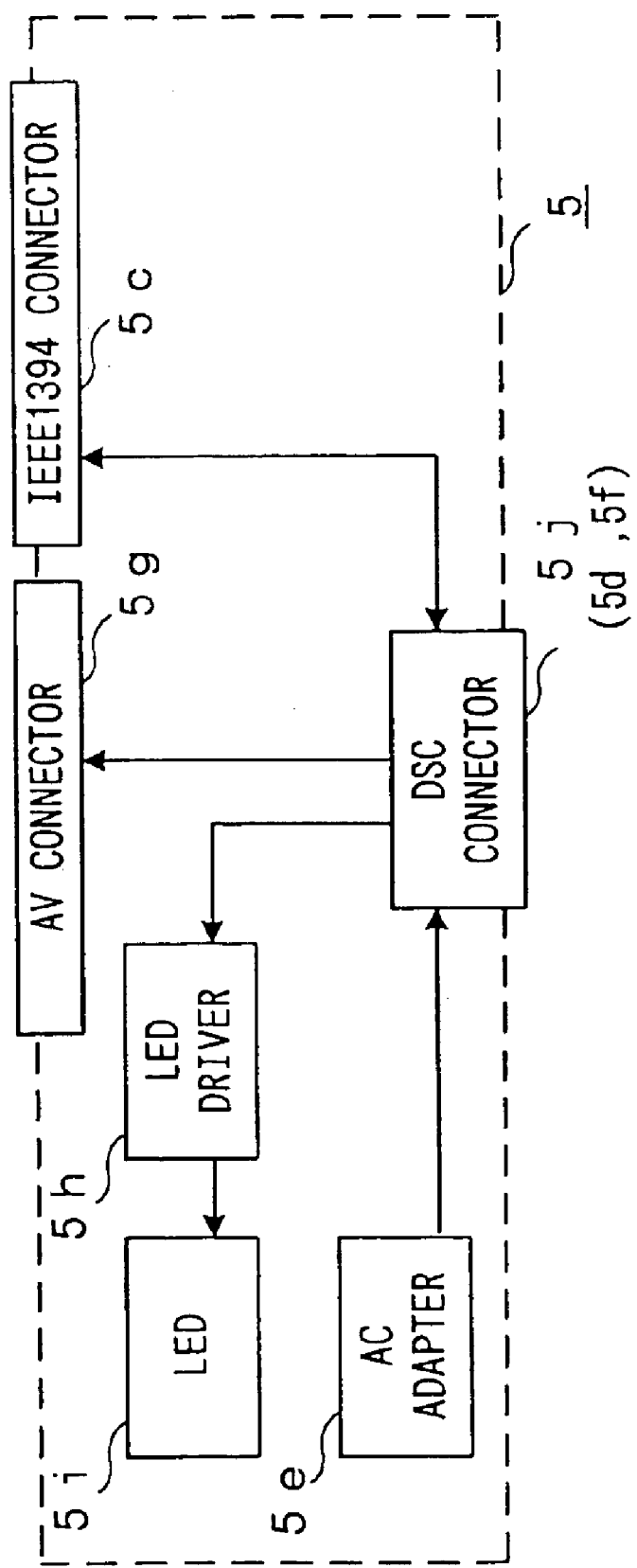
FIG. 4 is an exemplary block diagram of a docking station.

FIG. 4 represents an exemplary block diagram showing the design of the docking station 5 of First Embodiment. The docking station 5 of First Embodiment is described with help of FIG. 4. The AC adapter 5e connected with commercial power source, which is not shown in the figure, is a power source in order to supply the digital camera 6 mounted on the docking station 5 with electric power, and is also used for charging the rechargeable battery 6b of the digital camera 6.

A DSC connector 5j is a kind of connector connected with a DSC connector 6n arranged in the digital camera 6 and corresponds to the signal connector 5d and the power supply connector 5f shown in FIG. 2. The DSC connector 5j is electrically connected with the AC adapter 5e and the IEEE 1394 connector 5c. Signal transmission and power supply to the digital camera 6 are made through the DSC connector 5j. The signal connector 5d is a terminal for giving and receiving a signal in conformity with the IEEE 1394 standard. The DSC connector 5j has a specific mechanical shape dedicated to the digital camera 6 and also has a terminal electrically connected with an AV connector 5g, which was not mentioned in FIG. 2.

The AV connector 5g is for outputting the TV signal encoded with the NTSC standard by the digital camera 6. Although no explanation has been made in the First Embodiment, by means of connecting the AV connector 5c with an AV connector of another instrument, a TV signal encoded in the digital camera 6 can be watched by the instrument having no IEEE 1394 interface.

The IEEE 1394 connector 5c is a connector connected with the cable 5b, which is connected with IEEE 1394 interfaces equipped in the image storage 4. In explanation of the First Embodiment, only the case that the IEEE 1394 connector 5c is connected with the IEEE 1394 connector 4i of the image storage 4 is mentioned. However, when the main body 1 or the printer 9 can handle image or audio signal stored in the digital camera 6, the image or audio files can be replayed or printed without help of the image storage 4 by means of connecting the IEEE 1394 connector 5c with the IEEE 1394 interface equipped in the main body 1 or the printer 9.

An LED 5i has an LED 5k for memory and an LED 5m for recharging. The LED 5i indicates the state of a card memory stored in the digital camera 6 and the state of the rechargeable battery by its lighting condition. An LED driver 5h controls lighting of the LED 5i in accordance with a command from the CPU 6h of the digital camera 6 or the CPU 4e of the image storage 4.

Figure 5:
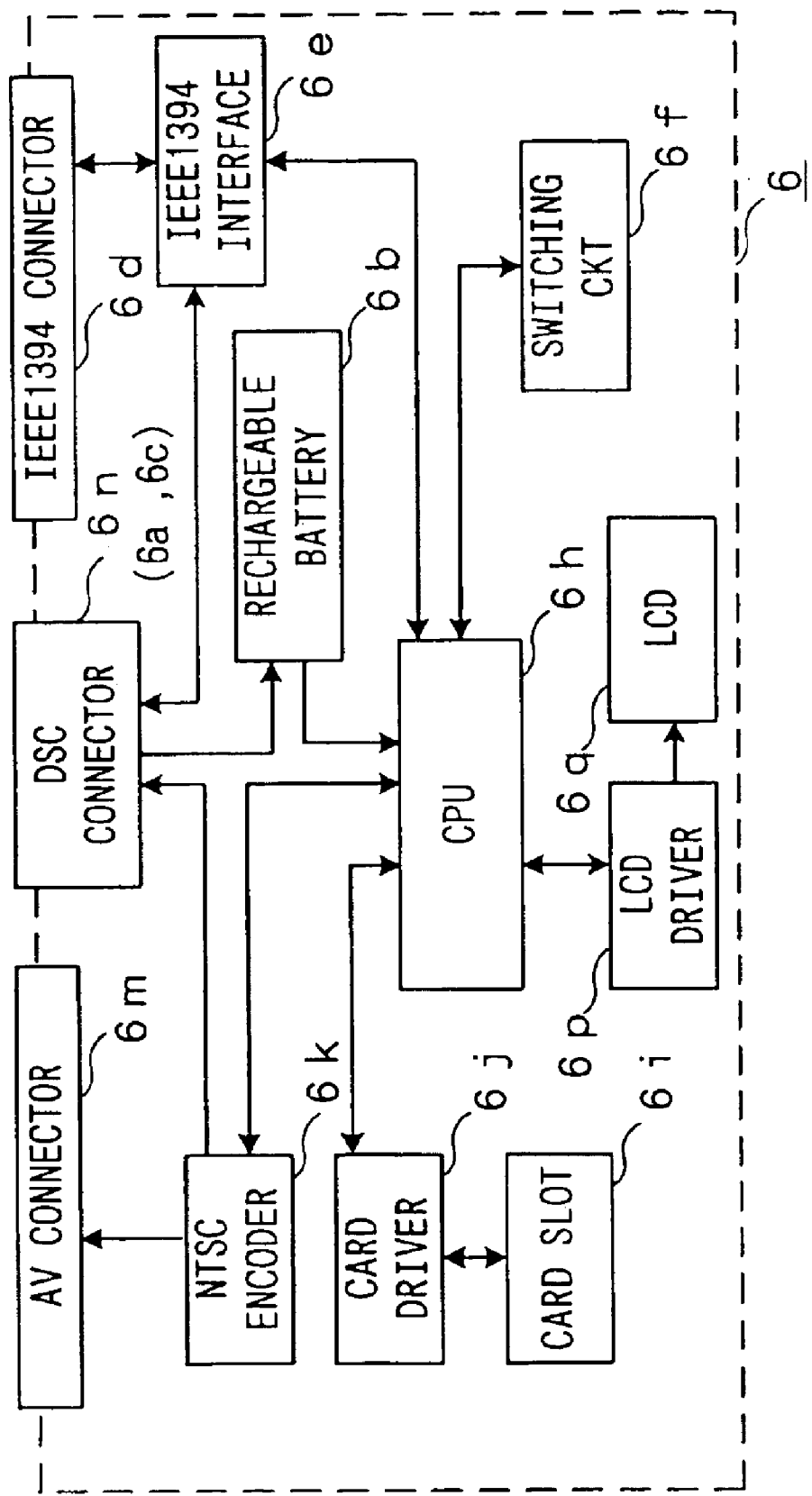
FIG. 5 is an exemplary block diagram of a digital camera.

FIG. 5 represents an exemplary block diagram showing the design of the digital camera 6. The digital camera 6 of the First Embodiment is described with help of the FIG. 5. Although, we omitted the explanation of picture taking and image processing, it is needless to say that the system includes photographic lens, image detector, image processing circuit, and the like. The CPU 6h controls each device in the digital camera 6 and performs the procedure shown in FIG. 26 mentioned later in cooperation with the CPU 4e of the image storage 4.

A switch circuit 6f detects whether a release button 6r or a command dial 6s equipped in the digital camera 6 is handled or not, and transmits it to the CPU 6h.

An IEEE 1394 interface 6e is the device for giving and receiving control signal, image or audio signal through the IEEE 1394 interface stored in the main body 1, the image storage 4, or the printer 9.

An IEEE 1394 connector 6d is a kind of connector for giving and receiving signal with other instruments having the IEEE 1394 interface and is used for giving and receiving signal with the image storage 4 without help of the docking station 5, not mentioned in the First Embodiment. When the main body 1 or the printer 9 can handle image or audio signal in the digital camera 6, the image or audio files can be replayed or printed without help of the image storage 4 by means of connecting with the IEEE 1394 interface equipped in the main body 1 or the printer 9.

An AV connector 6m is a connector through which converted NTSC television signals are output outside. By connecting the AV connector 6m to another AV connector, television signals, which are converted in the digital camera 6, are observable even on devices without the IEEE interface.

The DSC connector 6n, through which power and signals are transferred, is connected to the DSC connector 5j. The DSC connector 6n includes the signal connectors, the power supply connectors, and AV terminals, as well as the DSC connector 5j. Through the signal connectors, signals designed according to the IEEE standard are transferred. The DSC connector 6n has a structure only for connecting to the docking station 5.

The rechargeable battery 6b, which supplies power to each device of the digital camera 6, is recharged through the AC adapter 5e of the docking station 5. A card slot 6i records image signals and audio signals onto the card memory (e.g., Compact Flash, Smart Media, Memory Stick) which is mounted to the card slot 6i, and reads out image signals and audio signals from the card memory.

A card driver 6j drives the card slot 6i under instruction from CPU 6h. The image storage 4 and the digital camera 6 can be powered on under signal input from outside, in the case that imaging storing device 4 is not powered.

(a) Recharging an Taking in Images Flow

Figure 6:
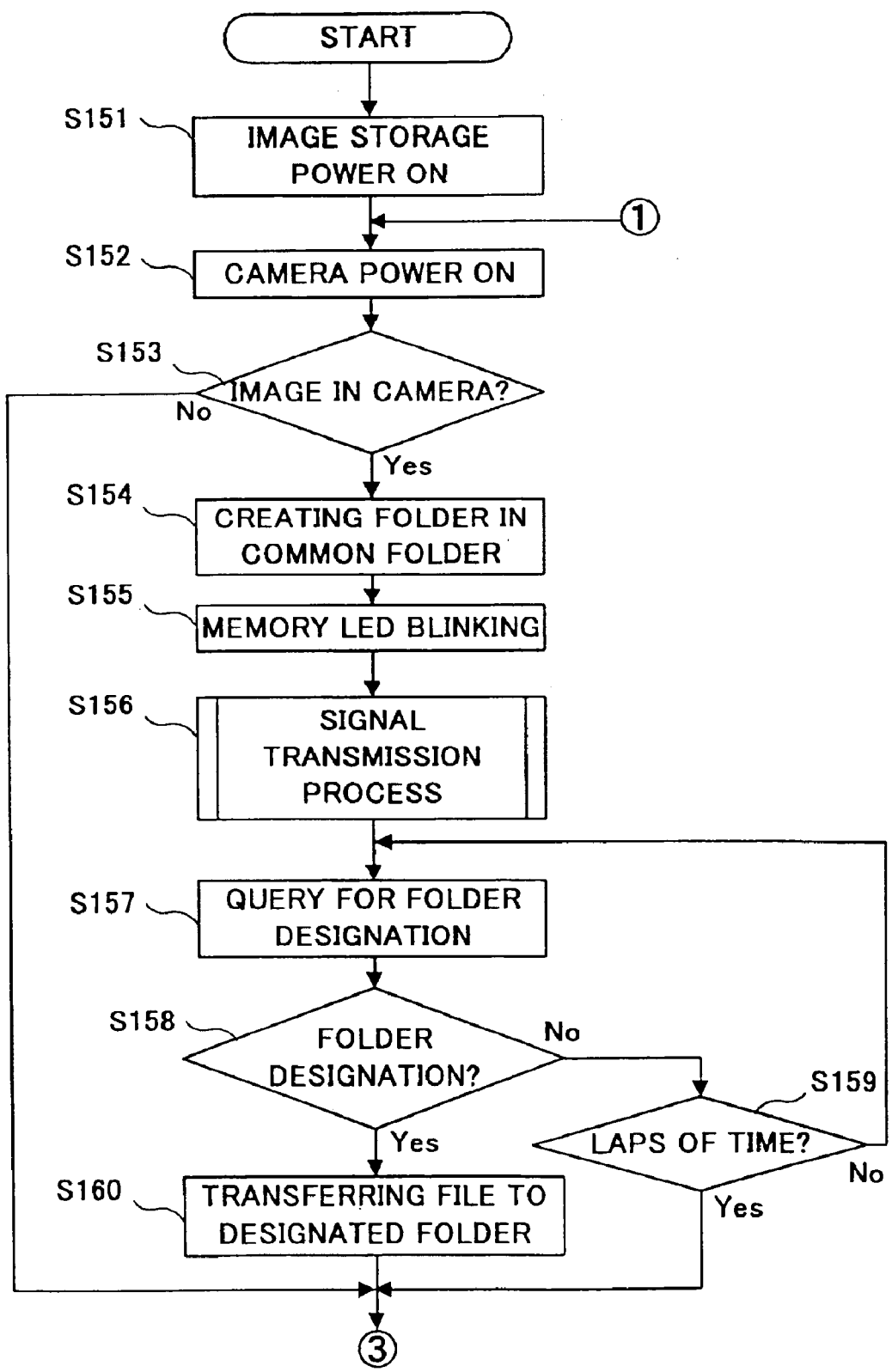
FIG. 6 is an exemplary first flowchart illustrating the operation of the image storage.
Figure 7:
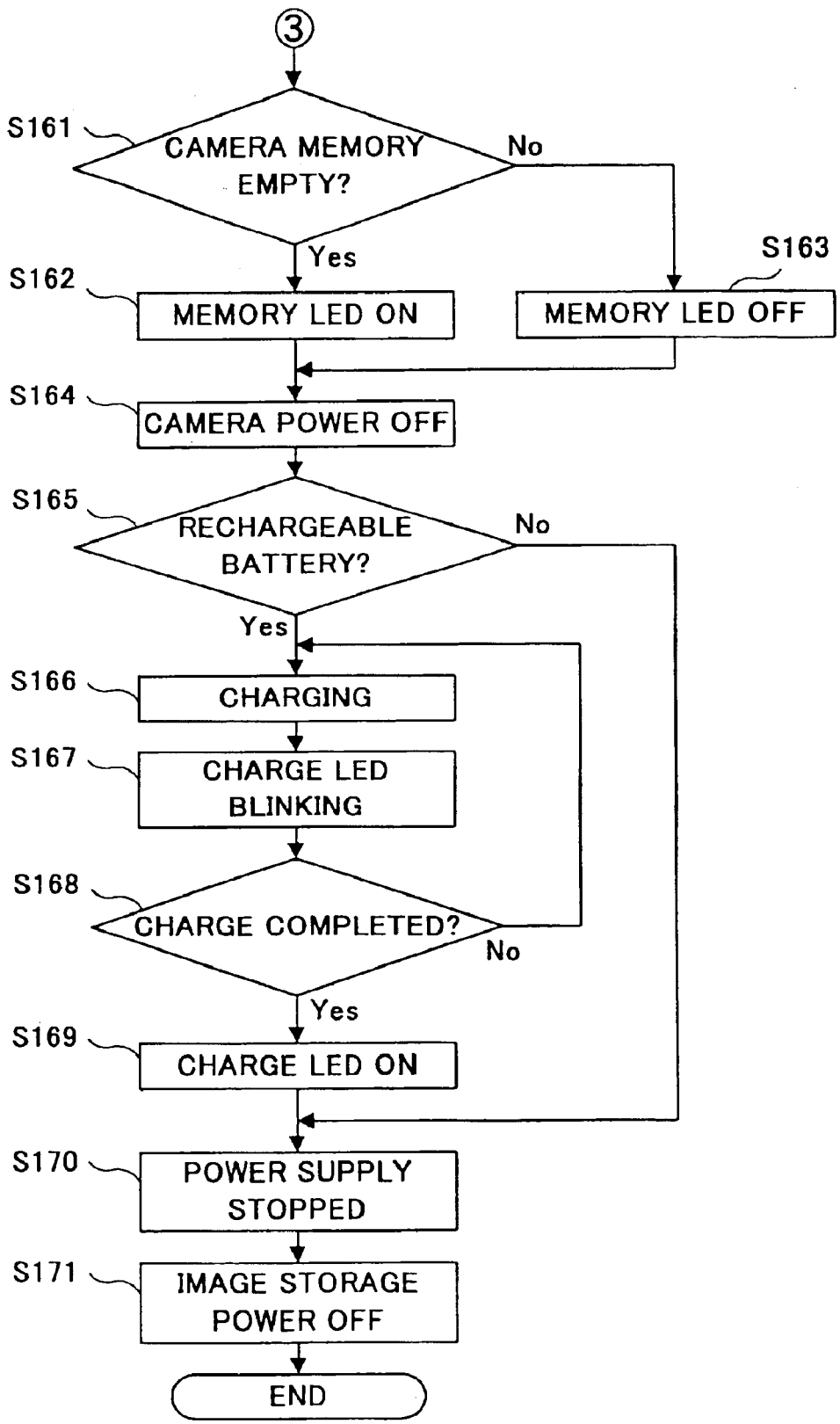
FIG. 7 is an exemplary second flowchart illustrating the operation of the image storage.

FIG. 6 and FIG. 7 are flowcharts illustrating programs executed by the CPU 4e of the image storage 4. Referring to FIG. 6, program starts when the image storage 4 detects that the digital camera 6 is connected to the docking station 5. The image storage 4 can always communicate with the docking station 5 through the IEEE 1394 connector 4i, the cable 5b, and the IEEE 1394 connector 5c, because the image storage 4 is always in the state of standing by, passing low current between the docking station 5 and the image storage 4. Therefore, when the digital camera 6 is connected to the docking station 5, The image storage 4 can detect the connection between camera 6 and the docking station 5.

Alternatively, the above mentioned detection through the connection between camera 6 and the docking station 5 may be replaced by a detection by means of a combination of a mechanical contact and a sensor.

In step S151, function necessary to receive image signals and audio signals from the digital camera 6 is activated. More specifically, the main power is turned on, the memory 4f which records image signals and audio signals is driven, and a receiving program is activated.

In step S152, the AC adapter 5e of the docking station 5 is operated through the cable 5a, power is supplied to the digital camera 6, and the main power source of the digital camera 6 is switched on. In the case that the main power source of the digital camera 6 is already switched on, the main power source continues to be on.

The above embodiment may be modified to an alternative embodiment in which the CPU 4e does not transmit the signal to the digital camera 6 for turning on the same if the camera 6 has already be turned on.

In step S153, it is detected whether the digital camera 6 has image files or audio files that are reproducible by the image storage 4. If the digital camera 6 has them, program proceeds to step S154. If the digital camera 6 does not have them, program proceeds to step S161 in FIG. 7. The image storage 4 is already set so that JPEG file, MPEG file, GIF file, bitmap file, and WAVE file can be reproduced. Although some digital camera has a proprietary format image, such proprietary image is reproduced only by dedicated software. Furthermore, card memories mounted to the digital camera 6 may be used for other devices, therefore, other files except for image files or audio files, e.g., document files, may be mounted to the digital camera 6. However, the image storage 4 is designed so that the image storage 4 does not receive files which can not be reproduced by the image storage 4.

By installing a dedicated software in the image storage 4, however, the files that were not handleable with the image storage 4 become handleable with the device. The files that have thus become handleable through the installation of the software will now be automatically received by the device upon the installation.

If, provided the card memory is loadable to the digital-camera 6, the camera is not loaded with a card the memory, it is naturally interpreted that no file exists. If the camera is not loaded with a card the memory, the digital camera 6 is controlled so that the LCD 6q of the digital-camera 6 presents an alarm display that reports to a user that no card-memory exists. Further, if there exists an unhandleable file, the digital camera 6 is controlled so that the LCD 6q of the digital-camera 6 presents an alarm display that reports to a user that there exists an unhandleable file.

At the step S154, a folder to which a name, e.g., date, is attached, is created in a common folder in the memory 4f. The folder is named, e.g., "990401-990402" so that it specifies the initial and last date when the image or audio signal was recorded. The date information is taken from the date information recorded in the header of the image or audio file. The common folder is a folder which is pre-created in the memory 4f and to which files are transferred from the digital camera 6. The files named "Family", "Father", "Mother", and "Taro" are also pre-created in a common folder of the image storage 4.

At the step S155, by blinking the memory indicator LED 5k in the docking station 5, a user is informed that a file is being transferred.

Figure 8:
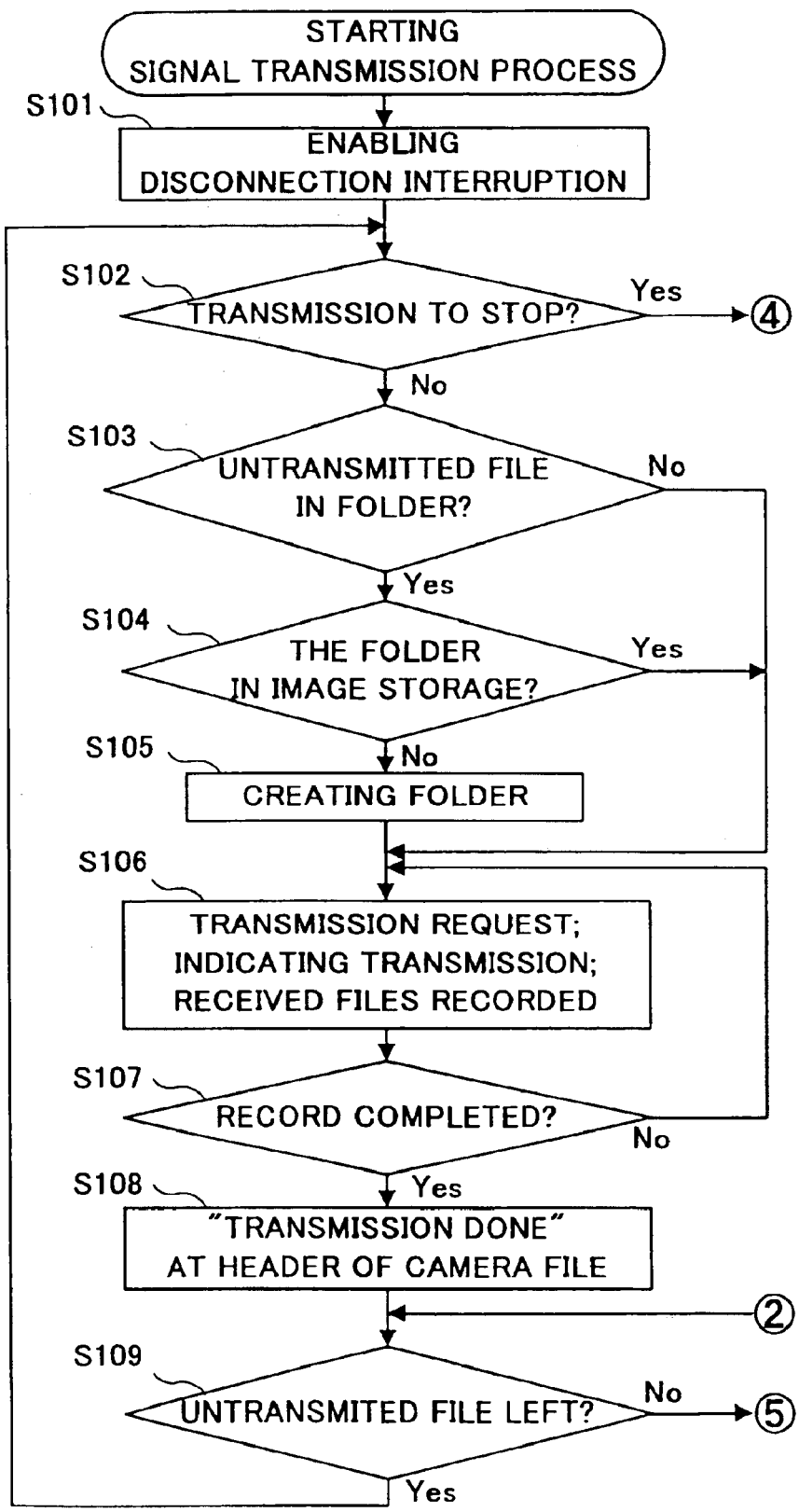
FIG. 8 is an exemplary first flowchart illustrating the manner of controlling signal transmission.

At the step S156, the image or audio files from the digital camera 6 are received in photographing or sound recording order, and stored in the "990401-990402" folder in the memory 4f. Referring to FIG. 8, the way to control signal detection at this step is described in detail below.

Figure 11A:
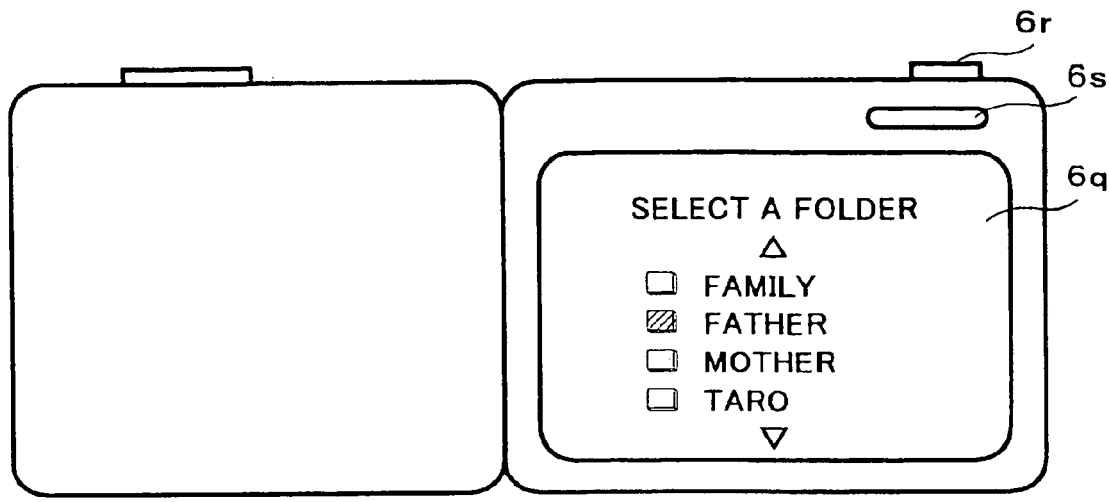
FIG. 11 shows an example of folder made in the memory of the image storage.
Figure 11B:
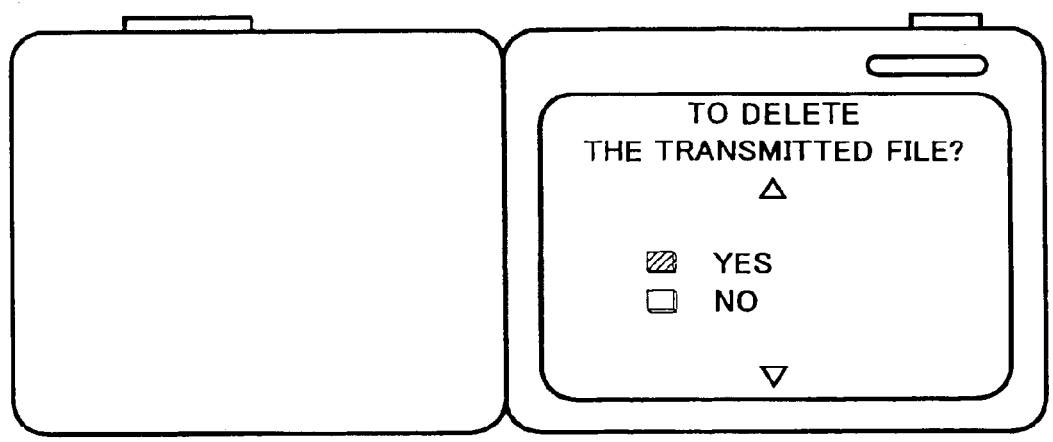
Figure 11C:
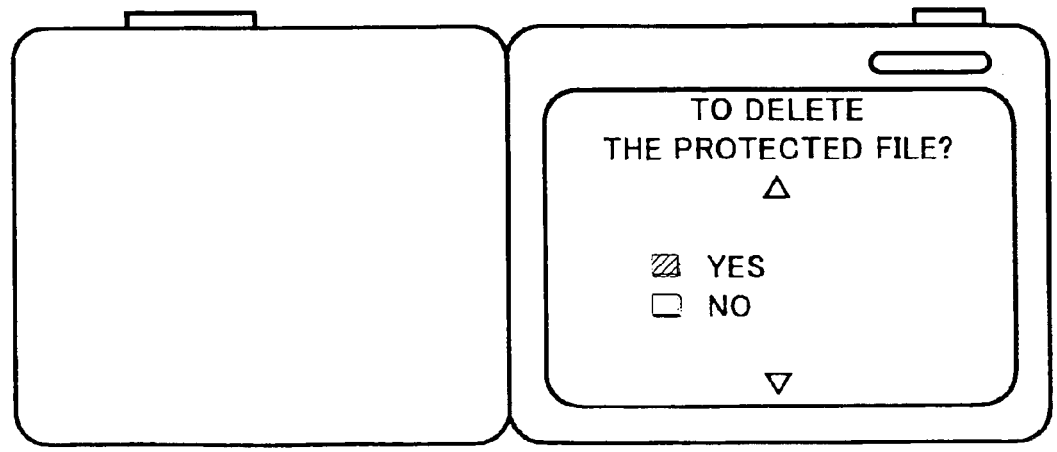

At the step S157, such a display as shown in FIG. 11 is presented with the LCD 6q of the digital camera 6, and a users is asked in what folder the file is to be stored. The display presents choosable folders present in the common folder. By revolving the command dial 6s, a folder is chosen, and, by pressing the release button 6r, the folder chosen is indicated.

At the step S158, whether or not a folder has been chosen is detected. If detected, then the step 160 is followed; if not detected, the step 159 is followed.

At the step S159, whether or not a pre-determined time has passed from the beginning of the inquiry into what folder is to be chosen is detected. If the pre-determined time has passed, the step 161 is followed; if not, the step 157 is recommenced and the inquiry into what folder is to be chosen is resumed.

At the step S160, the folder "990401-990402" in the common folder is, wholly and without change of its folder structure, transferred to the designated (chosen) folder.

At the step S161, whether or not the card memory loaded in the digital camera 6 is written is detected. If unwritten, the step S162 is followed; if written, the step S163 is followed.

At the step S162, by lighting the memory indicator LED 5k in the docking station 5, a user is informed that the card memory loaded in the digital camera 6 is unwritten.

At the step S163, by lighting out the memory indicator LED 5k in the docking station 5, a user is informed that the card memory loaded in the digital camera 6 is written.

At the step S164, the main power supply with the digital camera 6 is switched off. Even when the main power supply with the digital camera 6 had been switched on at the point of connection, the main power supply of the digital camera 6 is switched off at this step.

At the step S165, whether or not the rechargeable battery 6b is loaded in the digital camera 6 is detected. If loaded, the step 166 is followed; if the loaded thing is not the rechargeable battery 6b or the rechargeable battery 6b is not loaded, the step 170 is followed.

In step S166, the charging to the rechargeable battery 6b of the digital camera 6 is started. In step S167, charging the indication LED (light emitting diode) 5m is intermittently energized to inform the user of the status of the rechargeable battery 6b in the process of charging.

In step S168, it is checked whether the charging is completed or not. If the completion of charging is detected, the flow is advanced to step S169. On the other hand, the flow returns to step S166 to continue the charging. In step S169, charging the indication LED 5m is continuously energized to inform the user of the completion of the charging to the rechargeable battery 6b. In step S170, the power supply to the docking station 5 is terminated. In step S171, the main power switch of the image storage 4 is turned off to close the present flow.

(b) Transmission of Signals

Figure 9:
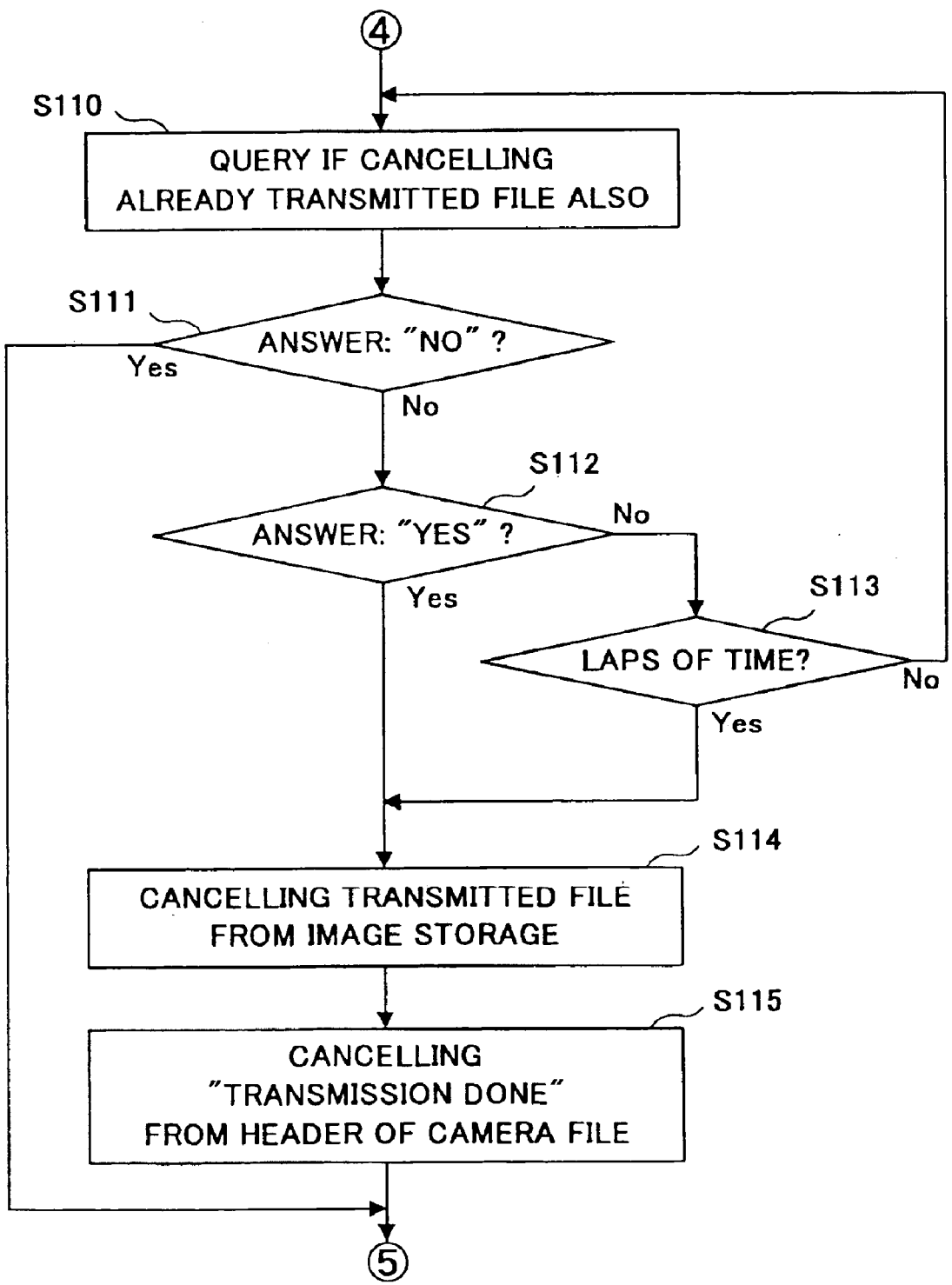
FIG. 9 is an exemplary second flowchart illustrating the manner of controlling signal transmission.
Figure 10:
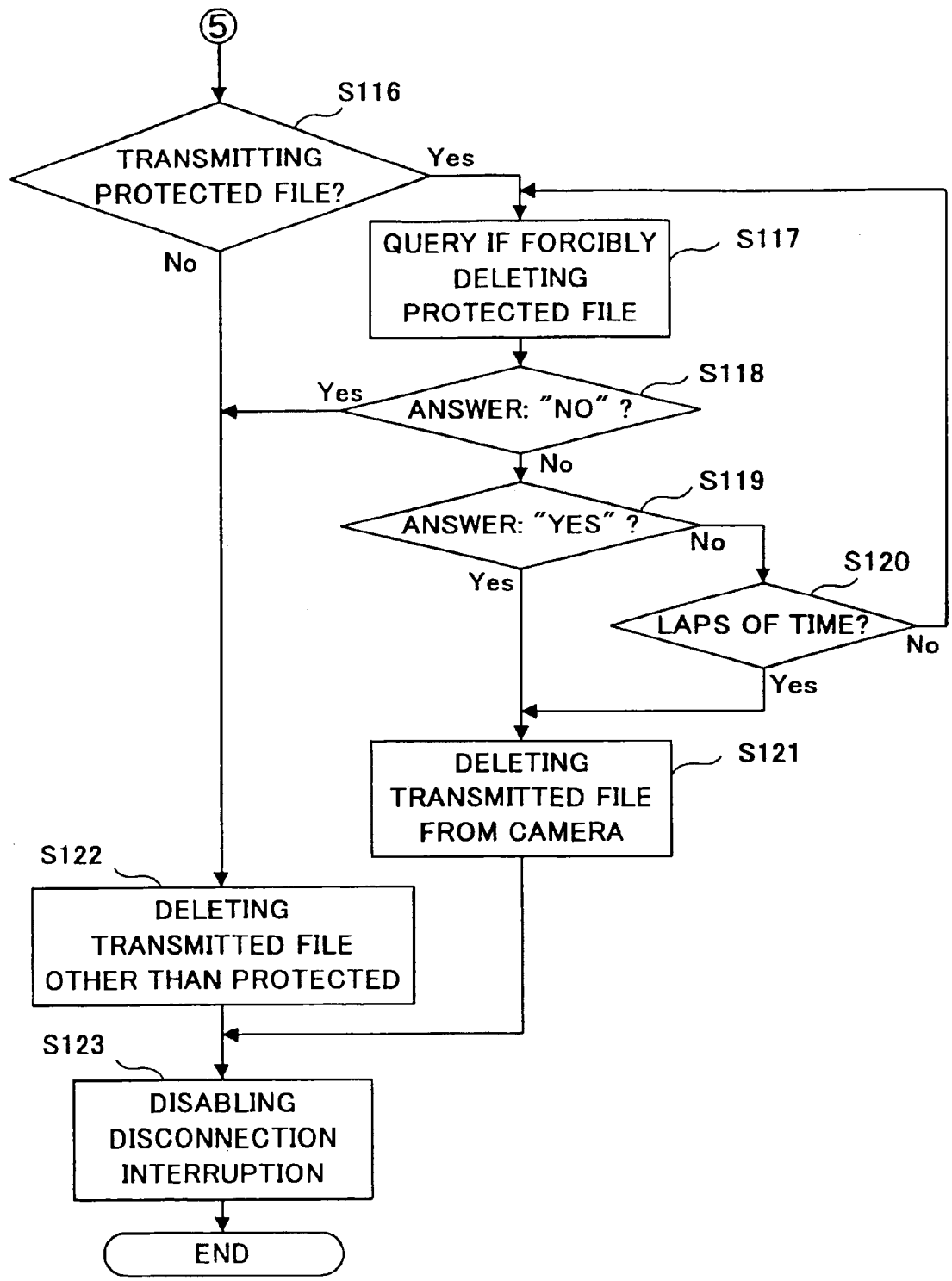
FIG. 10 is an exemplary third flowchart illustrating the manner of controlling signal transmission.

FIGS. 8 to 10 explain the manner of controlling signal transmission in step S156 in FIG. 6.

In step S101, disconnection interruption is enabled, the interruption being carried out when the digital camera 6 will be disconnected from the docking station 5. In step S102, it is checked whether or not the digital camera 6 directs to stop the data transmission, the direction being caused by operating the release button of the digital camera 6. If the date transmission is directed to stop, the flow goes to step S110 in FIG. 9. On the other hand, the flow is advanced to step S103 if the date transmission is not directed to stop.

In step S103, the digital camera 6 is checked for a folder (hierarchical) structure that holds files not transmitted yet. If files not transmitted yet are held in a folder structure, the flow is advanced to step S104. On the other hand, the flow is advanced to step S106 if files not transmitted yet are held without any folder structure.

In step S104, it is checked whether the folder structure has already existed in the image storage 4. If the folder structure has existed, the flow is advanced to step S106. On the other hand, the flow is advanced to step S105 if the folder structure has not existed yet.

In step S105, a new folder is further created within the folder "990401-990402" which has been created in step S154 in FIG. 6. In step S106, the digital camera 6 is directed to transmit new files, which are received and stored in the folder created in steps S154 and 105.

Thus, the folder structure holding files in the digital camera 6 will be took over by the image storage 4 without destruction of the original folder structure, which is convenient for the user to search for the stored files.

Further, in step S106, the digital camera 6 is directed to inform the user of the status in the process of data transmission by means of LCD 6q of the digital camera 6.

In step S107, it is checked whether the data transmission from the digital camera 6 to the image storage 4 is completed or not. If the completion of data transmission is detected, the flow is advanced to step S108. On the other hand, the flow returns to step S106 to continue the data transmission if the completion of data transmission is not detected.

In step S108, the digital camera 6 is directed to add to the header of the transmitted file therein the information indicating that the transmission of the file has been completed. In steps S121 and S122 in FIG. 10, the file will be deleted from the digital camera 6 in dependence on the added information. The flow is to be advanced from step S108 to step S109.

In step S109, it is checked whether files capable to be treated by the image storage 4 still remain to be transmitted in the digital camera 6. If files remain to be transmitted, the flow is returned to step S102. On the other hand, the flow is advanced to step S116 if no file remains to be transmitted.

If the direction to stop the data transmission is detected in the above mentioned step S102, a question at LCD 6q of the digital camera 6 as in FIG. 11 is made in step S110 to ask the user whether or not the transmission of all the files including already transmitted files should be cancelled.

Step S111 checks the answer of the user to the question in step S110 for "No". If the answer, "No" is detected, the flow goes to step S116. On the other hand, the flow is advanced to step S112 if the answer, "No" is not detected. The answer, "No" of the user means that the already transmitted files should not be cancelled.

Step S112 checks the answer of the user to the question in step S110 for "Yes". If the answer, "Yes" is detected, the flow goes to step S114. On the other hand, the flow is advanced to step S113 if the answer, "Yes" is not detected. The answer, "Yes" of the user means that the user mounts the digital camera 6 on the docking station 5 for the purpose of only charging the camera without data transmission. For answering the question, the use is to select "Yes" or "No" by rotating the command dial 6s and press release button 6r to enter the selected answer.

In step S114, the files and folder transmitted this time, and also the folder, "990401-990402" created this time are all deleted from the memory 4f of the image storage 4.

In step S115, the digital camera 6 is directed to cancel the information which has been add to the header of the transmitted file to indicate that the transmission of the file has been completed.

In step S113, it is checked whether a predetermined time has passed or not after the direction to stop the data transmission. If the time has not passed yet, the flow is returned to step S110 to wait for the answer. If the time has passed, on the other hand, the flow is advanced to step S114 on the assumption that the direction to stop the data transmission at step S102 was made because user mounts digital camera 6 on the docking station 5 for the purpose of only charging the camera without data transmission.

In step S116, it is checked whether a protected file is transmitted or not. If a protected file is transmitted, the flow is advanced to step S117, while the flow is advanced to step S122 if a protected file is not transmitted. The digital camera 6 has a "protection" function of file management for preventing a protected file from being deleted out of the memory card in error. Ordinarily, a protected file cannot be deleted unless the protection function is cancelled.

In step S117, a question is indicated at LCD 6q as in FIG. 11 to ask whether the protected file is to be deleted. Step S118 checks the answer of the user to the question in step S117 for "No". If the answer, "No" is detected, the flow goes to step S122. On the other hand, the flow is advanced to step S119 if the answer, "No" is not detected.

Step S119 checks the answer of the user to the question in step S117 for "Yes". If the answer, "Yes" is detected, the flow goes to step S121. On the other hand, the flow is advanced to step S120 if the answer, "Yes" is not detected.

In step S120, it is checked whether a predetermined time has passed or not after the question is started to be indicated at LCD 6q to ask whether the protected file is to be deleted. If the time has not passed yet, the flow is returned to step S117 to wait for the answer. If the time has passed, on the other hand, the flow is advanced to step S121. In this design, a protected file in the digital camera 6 which has been successfully transmitted to the image storage 4 is to be deleted unless an answer is especially made to the contrary, for always making use of the maximum capacity of the memory card in the digital camera 6.

In step S121, all the already transmitted files are deleted from the digital camera 6 in response to the information add in step S108 to the header of the transmitted file. In step S122, files that have been already transmitted and are not protected are deleted from the digital camera 6 in response to the information add in step S108 to the header of the transmitted file and also to the protection information. In step S123, the disconnection interruption is disabled to close the present flow.

(c) Disconnection During Data Transmission.

Figure 12:
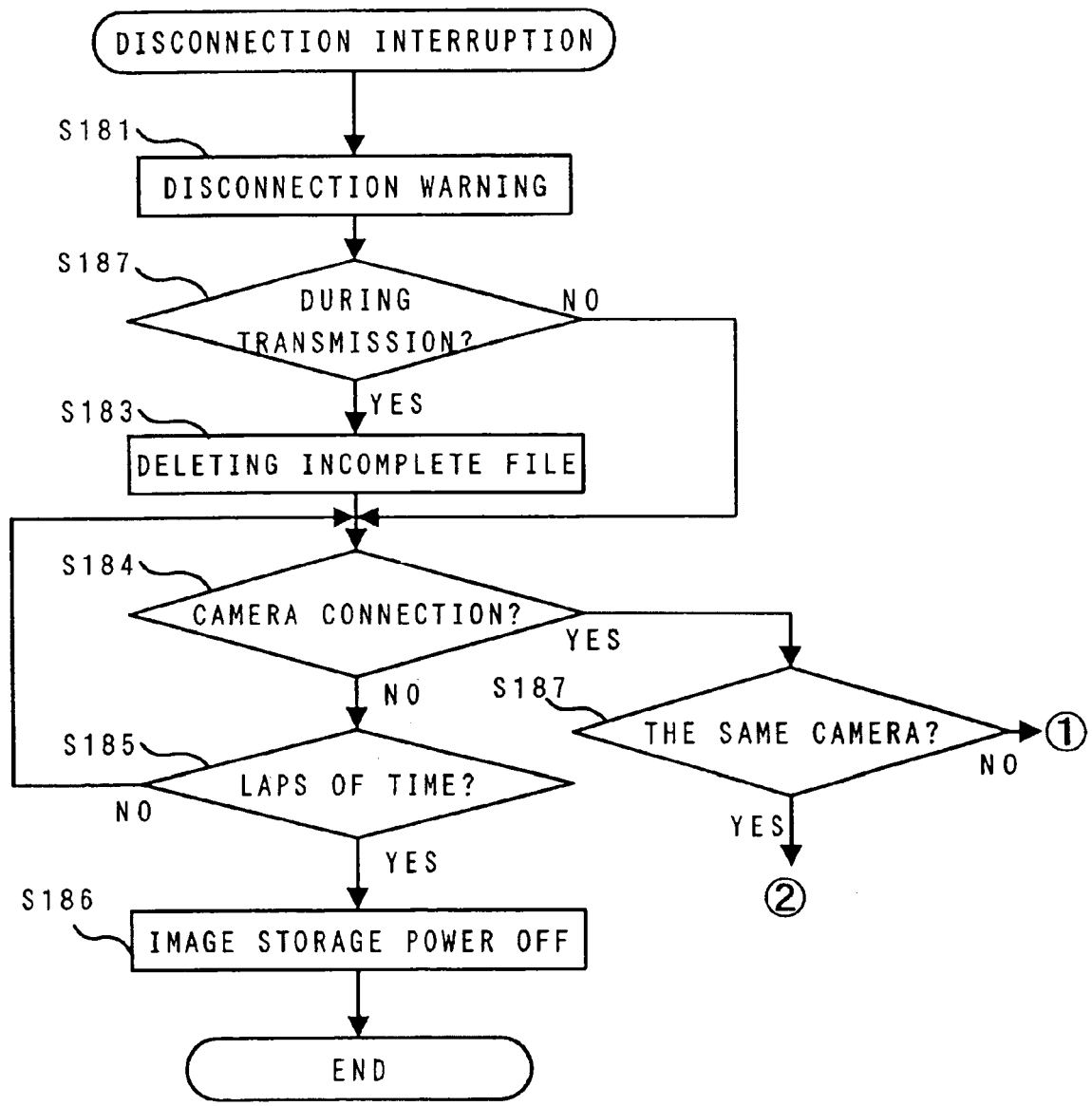
FIG. 12 is an exemplary flowchart illustrating disconnection interruption.

FIG. 12 explains the disconnection interruption. This flow starts in response to disconnecting the digital camera 6 from the docking station 5 with the disconnection interruption enabled.

In step S181, warning of disconnection without completing the data transmission is made at the display on the digital camera 6 for recommending the user to mount the camera again. Step S182 checks whether such a file exists in the memory 4f that the transmission thereof is unfinished by reason of the disconnection in the course of the data transmission. If such a file exists, the flow is advanced to step S183, while the flow goes to step S184 if such a file does not exist.

In step S183, the file in the memory 4f that the transmission thereof is unfinished is removed. Step S184 checks whether the digital camera 6 is mounted again on the docking station 5 for the connection. If the connection is detected, the flow is advanced to step S187, while the flow goes to step S185 if the connection is not detected.

Step S187 checks whether the digital camera mounted again is the same digital camera 6 or not. In the case of the same digital camera 6, the flow is advanced to step S109 in FIG. 8, while the flow goes to step S152 in FIG. 6 in the case of a different digital camera.

In step S185, it is checked whether a predetermined time has passed or not after the disconnection. If the time has passed, the flow is advanced to step S186, while the flow returns to step S184 if the time has not passed yet. In step S186, the main power switch of the image storage 4 is turned off to close the present flow.

In the above mentioned First Embodiment, all the correctly transmitted files are deleted from the digital camera 6 at once after completing the transmission of all of them. However, such a modification is possible that each file is deleted after completing the transmission of it one by one. Further, the file is actually deleted from the digital camera in First Embodiment. However, it is possible to merely add information of permitting the deletion to the header of the file to be deleted in place of actually deleting the file, in the case of a digital camera capable of overwriting a new file on the file to be deleted.

Such a modification is further possible that the main body 1 of television set is designed to be capable of detecting the mounting of the digital camera 6, in place of the detection by the image storage 4 in First Embodiment.

The functions of flow charts, which is carried out by the CPU 4e in the image storage 4 according to the above mentioned embodiment, can be alternatively carried out by the CPU 1h in the main body 1 of the television set.

(d) Modification of the Function on Disconnection During Data Transmission.

Figure 13:
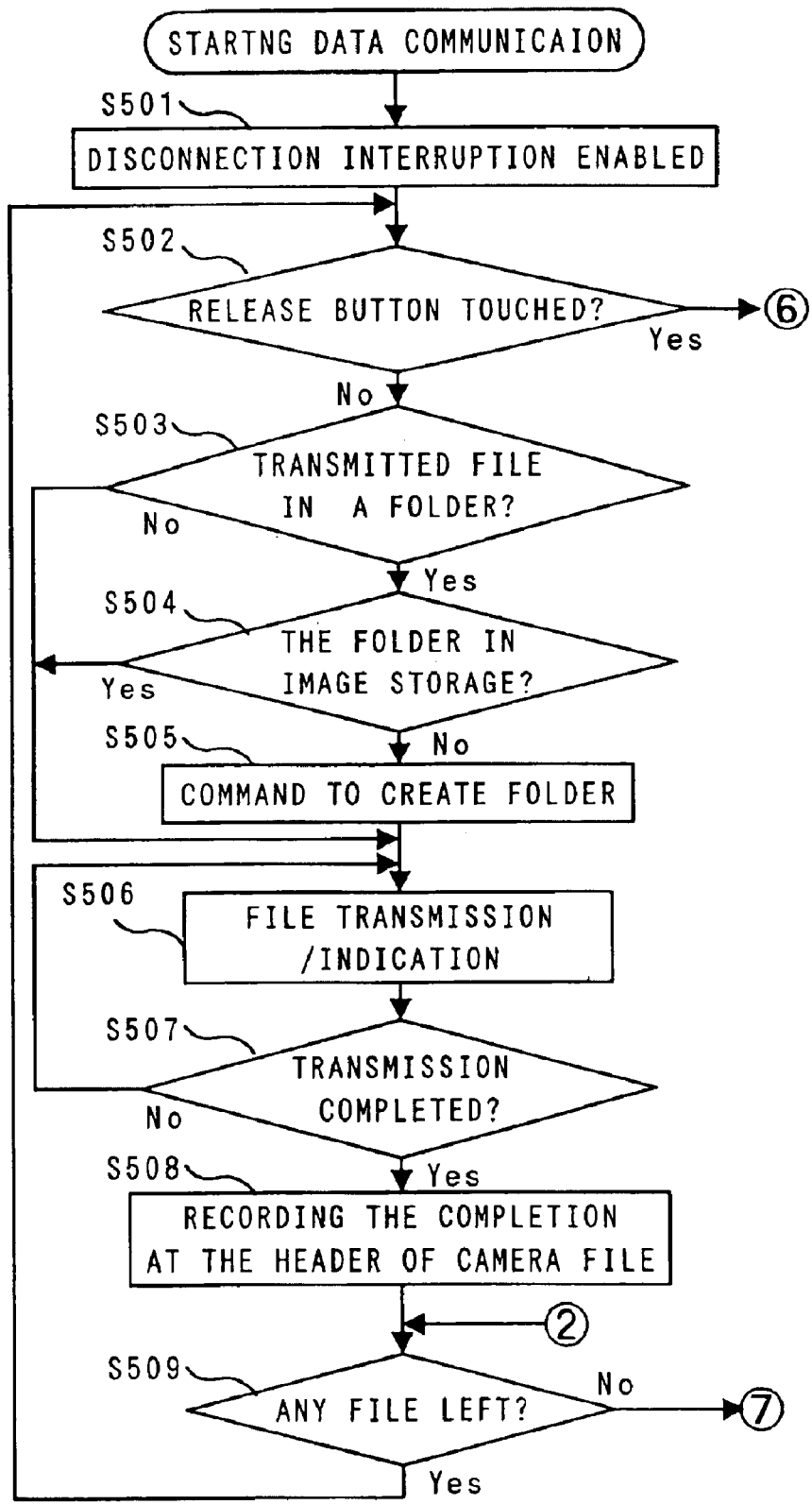
FIG. 13 is an exemplary first flowchart illustrating the manner of controlling signal transmission that is different from FIGS. 7, 8 and 9.
Figure 14:
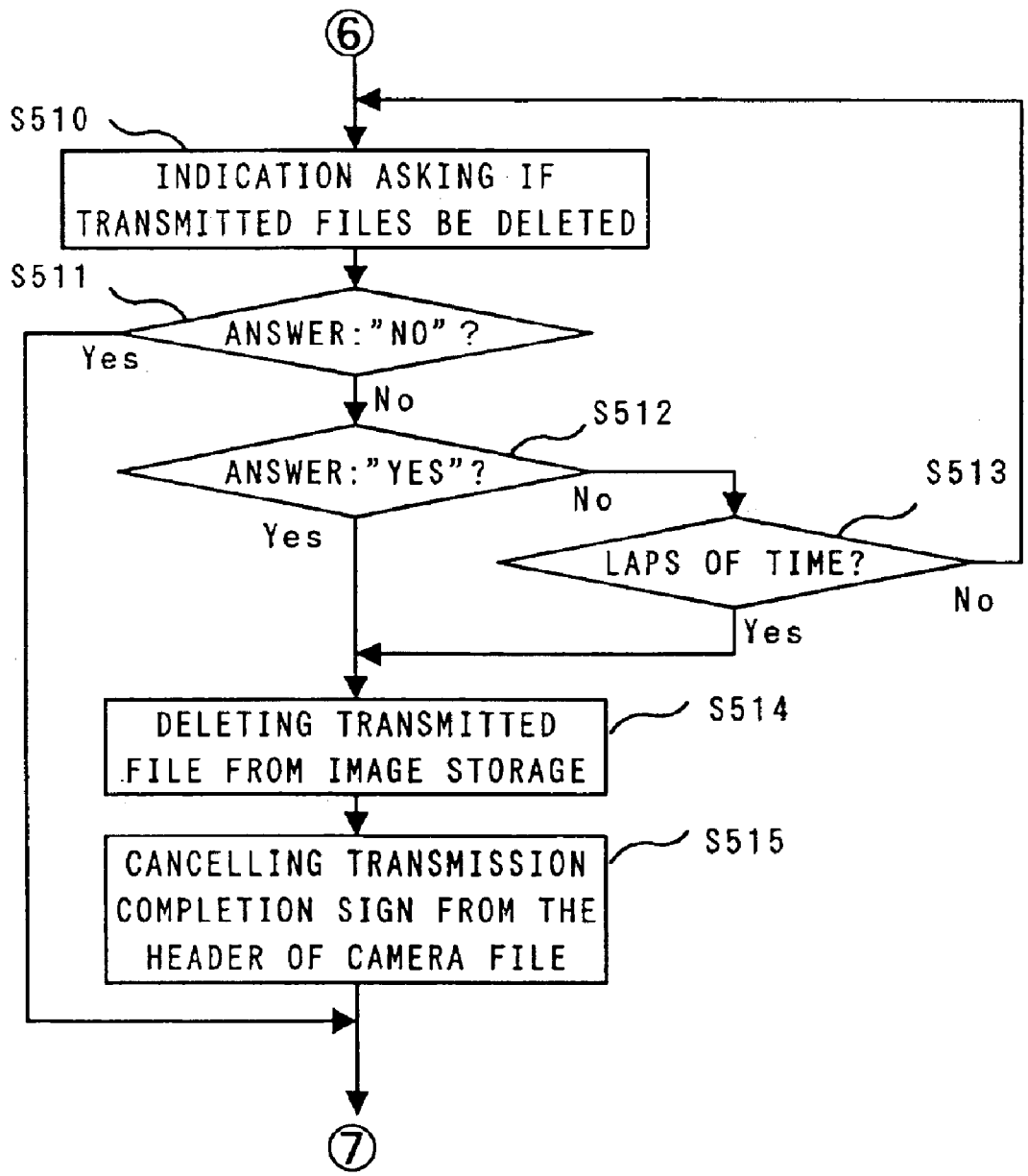
FIG. 14 is an exemplary second flowchart illustrating the manner of controlling signal transmission that is different from FIGS. 7, 8 and 9.

The CPU 6h in the digital camera 6 can alternatively carry out the functions of flow chart shown in FIG. 8 on the disconnection during data transmission. FIG. 13 explains this modification in which the CPU 6h in the digital camera 6 carries out the functions.

In step S501, the disconnection interruption is enabled, the interruption being carried out when the digital camera 6 will be disconnected from the docking station 5. The disconnection interruption can be understood in accordance with FIG. 12.

In step S502, it is checked whether or not the digital camera 6 directs to stop the data transmission, the direction being caused by operating the release button of the digital camera 6. If the date transmission is directed to stop, the flow goes to step S510. On the other hand, the flow is advanced to step S503 if the date transmission is not directed to stop.

In the step S503, it is checked whether the structure of the folder in which such a file is stored that the transmission thereof is unfinished has hierarchical structure or not. If the folder has hierarchical structure, the flow is advanced to the step S504, otherwise the flow is advanced to the step S506.

In the step S504, it is checked whether the folder found in the step S503 has already existed in the image storage 4 or not. If the folder has existed, the flow is advanced to the step S506, otherwise the flow is advanced to the step S505.

In the step S505, an order is given to the image storage 4 that a new folder is to be made inside of the folder "990401-990402" made in the step S154 shown in the FIG. 6, which exists in the memory 4f of the image storage 4.

In the step S506, it is ordered that the file that the transmission thereof is unfinished is transmitted to the image storage 4, and is stored in the folder made in the steps S154 and S505. Therefore, when the file is stored in the hierarchical folder of the digital camera 6, it is convenient to rearrange the file because the recording onto the image storage 4 does not affect the structure of the folder. Further, in the step S506, the digital camera 6 is directed to inform the user of the status in the process of data transmission by means of LCD 6q of the digital camera 6.

In the step S507, it is checked whether the transmission of the file to the image storage 4 has been completed or not. If the transmission has been completed, the flow is advanced to the step S508, otherwise the flow is advanced to the step S506 for continuing the transmission. When the transmission has been completed, it is devised such that the image storage 4 transmits the completion signal to the digital camera 6.

Figure 15:
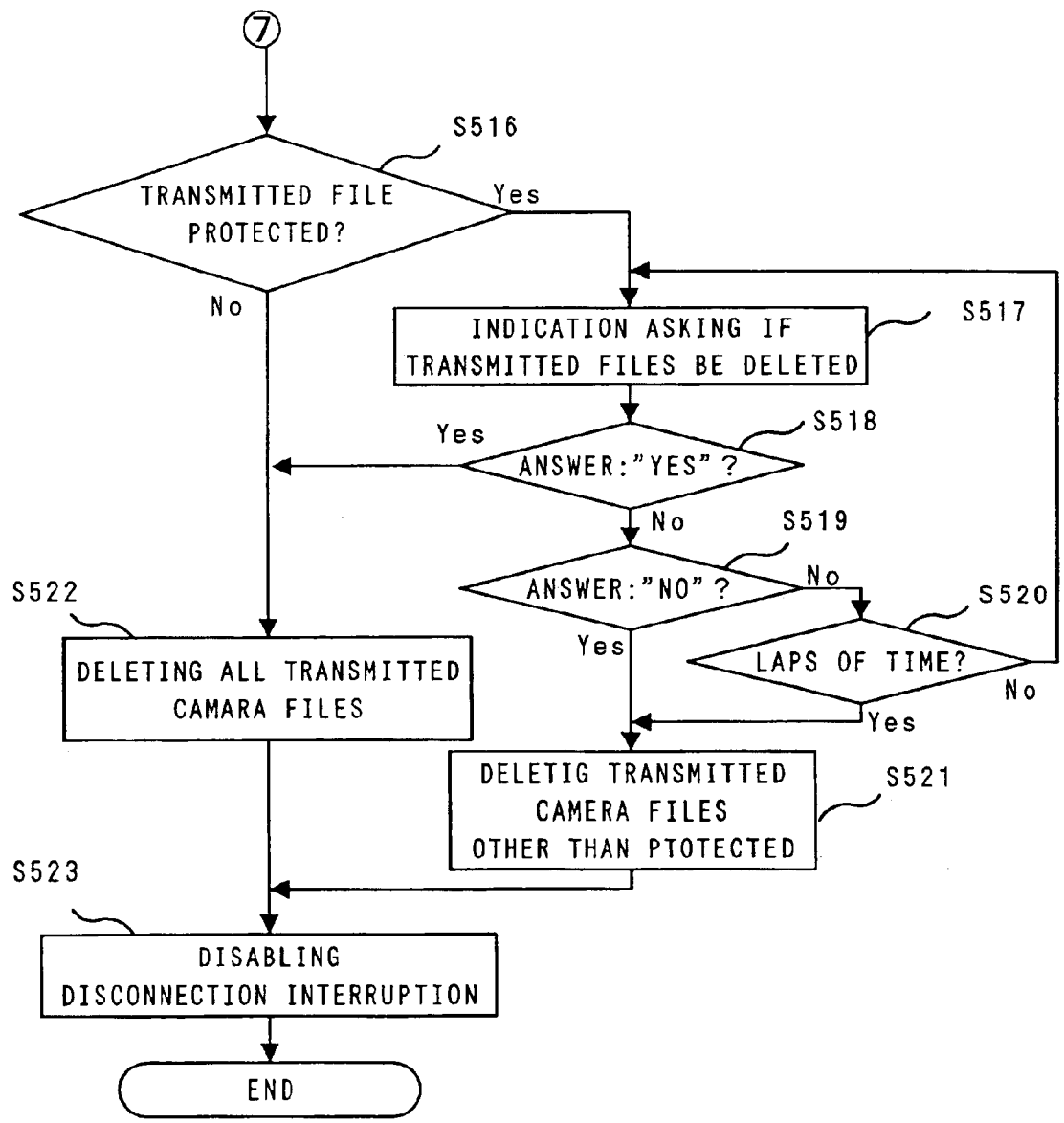
FIG. 15 is an exemplary second flowchart illustrating the manner of controlling signal transmission that is different from FIGS. 7, 8 and 9.

In the step S508, the information indicating the completion of the transmission is added to the header portion of the file inside of the digital camera 6. In the steps S521 or S522 shown in the FIG. 15, the file is deleted in accordance with the added information. Then, the flow is advanced to the step S509.

In the step S509, it is checked whether a transmission-unfinished file being able to be handled by the image storage 4 is still existed in the digital camera 6 or not. If a transmission-unfinished file is existed, the flow is returned to the step S502, otherwise the flow is advanced to the step S516.

In the step S510, a query whether all the transmission of files including transmission-completed files should be cancelled is provided for the user on the LCD 6q of the digital camera 6 shown in FIG. 11.

In the step S511, it is checked whether "no" is detected as the answer of the query provided in the step S510. If "no" is detected, the flow is advanced to the step S516, otherwise the flow is advanced to the step S512. In the case "no files should be left as it is.

In the step S512, it is checked whether "yes" is detected as the answer of the query provided in the step S510. If "yes" is detected, the flow is advanced to the step S514, otherwise is advanced to the step S513. In the case "yes" is detected, it is understood that the digital camera 6 is mounted on the docking station 5 in order to recharge battery.

In the step S514, it is ordered that the file and the folder transmitted this time, together with the folder "990401-990402" should be deleted from the memory 4f of the image storage 4.

In the step S515, the information indicating the completion of the transmission added to the header portion of the file inside of the digital camera 6 is lifted.

In the step S513, it is checked whether a predetermined time has passed or not after the direction to stop the data transmission. If the time has not passed yet, the flow is returned to the step S510 to wait for the answer. If the time has passed, on the other hand, the flow is advanced to the step S514 on the assumption that the direction to stop the data transmission at the step S502 was made because user mounts the digital camera 6 on the docking station 5 only for recharging the camera without data transmission.

In the step S516, it is checked whether a protected file is transmitted or not. If a protected file is transmitted, the flow is advanced to the step S517, while the flow is advanced to the step S522 if a protected file is not transmitted. The digital camera 6 has a "protection" function of file management for preventing a protected file from being deleted out of the memory card in error. Ordinarily, a protected file cannot be deleted unless the protection function is cancelled.

In the step S517, a question is indicated at the LCD 6q as in FIG. 11 to ask whether the protected file is to be deleted.

In the step S518, it is checked whether the answer of the question in the step S517 is "Yes". If the answer "Yes" is detected, the flow is advanced to the step S522. If the answer "Yes" is not detected, on the other hand, the flow is advanced to the step S519.

In the step S519, it is checked whether the answer of the question in the step S517 is "No". If the answer "No" is detected, the flow is advanced to the step S521. If the answer "No" is not detected, on the other hand, the flow is advanced to the step S520.

In the step S520, it is checked whether a predetermined time has passed or not after the question is started to be indicated at the LCD 6*q* to ask whether the protected file is to be deleted. If the time has not passed yet, the flow is returned to the step S517 to wait for the answer. If the time has passed, on the other hand, the flow is advanced to the step S521. In this design, a protected file in the digital camera 6 is not to be deleted unless an answer is especially made to the contrary.

In the step S521, the files that have been already transmitted and are not protected are deleted from the digital camera 6 in response to the information added in the step S508 to the header of the transmitted file and also to the protection information.

In the step S522, all the already transmitted files are deleted from the digital camera 6 in response to the information added in the step S508 to the header of the transmitted file. In the step S523, the disconnection interruption is disabled to close the present flow.

(3) Operation of the Image Storage.

Figure 16:
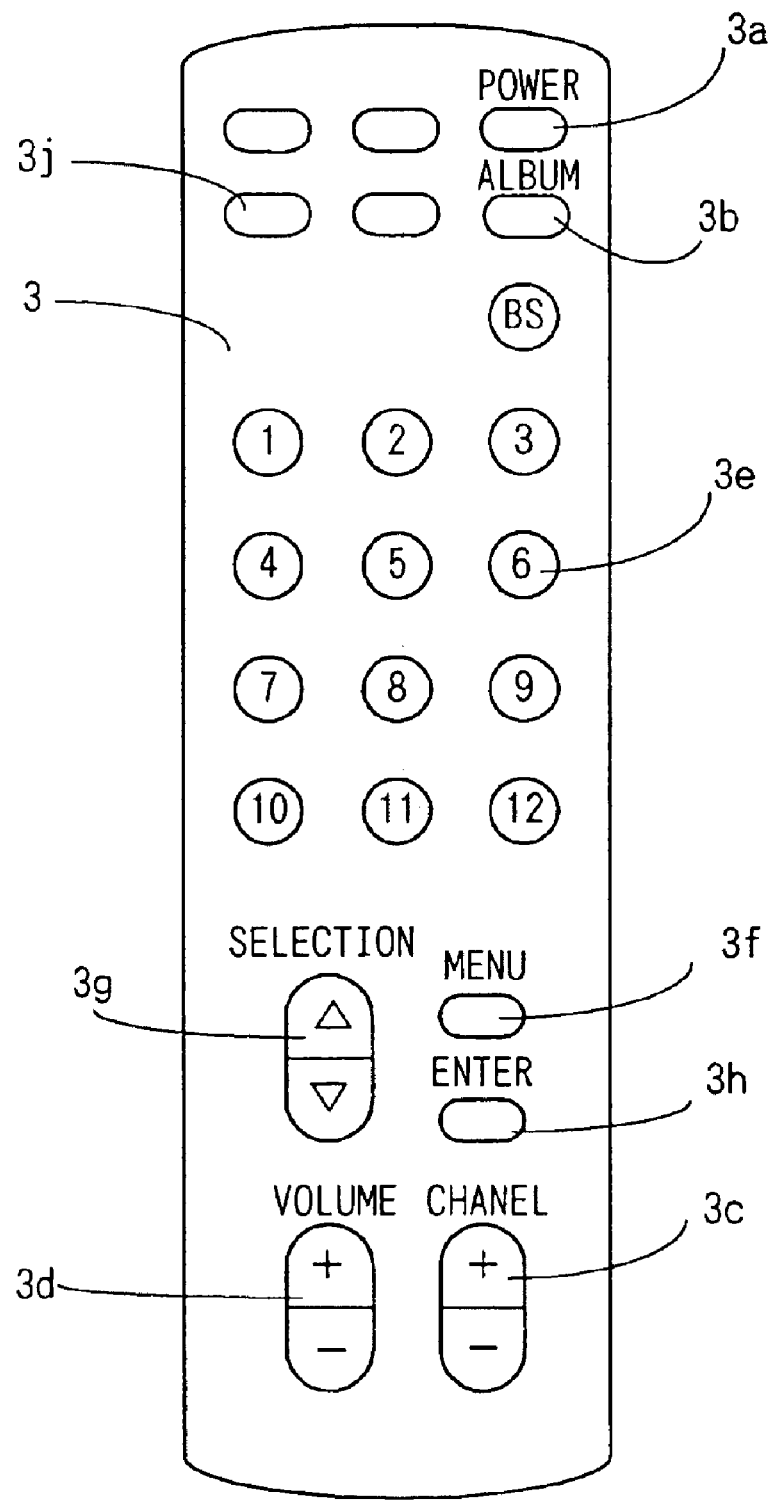
FIG. 16 shows an exemplary remote controller used in First Embodiment.

Operation of the image storage 4 performed by the remote controller 3 is explained specifically. FIG. 16 illustrates the remote controller 3 in detail. When the main body 1 is on standby after receiving a very small current, the main power of the main body 1 is turned on by pressing a power source bottom 3*a* of remote controller 3.

Figure 17:
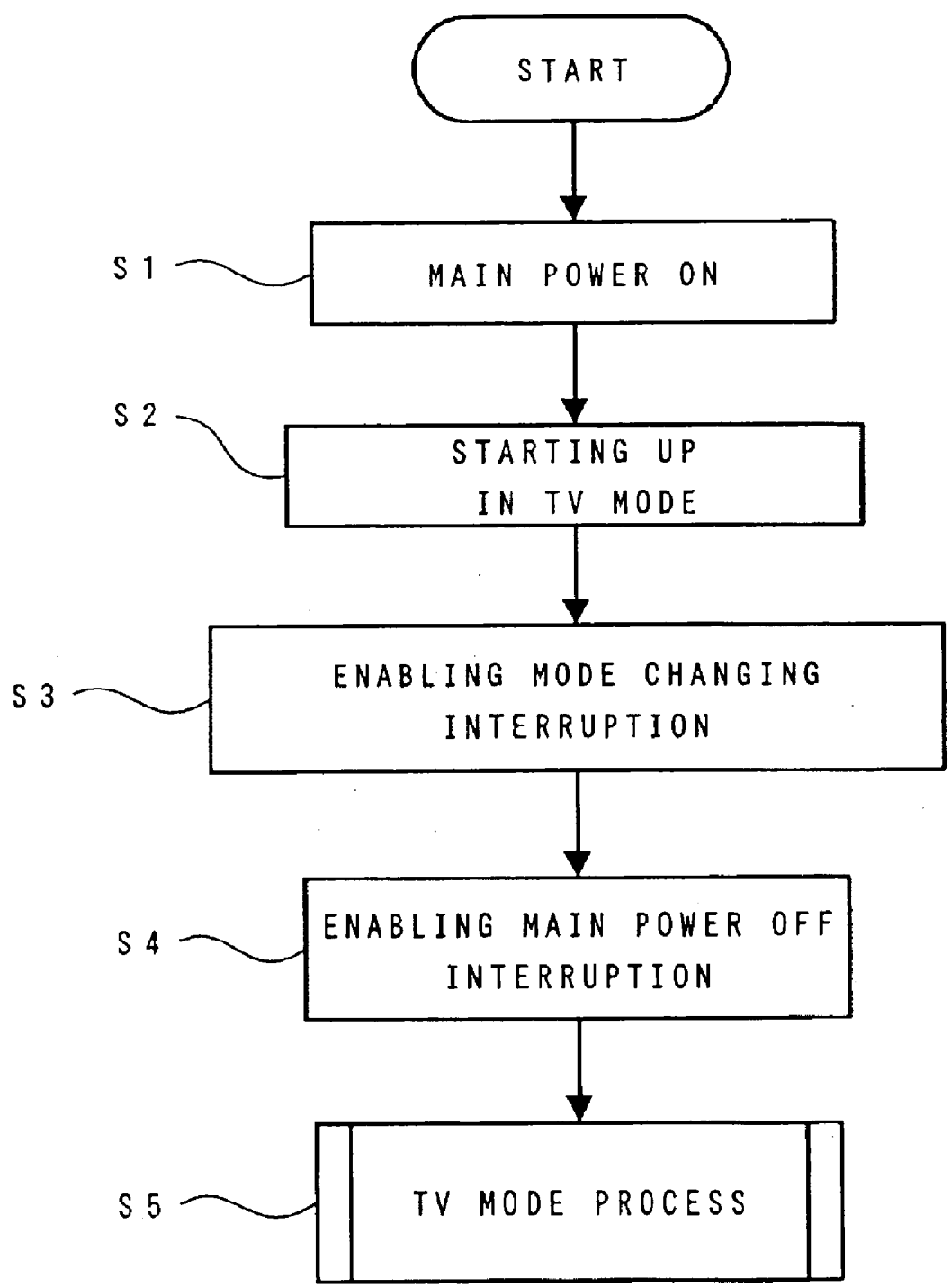
FIG. 17 is an exemplary flowchart showing the basic operation of a main body.

FIG. 17 is an exemplary flow chart showing the basic operation of the main body 1 after main power is turned on. When the main power is turned on in step S1, the main body 1 always starts up in the television mode in step S2. Even if the main power of the main body 1 is turned off in the last mode, as described later, by turning on the main power again, the main body 1 can start up in the television mode. The television mode is a mode in which the television set receives ordinary television broadcasting. Step S3 enables interruption by means of mode change operation, which switches a mode to another mode such as the album mode. Step S4 enables interruption by means of turning off the main power. The flow is advanced to step S5.

In step S5, the operation in the television mode is performed. Information stored in the digital camera 6 is displayed on the monitor 2 for predetermined time (e.g. 5 seconds), superimposed on the current television image. The information of the digital camera 6 displayed on the monitor 2 is as follows: for example, whether or not the digital camera is placed on the docking station 5; a state that digital still image is being transferred from the digital camera to the image storage 4; or a state that the digital camera 6 is being recharged.

Figure 18:
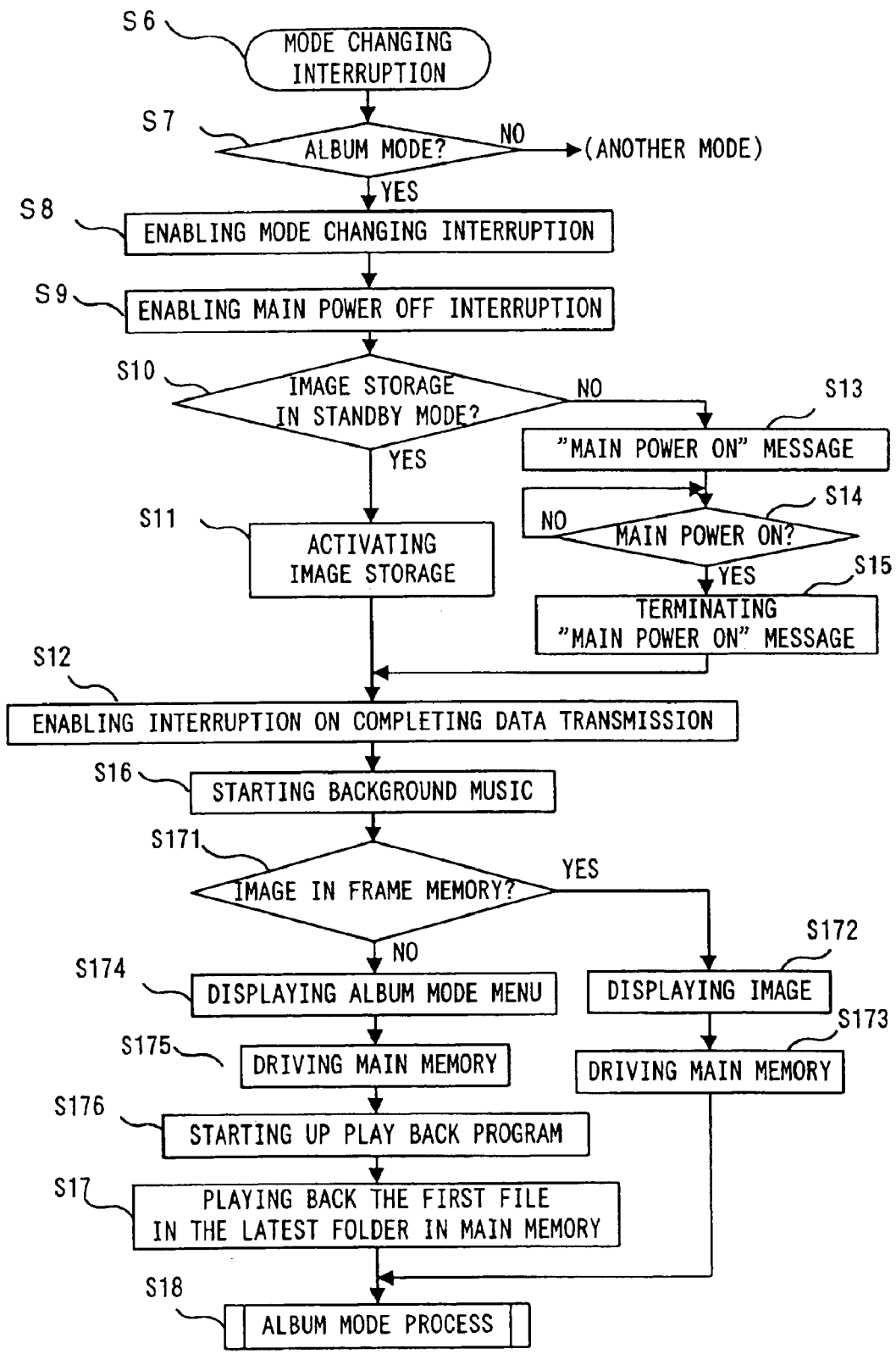
FIG. 18 is an exemplary basic flowchart showing operation in the album mode of First Embodiment.

FIG. 18 is a basic flow chart showing operation in the album mode. When an album mode button 3*b* of remote controller 3, shown in FIG. 16, is pressed, mode change interruption is performed in step S6 in FIG. 18. In step S7, it is determined whether mode change is the album mode in step S7. If mode change is the album mode, the flow is advanced to step S8. If mode change is not the album mode, the flow is advanced to a flow in another mode.

In step S8, the operation that enables the mode change interruption is performed. The mode change interruption is necessary for changing mode from the album mode to another mode, In step S9, operation that enables main-power-off interruption is performed. The main-power-off interruption is necessary for turning off main power.

In step S10, it is determined whether the image storage 4 is on standby after receiving very small current. When it is determined that the image storage 4 is on standby, the flow is advanced to step S11. In step S11, it is instructed that the power source of the image storage 4 is turned on, and the image storage 4 starts up. In step 12, the operation that enables data read out completion interruption is performed. The data read out completion interruption is necessary for reading out data.

On the other hand, in step S10, when it is determined that the image storage 4 is not on standby, the flow is advanced to step S13. In step S13, a message "Turn on the image storage 4" is indicated, and the flow is advanced to step S14. In step S14, it is determined whether print information is included or not. When the image storage 4 is turned on, the flow is advanced to step S15. In step S15, the message "Turn on the image storage 4" is closed, and the flow advances to step S12.

The above embodiment may be modified to an alternative embodiment in which the CPU 1*h* of the main body 1 transmits a control signal to the image storage 4 for turning on the same when the main power of the main body 1 is turned on.

In step S16, in order to avoid the state of no sounds in the album mode, background music starts, resulting in natural feeling.

The background music number is arbitrarily selected from music numbers that have been already selected. Instead of using the background music, it is possible to use television sound directly. It is also possible to perform the album mode in a state without sound, that is, completely in no sound state. Each of these states is arbitrarily selectable.

In step S171, it is determined whether an image is stored in the frame memory 4*m* or not. The image is stored in the frame memory 4*m* in step S87 in FIG. 28. If the images are stored, the flow is advanced to step S172, if not, the flow is advanced to step S174.

Figure 28:
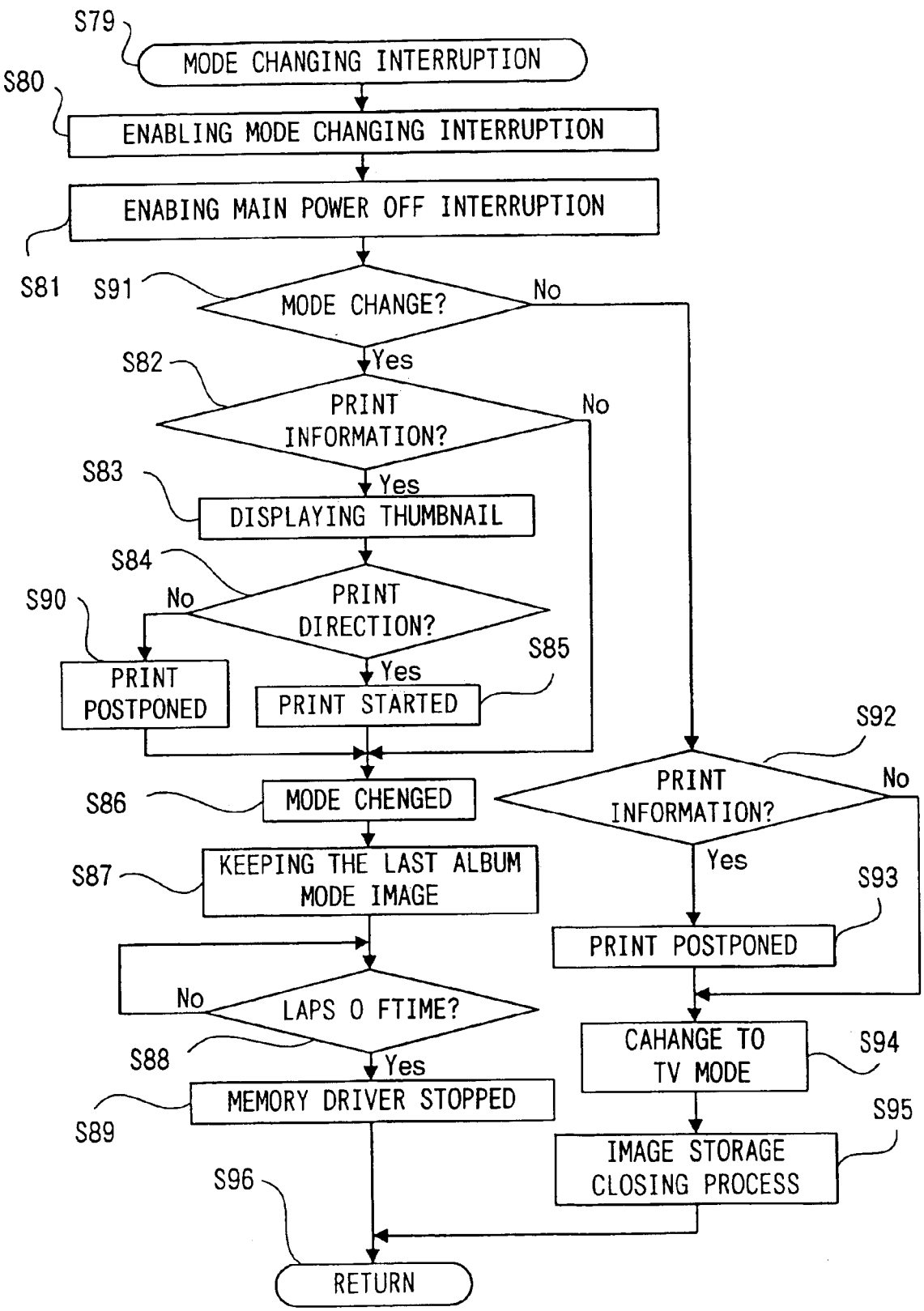
FIG. 28 is an exemplary flowchart showing the operation of termination of the album mode of First Embodiment.

In step S172, the image stored in the frame memory 4*m* in step S87 in FIG. 28 is read out, and is displayed on the monitor 2. The image stored in the frame memory 4*m*, which is a semiconductor memory, is read out instantly and displayed. Accordingly, the period between the time when mode is changed to the album mode and the time when the image is displayed on the monitor 2 can be made very small, so that an operator can view the image comfortably.

In step S173, instruction is transmitted to the memory driver 4*n*, and the memory 4*f* starts, and the flow is advanced to step S18.

When it is determined that the image is not stored in the frame memory 4*m*, in above-mentioned step S171, a menu image of the album mode, which is stored in ROM in advance, is read out and displayed in step S174. The ROM, which is located in the CPU 4*e* in the image storage 4, is a semiconductor memory. The menu image stored in ROM can be read out instantly and displayed.

In step S175, the memory 4*f* is driven after instruction is transmitted to the memory driver 4*n*. In step S176, a regenerative program for image and sound is activated and the flow is advanced to step S17.

In step S17, the first image in the latest folder that is stored into the image storage 4 is reproduced, and is displayed on the screen of the main body 1. That is, the image selected according to a predetermined rule is reproduced by the image storage 4 and displayed automatically, in response to change from the current mode to the album mode.

With regard to the image selected according to the predetermined rule, in stead of using the first image in the latest folder, for example, the image of the latest date of photograph that is captured into the image storage 4 may be used. Thus, the album mode is started up, and then the flow is advanced to the album mode operation in step S18.

Furthermore, in step S174, in stead of above-mentioned operation, it is possible to continue to display in the television mode, and to change to the album mode after reproduction of the image in step S17.

Figure 19:
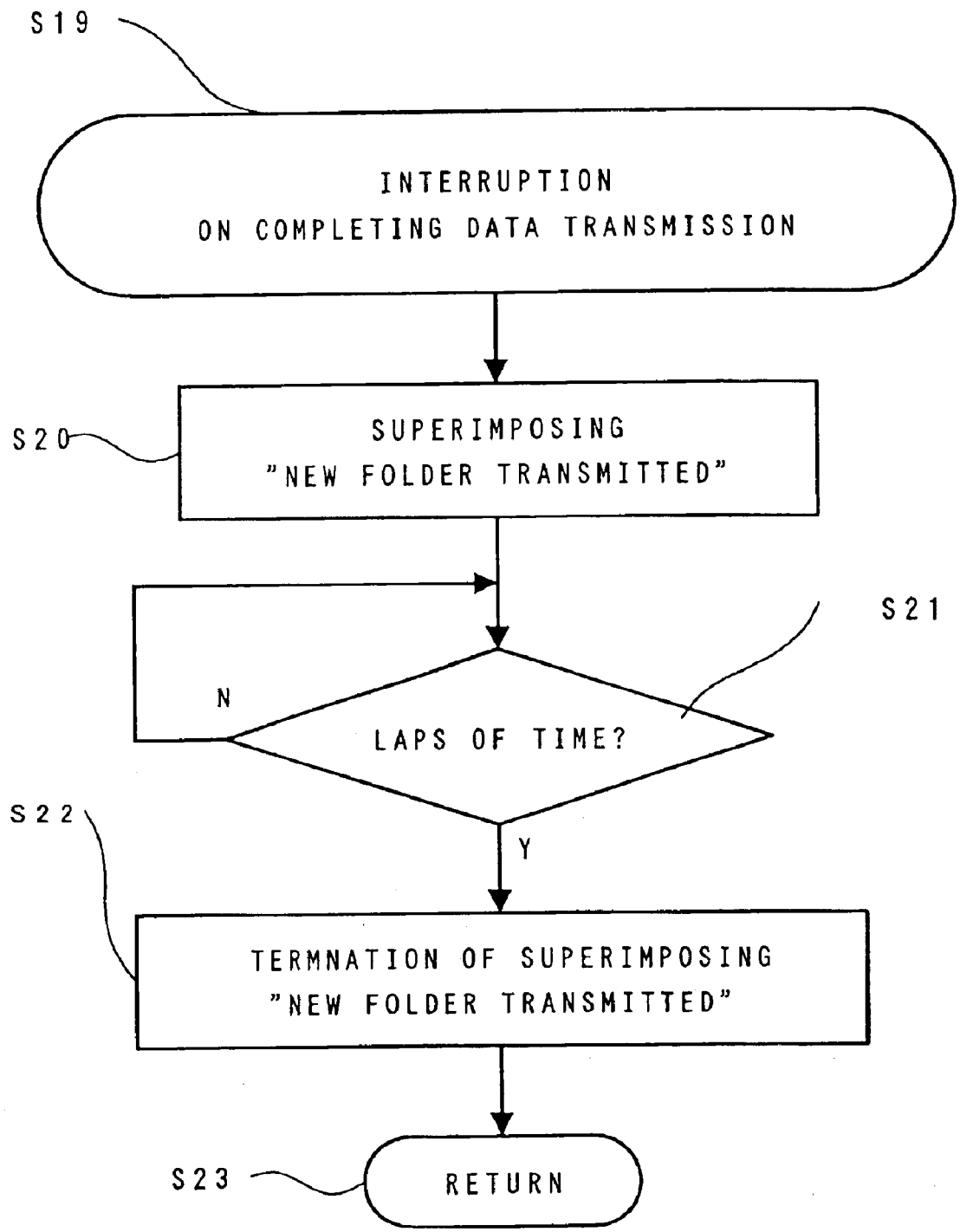
FIG. 19 is an exemplary flowchart showing image acquisition interruption of First Embodiment.

By performing the flow in FIG. 19, it is possible to change the present mode to the album mode while the image storage 4 is taking the images from the digital camera 6. It is also possible to mount the digital camera 6 on the docking station 5 in order to take the images from the digital camera 6 into the image storage 4 while main body 1 is being used in the album mode.

When image acquisition from the digital camera 6 to the image storage 4 is completed before a mode is changed to the album mode, the flow of FIG. 19 is not performed because the first image in the last folder is already displayed in step S17 in FIG. 18.

On the contrary, when image acquisition from the digital camera 6 to the image storage 4 is completed after mode is changed to the album mode, interruption is performed in step S19 in FIG. 1. And the message "the last folder of image files is taken in" is indicated on the monitor 2, being superimposed on the current picture. The indication is being displayed until a counter measures a predetermined time, for example, about 7 seconds, and ends at step S22. In the album mode, the above-mentioned operation works without exception. A user who watches the message can view a new image in the last folder by the operation described later.

Figure 20:
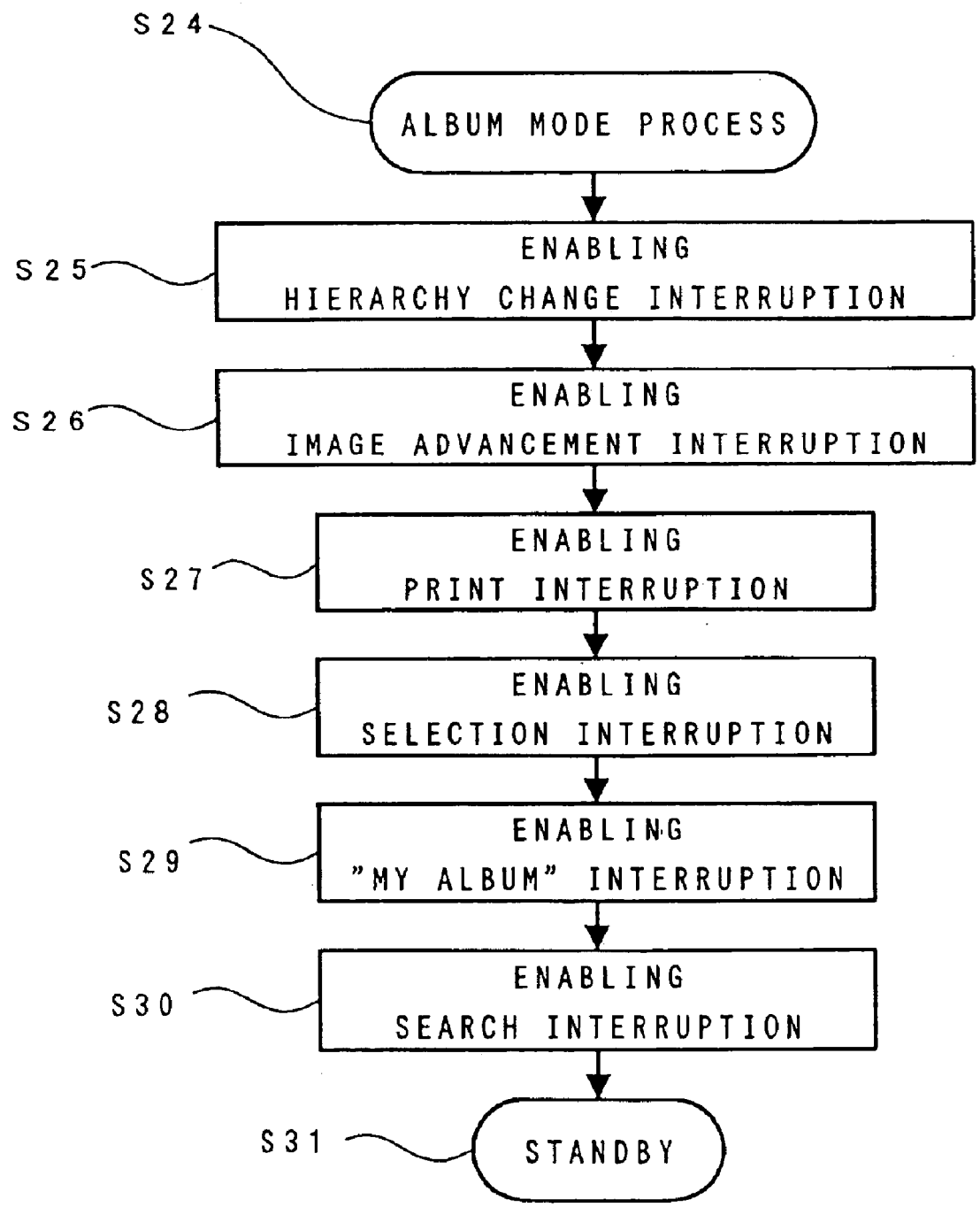
FIG. 20 is an exemplary flowchart showing detailed operation in the album mode of First Embodiment.

FIG. 20 shows the details of the album mode operation in step S18 in FIG. 18. When the image is displayed in step S17 in FIG. 18 responsive to the change to the album mode, the flow of the album mode starts at step S24, subsequent to which steps S25–S30 follow. In step S25 to step S30, various interruptions are possible as described below, and the process becomes standby at step S31. The operation time from the press of a channel button 3c in FIG. 16 to step S31 in FIG. 20 is extremely short.

Figure 21:
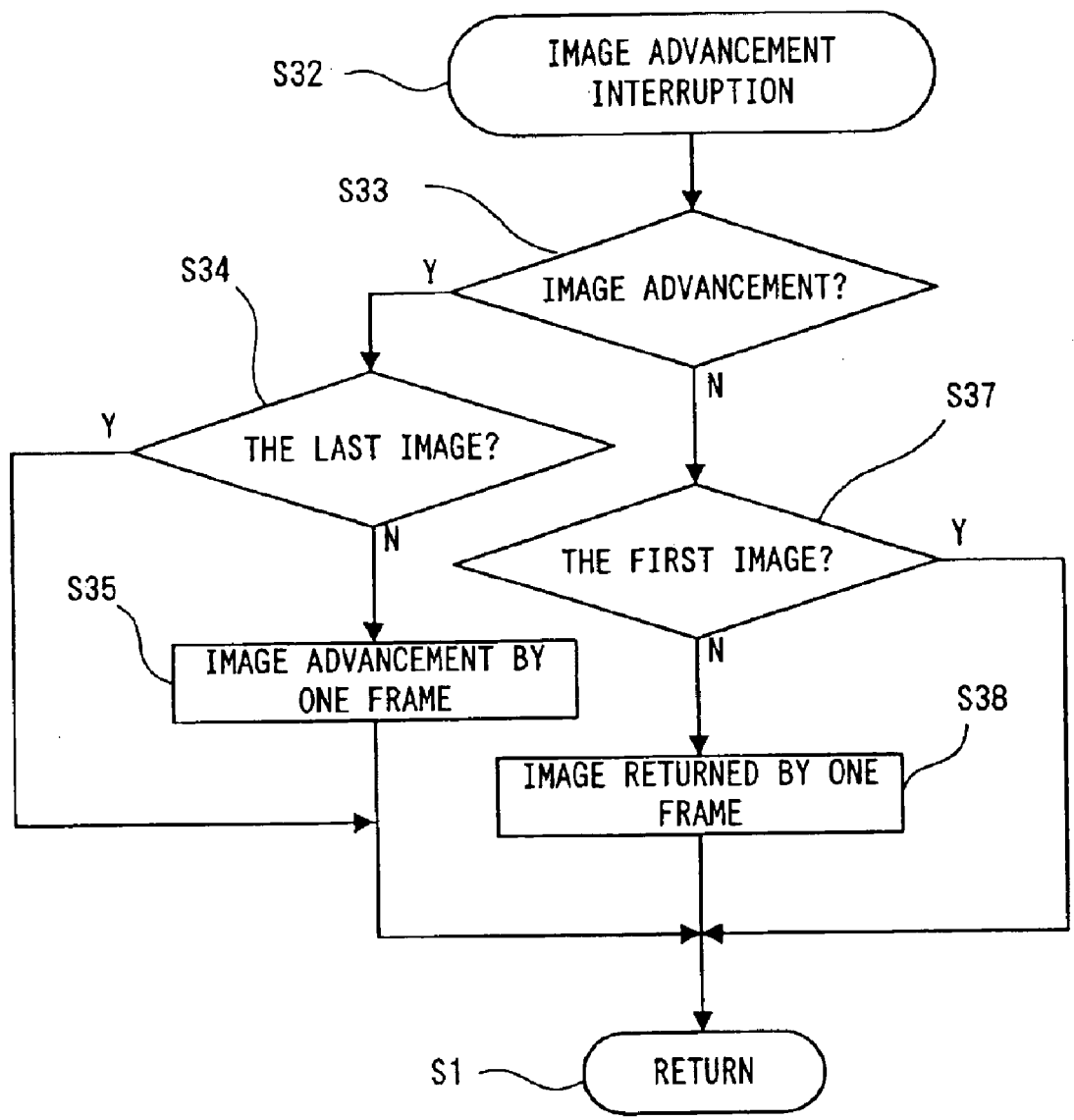
FIG. 21 is an exemplary flowchart showing the operation of advancing the image of First Embodiment.

To advance the image displayed on the monitor 2, the "+" button or the "−" button of the channel button 3c in FIG. 16 is operated. The operation of advancing the image displayed on the monitor 2 is shown in FIG. 21. When the image is displayed on the monitor 4, if the button 3c is pressed, picture-advance interruption is performed in step S32 in FIG. 21 and the process advances to step S33. In step S33, it is determined whether or not pressing of the button 3c is advancing the picture. If the "+" button of the channel button 3c, which is for advancing a picture, is pressed, then it is determined that the pressing of the button 3c is advancing the picture and the process advances to step S34. In step S34, and it is determined whether or not the last picture before pressing the "+" button is the last picture in the folder. If the last picture before pressing the "+" button is not the last picture in the folder, then the process advances to step S35. After one picture is advanced in step S35, the process advances to step S36 and returns.

If the last picture before pressing the "+" button is the last picture in the folder in step S34, then the process advances to step S36 because there is not any picture to advance, and returns in step S36. Accordingly, when the picture is the last picture in the folder, if the "+" button is pressed, any operation does not occur.

In step S33, if the "−" button of the channel button 3c is pressed, then it is determined that the pressing of the button 3c is not advancing the picture, and that the pressing of the button 3c is returning back the picture, and the process advances to step S37.

In step S37, it is determine whether or not the last picture before pressing the channel button 3c is the first picture in the folder. If it is determine that the last picture before pressing the channel button 3c is not the first picture in the folder, then one picture is returned back in step S38 and the process returns in step S36. If the last picture before pressing the channel button 3c is the first picture in the folder, the process advances to step S36 because it is not necessary to return back the picture any more, and returns. Accordingly, when the last picture before pressing the channel button 3c is the first picture in the folder, if the "−" button is pressed, then any operation does not occur.

Although it is considered that the first picture and the last picture in the folder are in the same folder, it is possible to make them to be the first picture and the last picture in all pictures in the image storage 4. In this case, when the first picture in the last folder is displayed on the monitor 2, if the "−" button of the channel button 3c is pressed, the last picture in the folder previous to the last folder is displayed.

If pressing the "−" button of the channel button 3c is repeated, the first picture in the first folder of the image storage 4 appears on the monitor 2. Thus, even if the user does not know an operation for changing hierarchy as described later, the user can view all pictures in the image storage 4.

Figure 22:
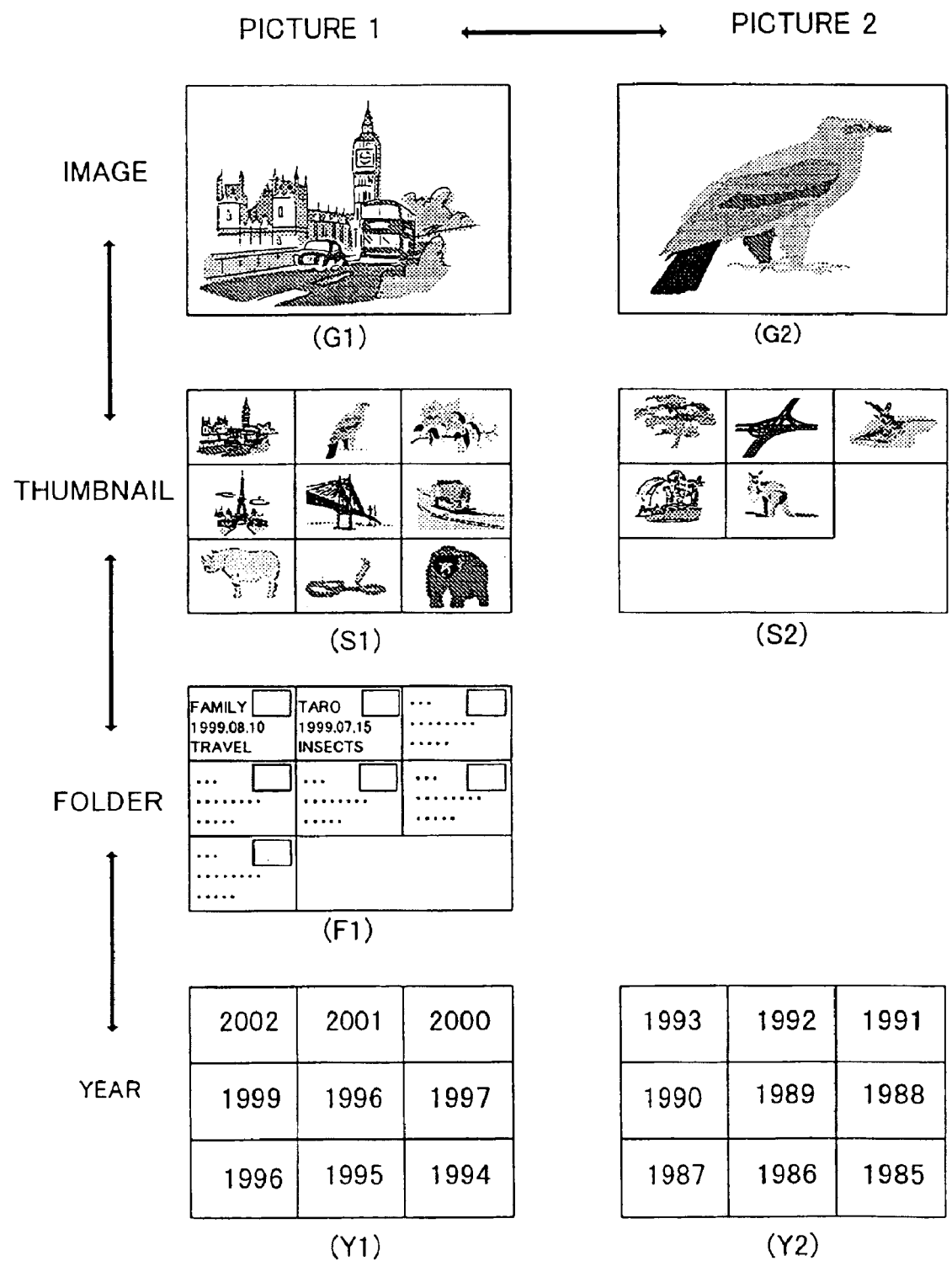
FIG. 22 is an example of display on the monitor that illustrates the operation of changing the hierarchy of First Embodiment.

FIG. 22 shows various kind of indication displayed on monitor 2. G1 and G2 are pictures that are displayed on monitor 2. When the picture G1 is displayed on the monitor 2, if the "+" button of the channel button 3c is pressed, then the picture G2 that is the next picture of the picture G1 is displayed. When the picture G2 is displayed on the monitor 2, if the "−" button of the channel button 3c is pressed, then the picture G1 that is the previous picture of the picture G2 is displayed.

S1 shows nine small size pictures that are displayed in the nine dividend areas on the monitor 2, and S2 shows five small size pictures that are displayed in the nine dividend areas on the monitor 2. S1 and S2 correspond to thumbnail pictures of the digital camera, and here, 14 pictures in total are shown in S1 and S2.

F1 shows seven small size sequential indications that are displayed in the nine dividend areas on the monitor 2. Each indication of F1 has a small picture and textual information of a folder that contains the folder name, date, and the contents of the folder. In this case, there are seven folders.

Y1 or Y2 shows nine small size sequential indications that are displayed in the nine dividend areas on the monitor 2. Each indication of Y1 and Y2 shows one of 18 calendar years.

The image storage 4 controls to display each indication of "thumbnails", "folders" and "calendar years" in each of the nine dividend areas on the monitor 2. When a total number of indications is nine or less than nine, all indications are displayed simultaneously at one time. However a total number of indications is more than nine, the image storage controls to display one different indication representing the nine indications. Accordingly, if there are more than nine folders, a plural of different indications, each of which represents nine folders, are created and displayed in nine areas on the monitor 4 as described above. Since these pictures, thumbnails, folders and calendar years are configured as a hierarchy configuration (hereafter, pictures, thumbnails, folders and calendar years are called "hierarchy").

Figure 23:
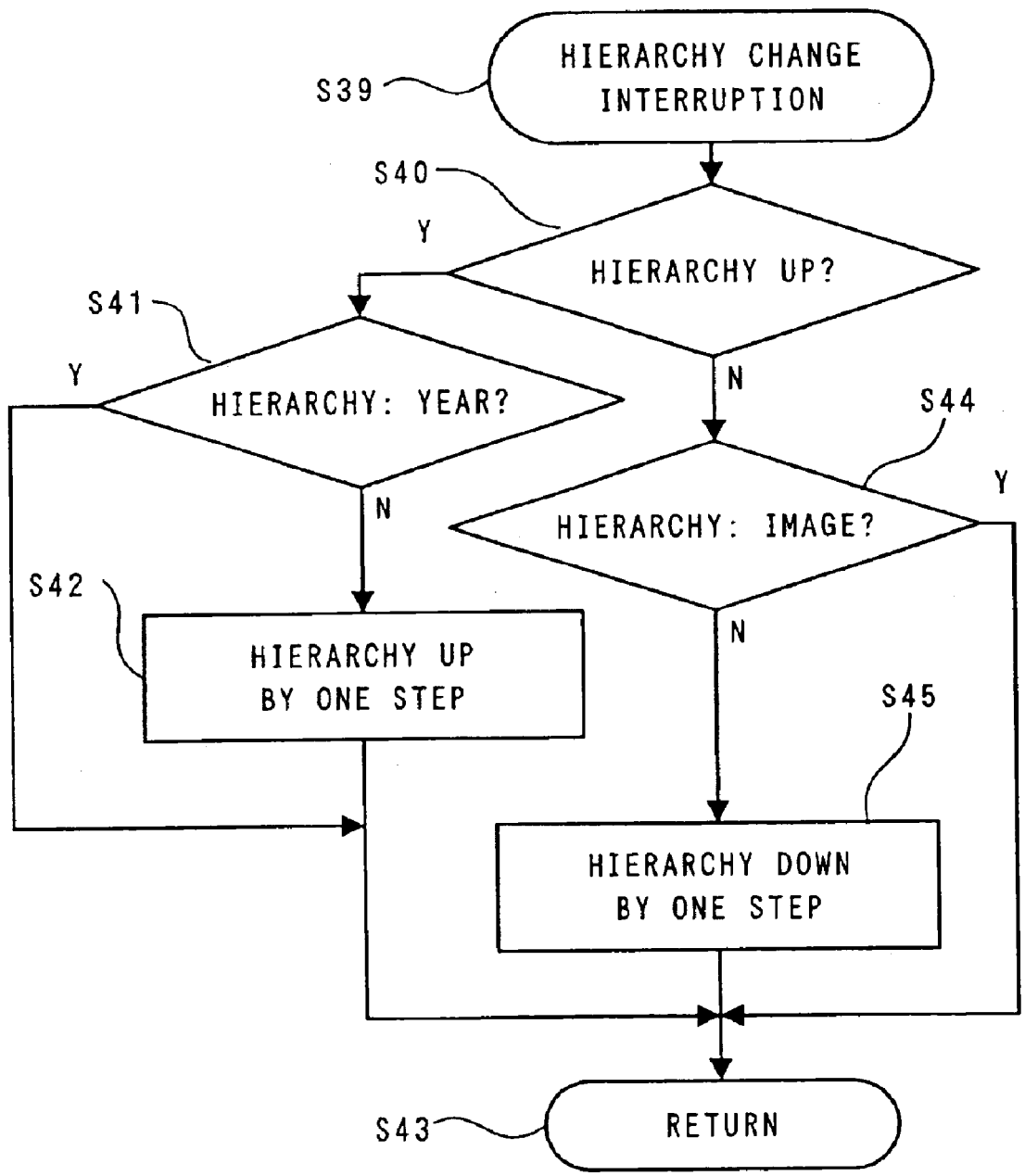
FIG. 23 is an exemplary flowchart showing the operation of hierarchy change.

FIG. 23 is an exemplary flow chart that shows the operation of hierarchy change. Referring to FIG. 23, to change the hierarchy displayed on the monitor 2 in the album mode, the "+" button or the "−" button of a volume button 3d is pressed.

When the indication is displayed on the monitor 2, if the volume button 3d is operated, hierarchy change interruption is performed in step S39. When the "+" button of the volume button 3d is pressed, it is determined that a transfer to the upper hierarchy is instructed in step S40, and the process advances to step S41. In step S41, it is determined whether or not the displayed hierarchy before the volume button 3d is pressed is the calendar year. If the displayed hierarchy is not the calendar year, then the process advances to step S42. In step S42, one hierarchy is stepped up, and the process advances to step S43 and returns.

For example in FIG. 22, when the picture G1 is displayed, if the "+" button of the volume button 3d is pressed, then the thumbnail S1 is displayed instead of the picture G1. In this case, the small picture G1 is placed in the upper left corner of the screen, and small picture G2 is placed on the right of the G1. Other seven pictures are arranged according to this order, and the ninth picture is arranged in the lower right corner of the screen. Alternatively, it is possible to arrange the G1 picture in the center of the screen.

In step S41, if it is determined that the displayed hierarchy is the calendar year, then, even if the "+" button of the volume button 3d is pressed, nothing happens because the calendar year is the highest hierarchy and there is no hierarchy ahead of the calendar year.

In step S40, if the "−" button of the volume button 3d is pressed, then it is determined that a transfer to the upper hierarchy is not instructed, and the process advances to step S44. In step S44, it is determined whether or not the displayed hierarchy before the volume button 3d is pressed is the picture. If the displayed hierarchy before the volume button 3d is pressed is not the picture, then the process advances to step S45. In step S45, one hierarchy is stepped down, and the process advances to step S43 and returns. For example in FIG. 22, the hierarchy transfers to the thumbnail (S1) from the folder (F1). In this case, nine thumbnails of the thumbnail (S1) are contained in the head of the folder that is located in the upper left corner of the screen.

In step S44, if the displayed hierarchy before the volume button 3d is pressed is the picture, then even if the "−" button of the volume button 3d is pressed, nothing happens because the picture is the lowest hierarchy and there is no hierarchy under the picture. And in step S43, the process returns.

Figure 24:
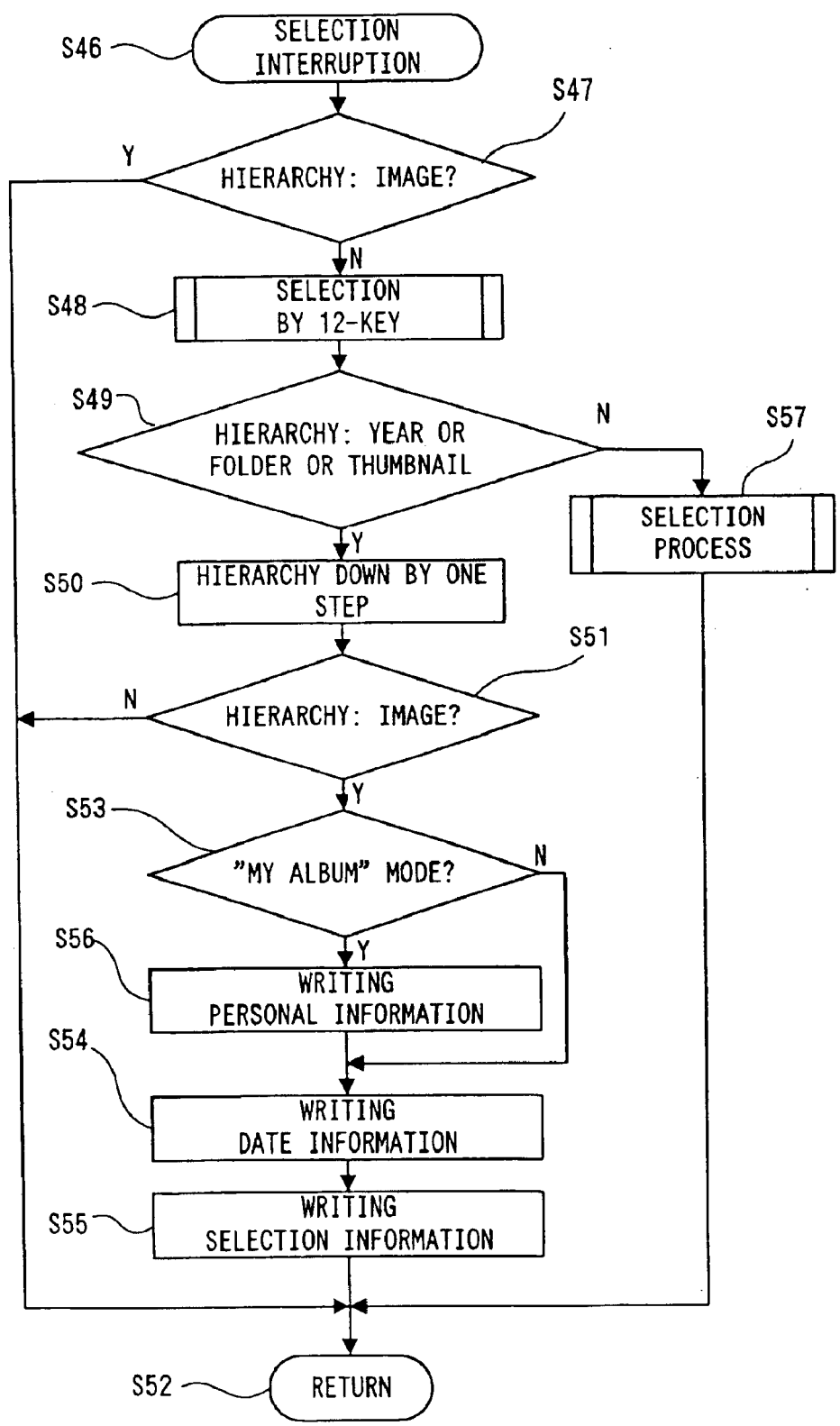
FIG. 24 is an exemplary flowchart showing the selection in the operation of hierarchy change.

FIG. 24 is an exemplary flow chart that shows the operation of Stepping down of the hierarchy is also performed in the selective flow shown in FIG. 24, in stead of using the hierarchy change interruption. For example, when the thumbnail S1 is displayed, if a "2" numeral button 3e is pressed, a frame of the monitor 4 is changed to the picture G2, because the numeral buttons 3e from "1" to "9" correspond to the positions of nine dividend areas on the monitor 4, respectively. By pressing one of the numeral buttons 3e, the corresponding area on the monitor 4 is selected. In FIG. 22, the thumbnail of picture G1 is located at the center of the upper row, and this position corresponds to the "2" numeral button. These operations are described in detail in FIG. 24.

FIG. 24 is an exemplary flow chart that shows the operation of selection in which the calendar year Y2 is used as a clue to search a picture.

When the picture is searched, for example, in the year 1988, a "6" numeral button is pressed because the year 1988 is located at the right in the middle row of the calendar year index Y2. By pressing the "6" button, selection interruption starts in step S46. In step S47, it is determined whether or not the present hierarchy is the picture. If it is determined that the present hierarchy is the picture, then any operation is not performed, and the process advances to step S52 and returns. That is, if what is displayed on the monitor 2 is the picture, there is no room for selection: press of any numeral button 3e causes nothing.

Since the hierarchy is the calendar year, the process advances to step S48 from step S47. In step S48, by pressing the "6" numeral button, all folders created in 1988 are selected and arranged in order according to the creation date.

In step S49, it is determined whether or not the hierarchy is the calendar year, the folder or the thumbnail. In this case, since the hierarchy is the calendar year, the hierarchy is stepped down one step in step S50 and becomes the hierarchy of the folder, thereby causing the monitor 2 to display the folder index F1. The first folder created in 1988 is located in the upper left corner of the folder index F1, and other folders are arranged in order from the left to the right and from the top to the bottom of the screen according to the creation date. In step S51, it is determined whether or not the present hierarchy—the stepped down new hierarchy—is the picture. In the case, since the new hierarchy is the folder, the process advances to step S52 and returns.

In steps from S53 to S56, operation that adds a process history to each picture is performed. In step S51, it is determined whether or not the stepped down hierarchy is the picture. If it is determined that the stepped down hierarchy is the picture, then the process advances to step S53. In step S53, it is determined whether the mode is my-album mode, which is described in detail later.

If it is determined that the mode is not the my-album mode, then the process advances to step S54. In step S54, the date and time of picture selection is written in the header portion of the picture, and the process advances to step S55. In step S55, a search history until the picture is displayed and other selection conditions are written in the header portion of the picture. This information is used as clues to search the same picture later. For example, the same picture can be searched by the search condition of "the image viewed one week ago".

In step S53, if it is determined that the mode is the my-album mode, then the process advances to step S56. In step S56, personal information, for example, a name of a person who searched the picture previously, is written in the header of the picture. This information is used as a clue to search the same picture. In step S49, if it is determined that the hierarchy is not any of the calendar year, the folder or the thumbnail, then the hierarchy is considered to be irrelevant to the predetermined hierarchy, and selection process necessary to select the thing is performed in step S57. For example, typical thing is the personal information in the my-album mode.

Figure 25:
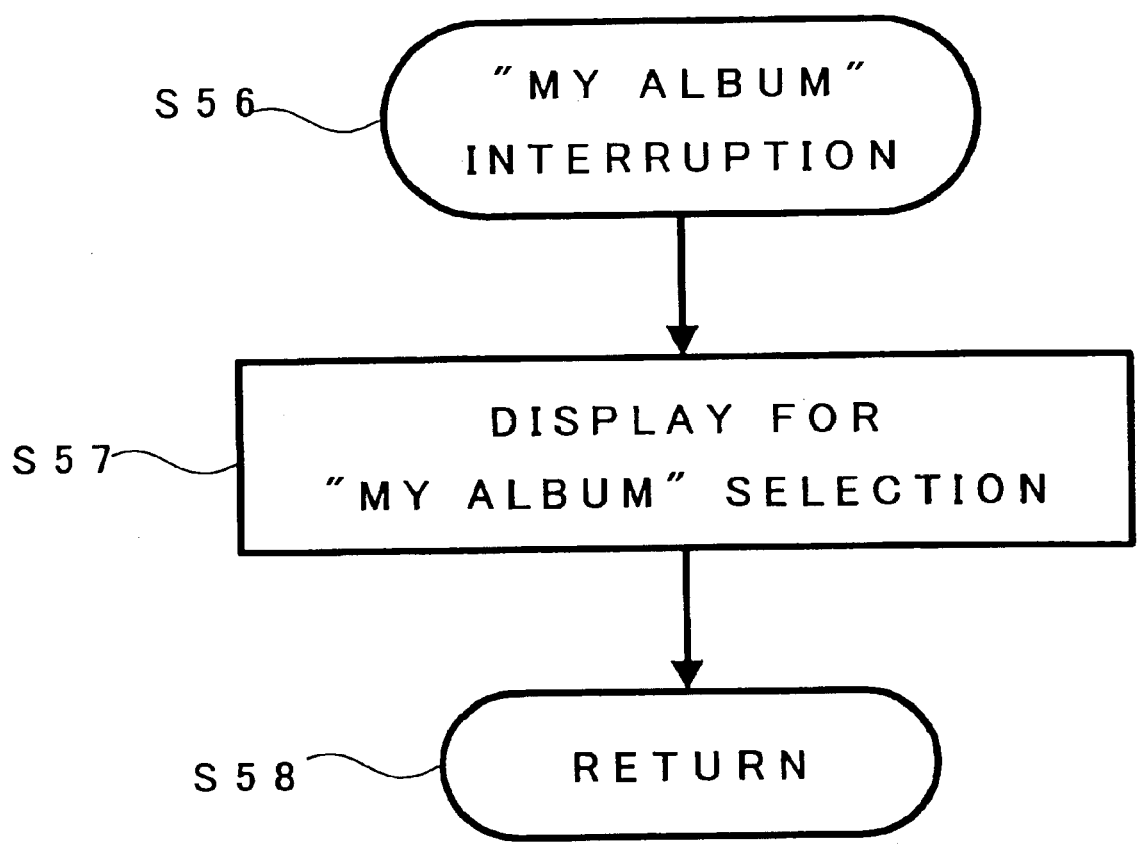
FIG. 25 is an exemplary flowchart showing the operation of my-album mode.

FIG. 25 is an exemplary flow chart that shows the operation of my-album mode. Pressing a menu button 3f of the remote controller 3 displays the nine dividend areas on the screen to which the numbers from "1" to "9" are attached. The nine numbers can be replaced with, for example, personal names of a family by an adequate input device.

In step S56, my-album interruption starts by pressing the menu button 3f. In step S57, the numbers from "1" to "9" are attached to the nine areas on the screen. Each of the nine areas having the numbers from "1" to "9" is arranged at the same position as each of the numeral buttons 3e from "1" to "9," respectively. In step S58, the flow returns, and becomes a standby sate for operation of the numeral buttons 3e.

For example, when the operator is a father and is designated with the number "1", if the "1" of the numeral buttons 3e is pressed, steps from S46 to S49, step S57 and step S52 are executed in FIG. 24. After that, if the picture is selected, then information on father is written in the header of the selected picture through step S51, step S53 and step S56.

Figure 26:
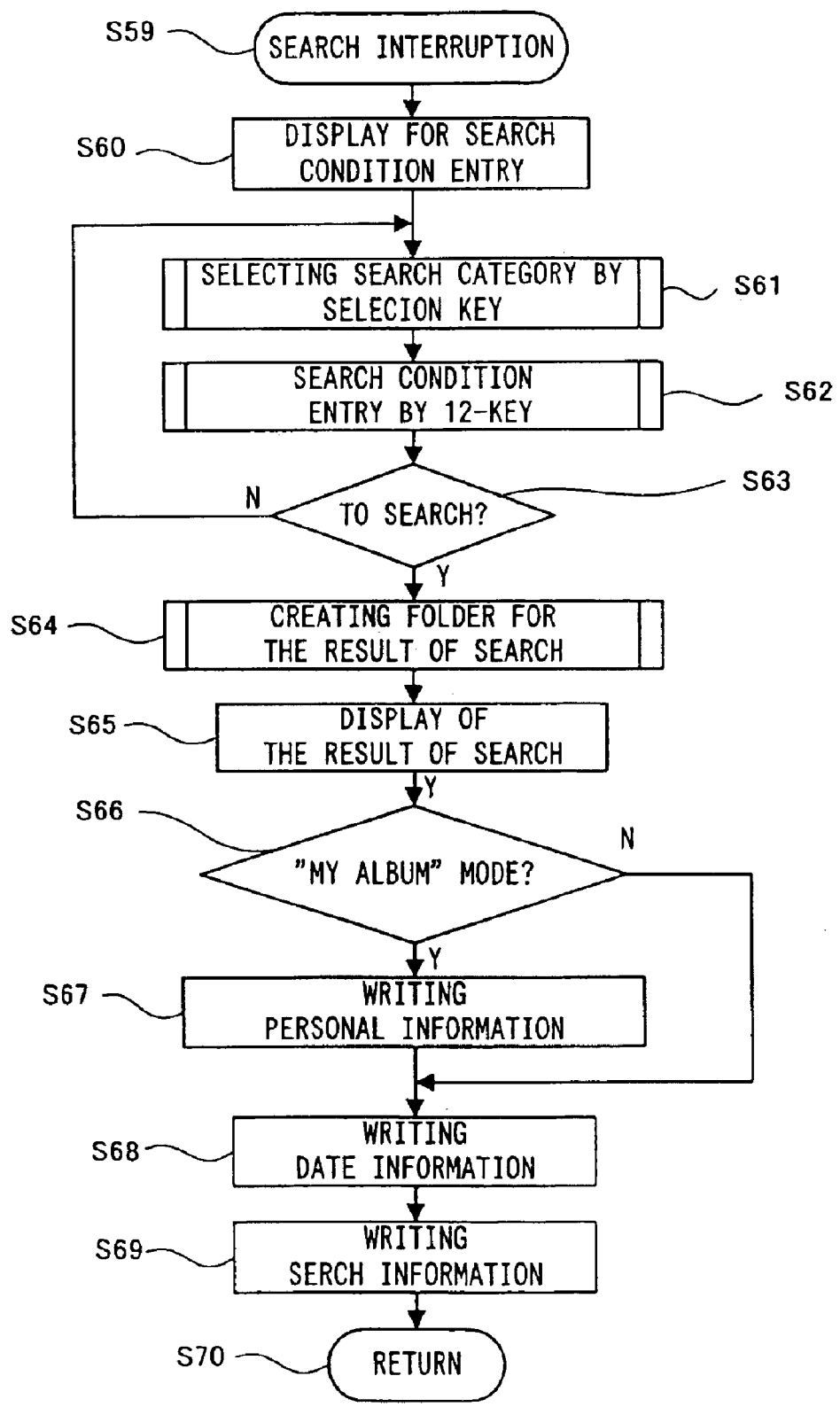
FIG. 26 is an exemplary flowchart showing the operation of retrieval.

FIG. 26 is an exemplary flow chart that shows the operation of retrieval. When a selection button 3g of the remote controller 3 is pressed in FIG. 16, retrieval interruption starts in step S59 in FIG. 26, and a retrieval conditions entry screen is displayed in step S60. By operating the selection button 3g adequately, it is possible to change a retrieval category that is indicated in the retrieval conditions entry screen in step S61. To input the retrieval condition such as the date, the numeral buttons 3e is used in step S62.

When the retrieval conditions are determined, pressing a conclusion button 3h advances the process from step S63 to step S64. Since steps from S61 to S63 are repeated every predetermined time while storing the last operation result, it is possible to repeat changes in step S61 and S62 as long as the conclusion button 3h is not pressed.

In step S64 retrieving is performed and the resultant folder is created. In step S65 a retrieved result is displayed in a form such as the thumbnail index S1 in FIG. 22. If more than nine images have been retrieved or retrieve conditions contain the hierarchy, retrieved results are separated adequately to a plural of folders, being displayed like the folder index F1 in FIG. 22. In steps from S66 to S69, information for later retrieval is written in the headers of retrieved images, and the process advances to step S70 and returns.

Figure 27:
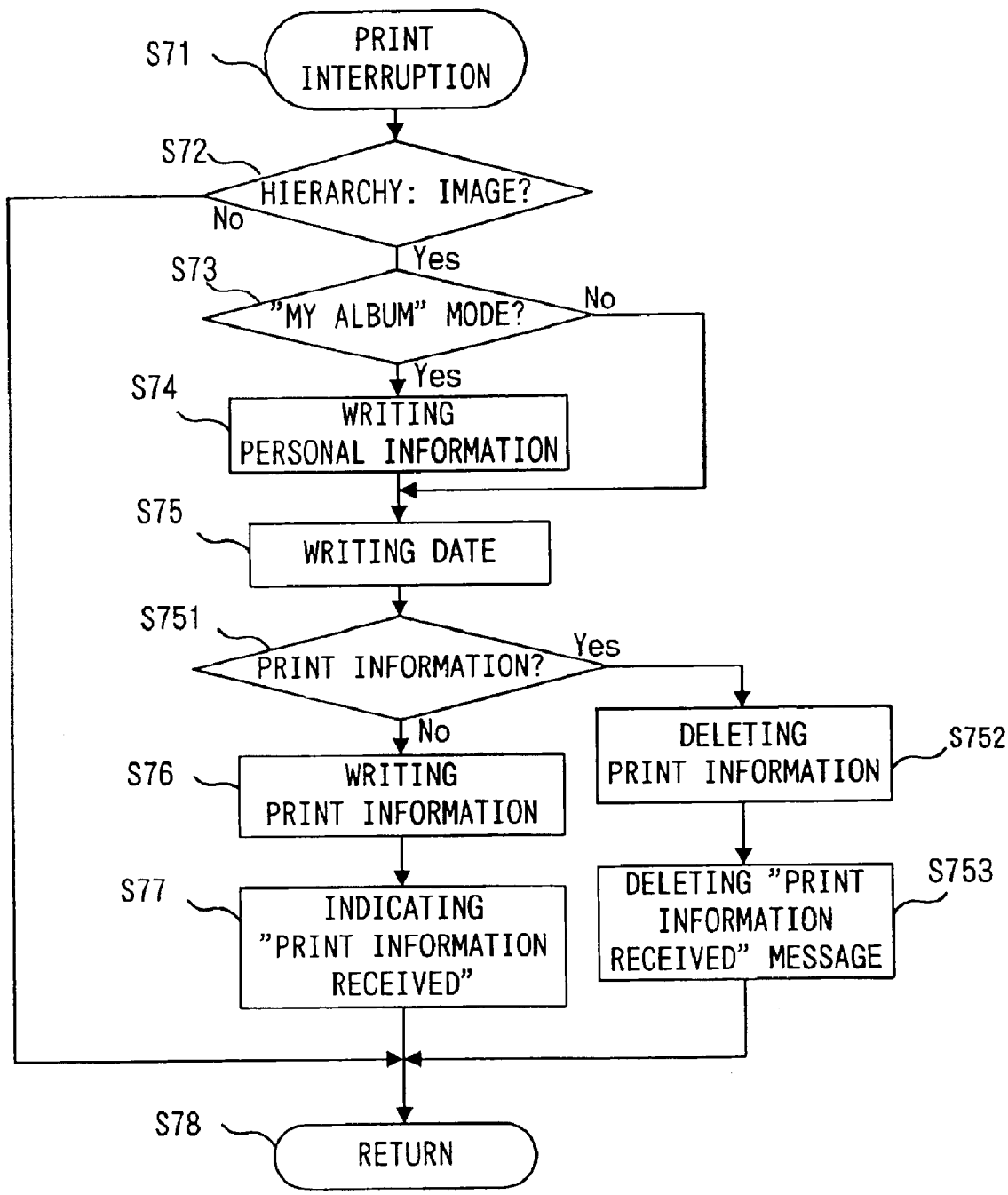
FIG. 27 is an exemplary flowchart showing the operation of printing.

FIG. 27 is an exemplary flow chart that shows the operation of printing. In the case where an image is displayed on the monitor 2, when the user desires to print the image, pressing the conclusion button 3h starts print interruption in step S71 in FIG. 27. When the image is not displayed on the monitor 2, if the conclusion button 3h is pressed, any operation is not performed, and the process advances to step S78 from step S72 and returns. When the image is displayed on the monitor 2, if the conclusion button 3h is pressed, then the process advances to step S73.

In steps from S73 to S75, information for later retrieval is written in the header of the image. In step S751, it is determined whether or not the header of the image has print information. If the header of the image has not the print information, then the process advances to step S76. In step S76, information to print is written in the header of the image. In step S77, a message "printing has been received" is superimposed on the screen of the monitor 2.

In step S751, if the header of the image has the print information, then the process advances to step S752. In step S752, information written in the header of the image is deleted. In step S753, the superimposed message "printing has been received" is deleted, and the process advances to step S78 and returns. These steps from S751 to S753 are performed when a different image is retrieved. The execution of printing is performed all together when the album mode is finished.

FIG. 28 is an exemplary flow chart that shows the operation of an album mode completion mode. The album mode finishes when a change operation to other mode is performed, or when the main power of the image storage 4 is turned off carelessly. For example, when the album mode button 3b is pressed to change to the television mode from the album mode, when a video-1 button 3j is pressed to change to a video-1 mode, or when the main power switch of the image storage 4 is operated, the mode change interruption starts in step S79 in FIG. 28.

In step S80 and step S81, the same processes as the processes in step S7 and step S8 in FIG. 18 are performed. In step S91, it is determined whether the album mode change flow is started by changing to other mode or by turning off the main power. If the album mode change flow is started by changing to other mode, then the process advances to step S82. In step S82, it is determined whether or not there is an image having printing information. If it is determined that there is an image having printing information, then a thumbnail index like S1 in FIG. 22 is displayed in step S83.

Then, when the conclusion button 3h of the remote controller 3 is pressed, printing is performed and information that printing has been performed is written into the header of the image in step S85. In step S86, changing to designated mode is performed. Since moving to step S86 from step S85 is performed just after printing is instructed, real printing action is performed in the background of other mode, for example, during viewing TV program.

In step S82, if there is not any image having printing information, then the process advances to step S86. In step S84, if the menu button 3f of the remote controller 3 is pressed instead of the conclusion button 3h, then printing is held in step S90, and the process advances to step S86.

In step S90, information that printing is put on the shelf is written in the header of each image. After this time, a message that printing is not performed is indicated for the predetermined time at such a time when the power of the main body is turned on, or when the mode is changed. This indication is repeated until printing of each image is performed, or the delete of printing is performed.

In step S87, a displayed image is stored in the frame memory 4m. The reason why the displayed image is stored in the frame memory is to retain the same state of the album mode before being changed to other mode when the mode is changed back to the album mode again. After this process, the printing action is performed in parallel in the background of the designated mode.

In step S88, it is determined whether or not the predetermined time is past after the mode is changed to other mode. If it is determined that the predetermined time is past after the mode is changed to other mode, then the process advances to step S89. If the predetermined time is not past, then measuring time is continued.

In step S89, to lower power consumption, the memory 4f of the image storage 4 is stopped and the mode is changed to a power saving mode. The reason why the power saving mode begins after the predetermine time is as follows. If the mode is changed to other mode carelessly, the mode may immediately return to the image storage mode. In this case, if the memory 4f is halted every time, and driven again, it is not convenient because it takes a considerable time to become the album mode. And it is not desirable that the memory 4f is overdriven.

In the case where it is determined that the album mode change flow is started by turning off the main power in step S91, the process advances to step S92. In step S92, it is determined whether or not an image has print information. If the image has print information, then printing is held in step S93, and the process advances to step S94 without executing printing.

In step S93, information on print holding is written in the header of each image. On such a time when the power of the main body is turned on or the mode is changed, a message that there is an image not printed is displayed for the predetermined time. This indication is repeated until printing is executed or printing is deleted.

In step S92, if the image has not print information, then the process advances to step S94. In step S94, the mode is changed to the television mode, and the process advances to step S95. In step S95, the power of the image storage 4 is turned off after a completion procedure such as the halt of the memory 4f of the image storage 4 is performed.

All functions of the printer 9, which includes the on-off switch of the power source, are controlled by the image storage 7. The CPU 1h of the image storage 7 receives instructions, which controls the printer 9, from the remote controller 3 through the main body 1, transmitting the received instruction to the printer 9. The CPU 1h refers a state of the image storage 7 and devices connected to the image storage 7, thereby permitting the instructed control, determining an output timing and executing the control.

Furthermore, the system has the following advantages. That is, the printer can be operated in consistent with an operation and a state of another device. When the image storage 7 is operated, the image storage 7 does not need a special remote controller, but needs only the remote controller 3 that is common to other devices. Furthermore, the system is convenient to use, since the remote controller 3 always controls another device only through the main body 1, without reference to the kind of the controlled device. Accordingly, since other devices besides the main body 1 do not receive a signal from the remote controller 3, the system does not have a limit that there must not be an obstacle between the signal receiving part of the device and the remote controller 3.

Second Embodiment.

Figure 29:
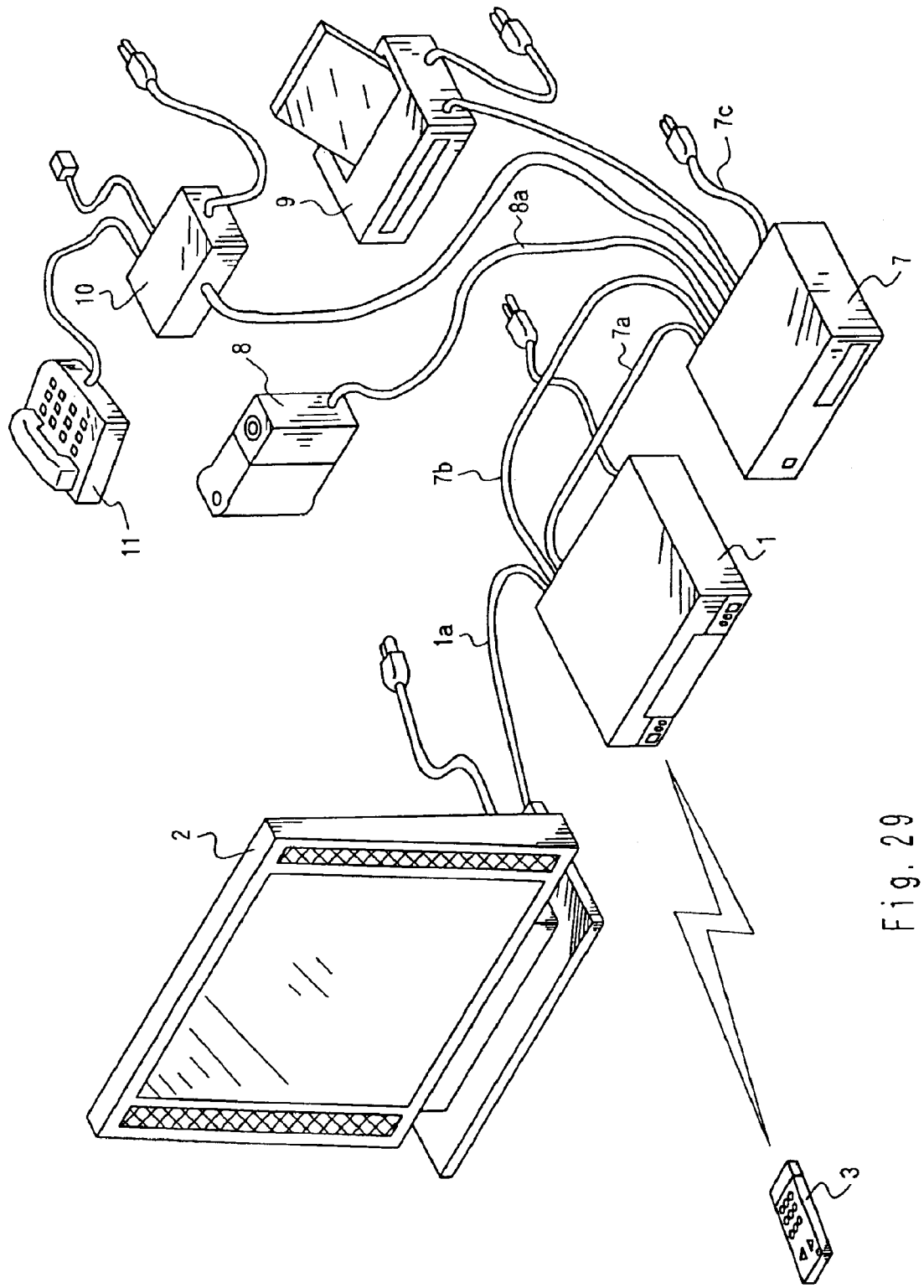
FIG. 29 is an exemplary perspective view of the system Second Embodiment.
Figure 30:
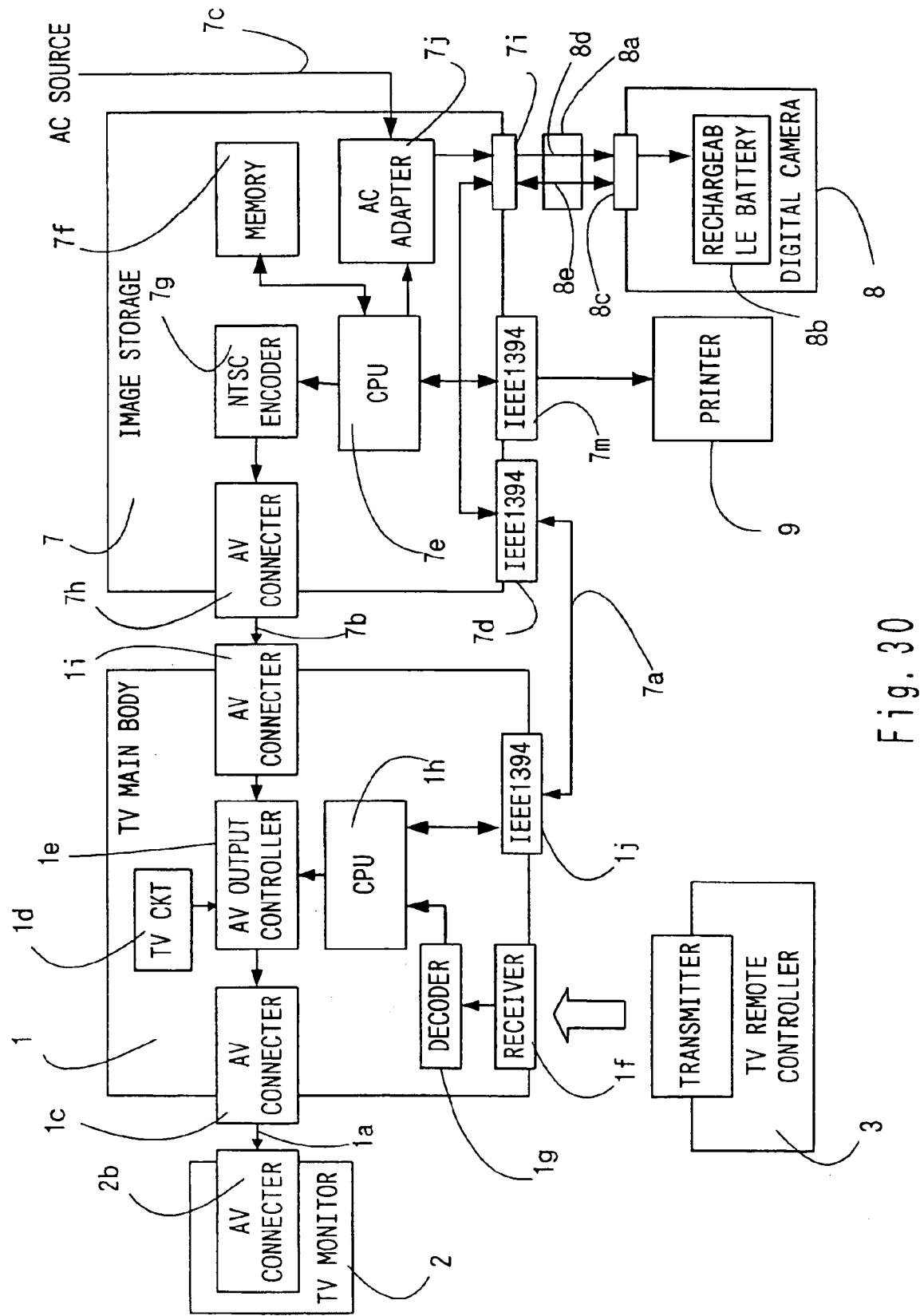
FIG. 30 is an exemplary schematic diagram of the system configuration of Second Embodiment.

FIG. 29 is a schematic view that shows the Second Embodiment of the present invention. FIG. 30 a block diagram that shows the configuration of the Second Embodiment.

Referring to FIG. 29, a modem 10 for telecommunication and a telephone 11 are added to the configuration of the First Embodiment in FIG. 1, and an image storage 7 and the digital camera 8 in the Second Embodiment are different from the image storage 4 and the digital camera 6 in the First Embodiment. Other devices besides these four devices in the Second Embodiment are the same as the devices in the First Embodiment. In the configuration of the Second Embodiment, although the telephone 11 is connected to the image storage 7 through the modem 10, this connection is also possible in the configuration of the First Embodiment in FIG. 1.

In the Second Embodiment of the present invention, an AC adapter that feeds power to the digital camera 8 through a cable 8a is built in the image storage 7. The cable 8a is a special standard cable, including a power supplying cable and a signal transmitting cable, which connects the digital camera 8 with the image storage 7. The image storage 7 in the Second Embodiment is for general-purpose use the same as the image storage 4 in the First Embodiment. The cable 8a for the digital camera 8 is the only exclusive product in the Second Embodiment. Connecting the digital camera 8 with the image storage 7 by the cable 8a causes the digital camera 8 automatically to charge power and to transmit data.

Referring to FIG. 30, the digital camera 8 has a special standard terminal 8c that is a combined terminal of a charging terminal and a signal terminal that is in conformity with the IEEE 1394. The signal terminal of the special standard terminal 8c is connected to the circuit system of the digital camera 6, and the charging terminal of the special standard terminal 8c is connected to a rechargeable battery 6b. The cable 8a, which is connected to the special standard terminal 8c, is a special standard cable that is a combined cable of the charging cable 8d and a signal cable 8e that is in conformity with the IEEE 1394.

The image storage 7 has a special standard terminal 7i that is a combined terminal of a charging terminal and a signal terminal that is conformity with the IEEE 1394 standard. The charging terminal of the special standard terminal 7i is connected to an AC adapter 7j, and the signal terminal of the special standard terminal 7i is connected to a IEEE 1394 terminal 7k.

As described above, the image storage 7 is a general-purpose product that may be used for various kinds of digital cameras. The considerable amount of digital cameras, however, are driven by different power-supply voltages. Therefore, the AC adapter 7j is constructed to be able to select a plural of voltages. A CPU 7e of the image storage 7 detects information on the power-supply voltage of the digital camera 8 through the terminal 8c, the signal cable 8e, terminal 7i and the IEEE 1394 terminal 7k. Then, the CPU 7e controls the AC adapter 7j to output a power-supply voltage suitable for the digital camera 8 according to the detected information. Thus, by making only the terminal 8c adopt the special standard, it is possible to apply different power-supply voltages to digital cameras.

In the system as shown in FIG. 30, the IEEE 1394 terminal 7m is coupled with the printer 9. Although the modem 10 is omitted in FIG. 30, it is really possible to add the modem 10 to the system in FIG. 30. Explanations of other things besides the modem 10 in FIG. 30 are omitted because they are the same as in FIG. 2.

According to the Second Embodiment of the present invention, when transmitting and storing the entire image data in one holder into the image storage 7 is completed, all thumbnails contained in this holder are displayed on a monitor 2. An arbitrary thumbnail in the holder is selected as the thumbnail representing the folder, and the folder's name is assigned to the selected thumbnail. The first image of the folder is, usually, selected as the representative image. Display of thumbnails and selection of the representative image may be made independent of transmitting and storing image data from the digital camera 6 to the image storage 7, and may be performed after completion of the transmitting and storing.

Figure 31:
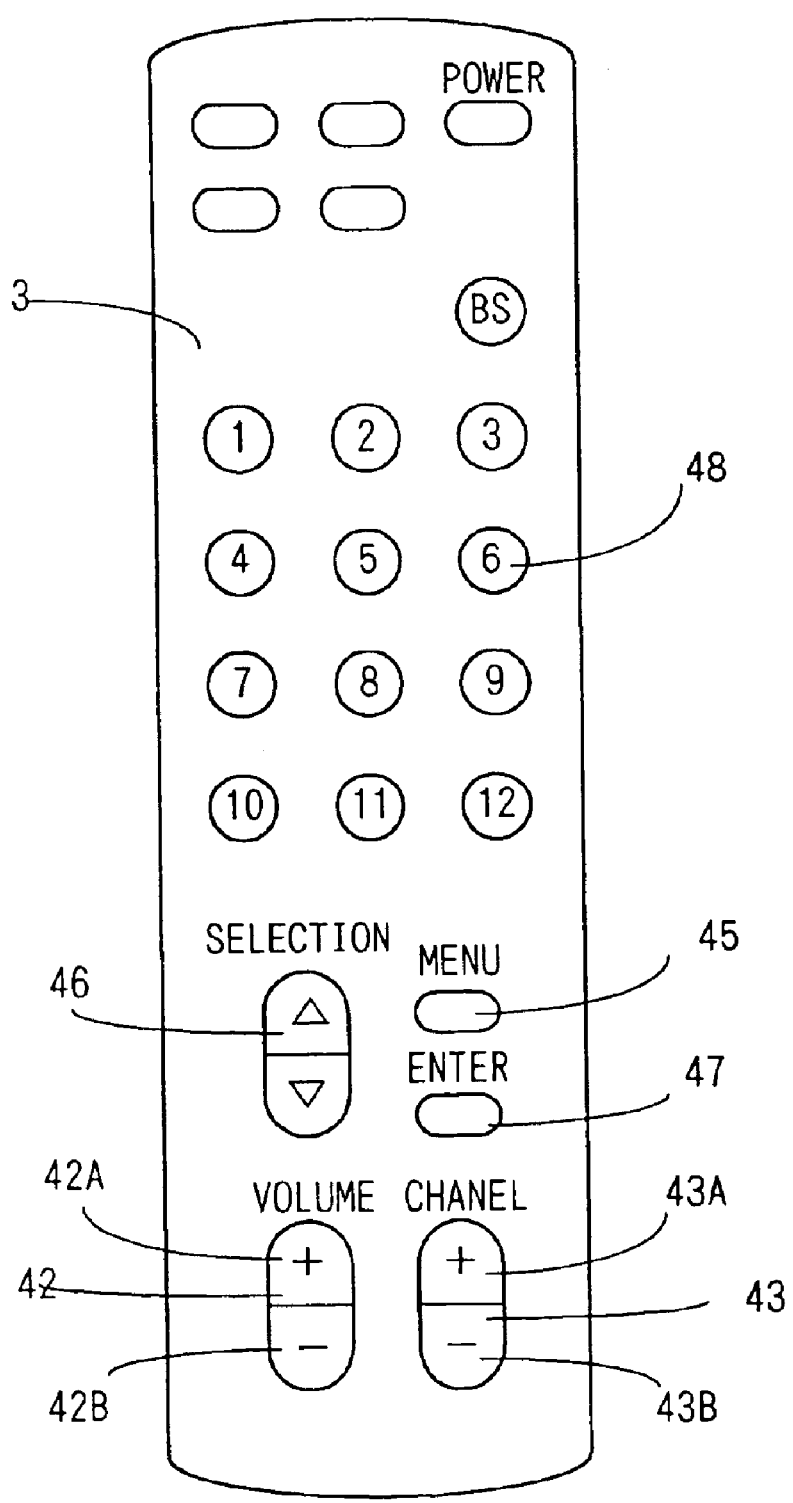
FIG. 31 shows an exemplary remote controller used in Second Embodiment.

The remote controller 3 as shown in FIG. 31 has a menu button 45, and a selection button 46 that is used to search a folder or an image from the image storage 7. Since the menu button 45 and the selection button 46 are not comprised in the First Embodiment, the remote controller 3 in the Second Embodiment is not the same as the remote controller 3 in the First Embodiment. The remote controller 3 in the Second Embodiment is used to select a menu displayed on the monitor 2 and to perform the menu. The remote controller 3, as a matter of course, is also used for viewing TV programs. The operation buttons of the remote controller 3, therefore, are used for selecting and performing the menu, and viewing TV programs.

Selecting Mode.

By turning on the main switch, a main body 1 of the present embodiment starts in the television mode in the Second Embodiment as well as in the First Embodiment, and mode selection interruption is enabled. Then, TV mode processing is performed and it becomes possible to receive TV program. When the menu button 45 (FIG. 31) of the remote controller 3 is pressed, the mode selection interruption is performed in the main body 1.

Figure 32:
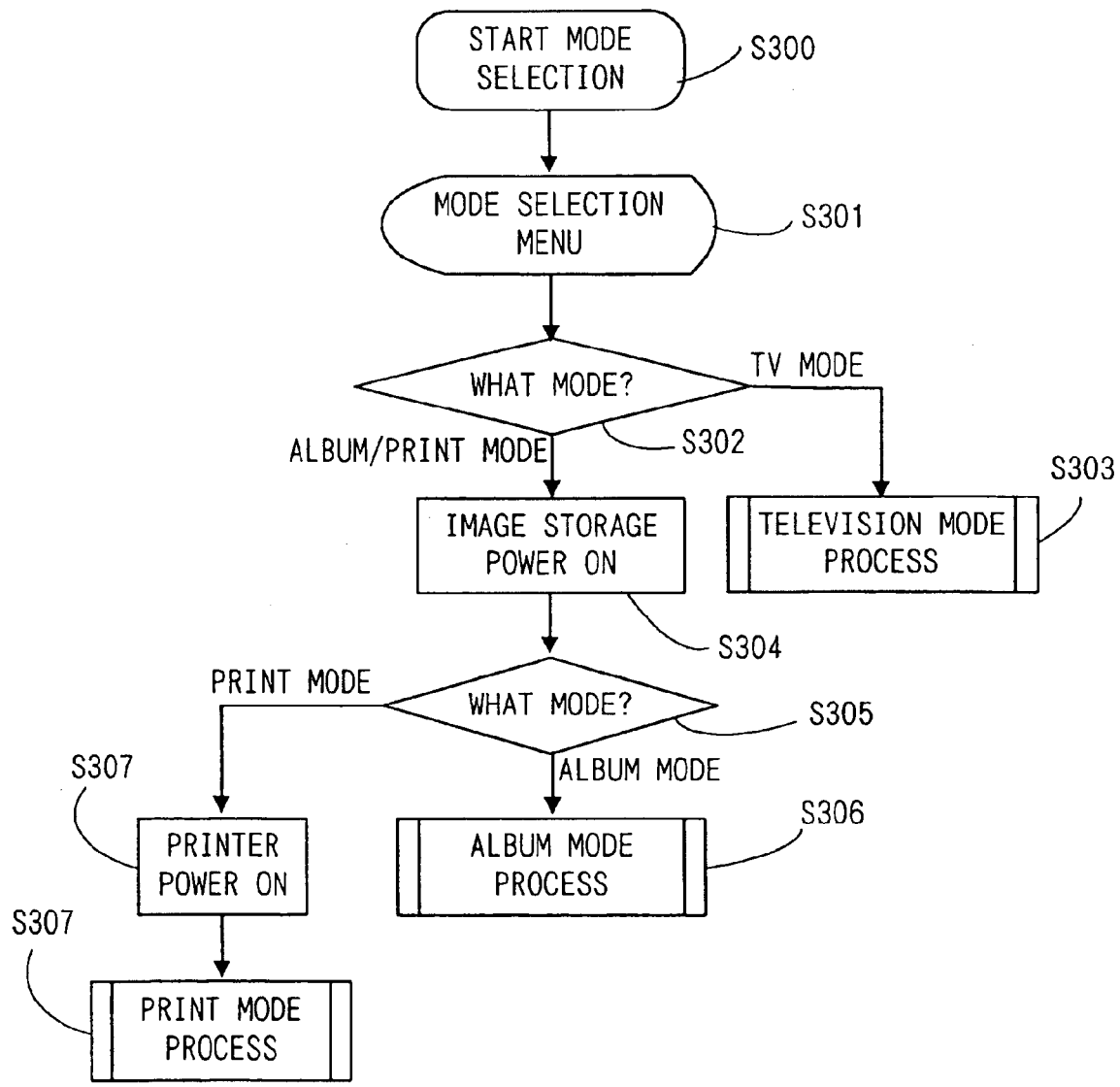
FIG. 32 is an exemplary flowchart showing the operation of mode selection processing in Second Embodiment.
Figure 33:
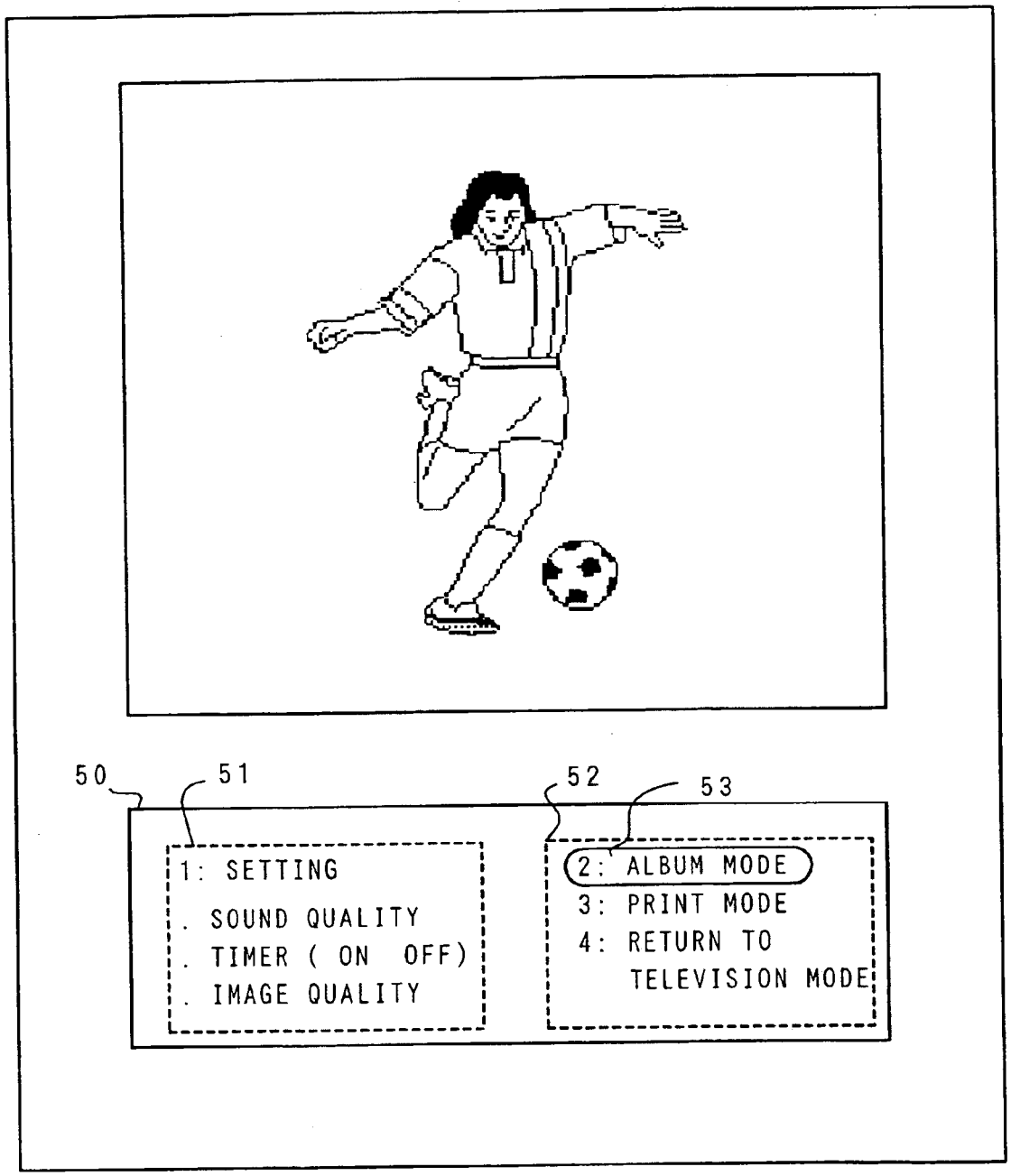
FIG. 33 is an example of display on the monitor of Second Embodiment.

FIG. 32 is an exemplary flow chart that shows the operation of mode selection processing. The CPU 1h of the main body 1 performs the mode selection processing. By pressing the selection button 45, the "Mode Selection" page at page 50 as shown in FIG. 33 is superimposed on the TV program image on the monitor 2 (S301). The displayed "Mode Selection" page 50 includes a TV operating menu 51 in addition to a mode selection menu 52. The TV operating menu 51 is a menu for normal operation of the main body 1 on view of a TV program, and a selected item in the TV operating menu 51 is processed in the main body 1. A part of the menu such as quality control is also usable in the album mode.

The mode selection menu 52 contains three option items, "Album Mode", "Print Mode" and "Return to Television Mode". The "Album Mode" and the "Print Mode" are used for operating the image storage 7. Selecting these two option items makes the image storage 7, which communicates with the printer 9, execute the process of the "Album Mode", the "Print Mode", or the on-off of the power source.

When the user selects an item in the mode selection menu, the user can select a desired item by pressing a conclusion button 47, after placing a cursor 53 on a desired item by operating the conclusion button 47.

In step S302, it is determined that the selected item is which item of three items. If the selected item is the "Return To Television", then the process advances to the process of the television mode processing in step S303. If the selected mode is the album mode or print mode, then the process advances to step S304. In step S304, the power of the image storage 7 is set on, and process advances to step S305.

In step S305, it is determined whether the selective mode is the print mode or the album mode. If the selective mode is the album mode, then the process advances to the album mode process in step S306. If the selective mode is the print mode, then the process advances to step S307. In step S307, the power of the printer 9 is turned on and the process advances to step S308. In step S304 or S307, if the power of the image storage 7 or the printer 9 has been turned on, nothing is performed therein and the process advances to the next process.

Figure 34:
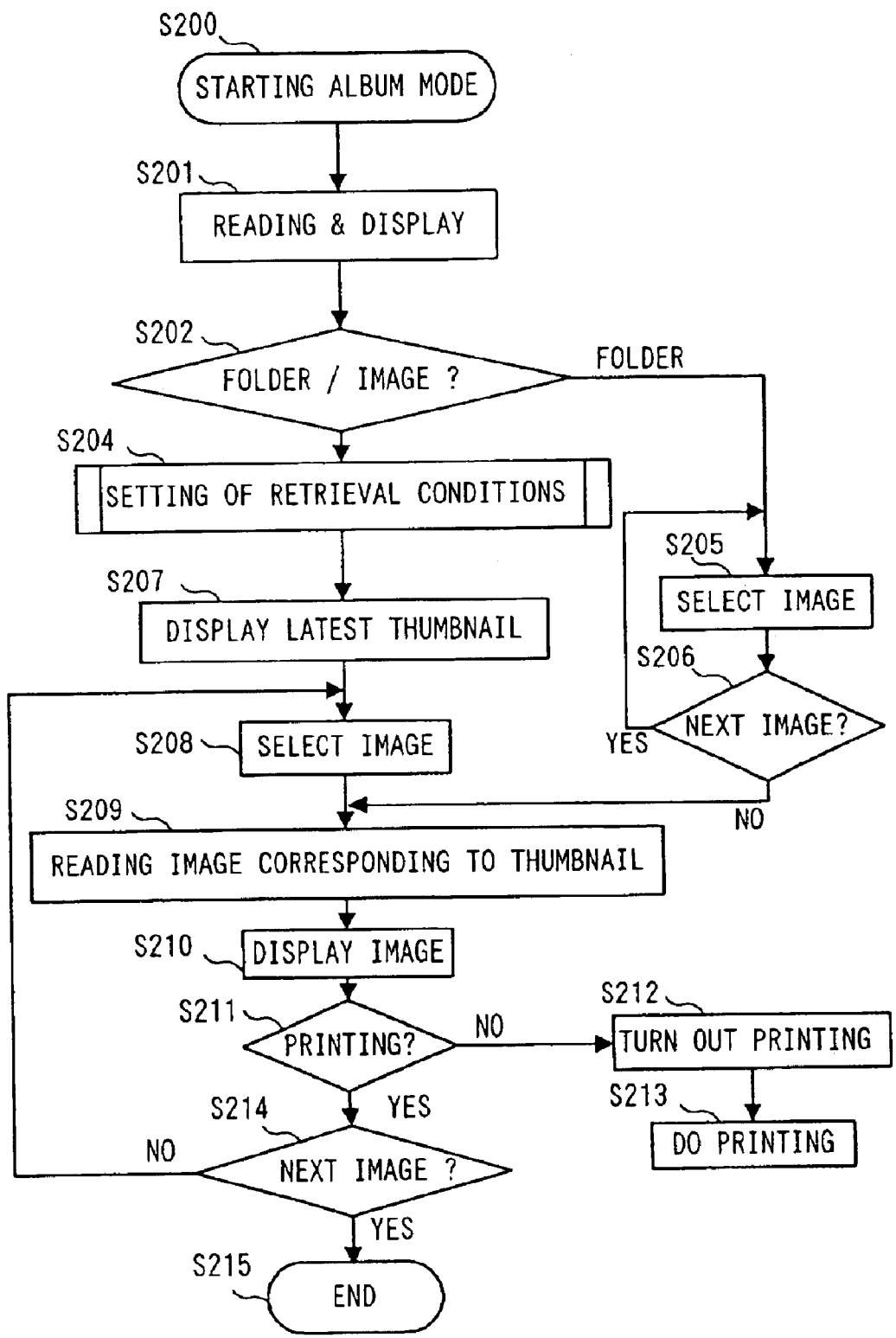
FIG. 34 is an exemplary flowchart showing the operation of the album mode of Second Embodiment.

FIG. 34 is an exemplary flow chart that shows the operation of the album mode (i.e., the operation of the image storage 7).

Selecting the "Album Mode" in the "Mode Selection" page as shown in FIG. 33 makes the CPU 7e of the image storage 7 transmit a signal to the CPU 1h of the main body 1. Then, the CPU 1h changes an image on the monitor 2 from a TV frame screen to an image stored in the image storage 7. The CPU 4e transmits the data of information on all folders stored in a memory 7f of the image storage 7 to a frame memory 106, and makes the monitor 2 display the information on all folders on the page "Information on All Folders", as shown in FIG. 35. The page "Information on All Folders" includes the thumbnails of the representative images, a listing of information on all folders, search option items, the "Print Mode" button, and the "Return to Television Mode" button.

The thumbnail 30 of the representative image of folder is arranged in order of the folder number that is assigned to each folder as shown in FIG. 35. Since the user can select the desired folder after identifying the thumbnail of the representative image, he can surely select the desired folder.

The page "Information on All Folders", which is used in the album mode, has the button of "Return to the Television Mode". Whenever the user desires to view a TV program, he can return to the TV frame screen by pressing the button of "Return to the Television Mode."

The listing of information on all folders displayed on the monitor 2 are arranged in decreasing order of the date of photography, regardless of when folders are created, that is, regardless of whether folders are created at the time of shooting or at the time of storing information in a memory 47. The desired folder can be selected by pressing the selection button 46 of which number is same as the folder number and determined by pressing the conclusion button 47 (S205).

The listing of information on all folders displayed on the monitor 2 also includes condition for sort. The condition for sort can be determined by pressing the conclusion button 47 after the target folder is selected by pressing the selection button 46 of the remote controller 3.

By the above-mentioned selecting operation, the representative image corresponding to the selected desired folder is distinguished from other images in a manner that the representative image is bordered, or displayed brightly.

Furthermore, the "Folder/Image Search" item in the page "Information on All Folders" can search an image or a folder as necessary from the data of images or folders stored in the image storage 7. To search images using the "Folder/Image Search" item in the page "Information on All Folders", the number "0" is selected by using a channel button 43 (S202).

Figure 36:
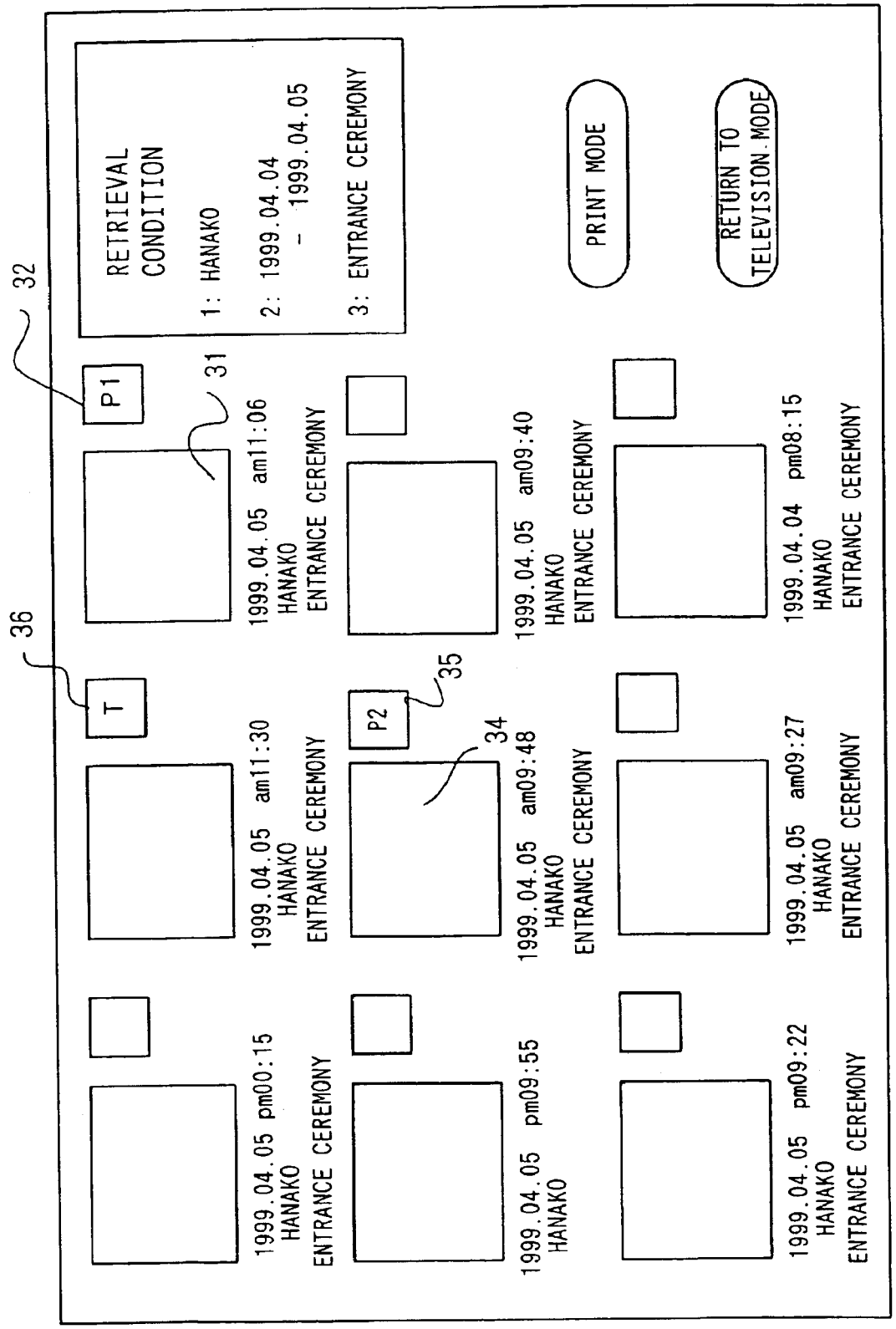
FIG. 36 is an example of thumbnail images displayed on the monitor of Second Embodiment.

When the desired folder is determined in step S205 or step S202, compressed image data stored in the selected folder is read in the frame memory 4m and converted to analog data. The converted analog data is displayed as an image containing nine small images, on the screen of the monitor 2 (S207). FIG. 36 is an explanatory drawing that shows the displayed page "Images in a folder" in step S207.

The page "Images in a folder" in FIG. 36 is opened from the page "Information on All Folders" in FIG. 35 using the remote controller 3 as follows. The remote controller 3 has numeral buttons to select TV programs. The numeral buttons 48 of the most widely used remote controller has the arrangement of 4×3 as shown in FIG. 31. In the embodiments of the present invention, nine numeral buttons from 1 to 9 are used.

When the image storage 7 displays the thumbnails on the monitor 2, the thumbnails are placed in the same arrangement as that of the numeral buttons 48. A thumbnail is selected by pressing the numeral button located at the same position as the target thumbnail.

Each image in a folder, which is designated as a target image that is read out from the data stored in the image storage 7, has a series of number. This number is displayed together with each thumbnail. If the operator selects a thumbnail image, which is not displayed on the monitor 2, by designating the number of the thumbnail with the channel button 43, the thumbnail image can be displayed jumping to the corresponding folder.

In the present embodiment, although the remote controller has twelve numeral buttons, the present invention is not limited to the remote controller having twelve numeral buttons. In the future, it is expected that the number of selectable TV channel will increase because of the tendency that multi-channel TV broadcasting is widening. Therefore, selecting images by the remote controller for multi-channel TV is effective in selecting stored images.

In step S202 in FIG. 34, if it is determined that "Folder/Image Search" is selected, then the process advances to step S203 and search condition setting is performed. After the search condition setting, searching is performed in step S204 and the process advances to step S207. The search condition setting in step S203 will be described later in FIG. 37.

Then, the operation of selecting one of images displayed on the monitor 2, as shown in FIG. 36, and viewing the image will be explained herein later.

In step S208, the desired thumbnail is selected from thumbnails displayed in step S207. The desired thumbnail is selected by using the selection button 46 of the remote controller 3 and determined by pressing the conclusion button 47. Then process advances to step S209. In step S209, the image data corresponding to the determined thumbnail is read out from the memory 7f and stored in a frame memory 7m. In step 210, the selected image is displayed after the image data is converted to analog data. In step S207, if the desired thumbnail is not found in the first frame screen, which includes nine thumbnails, the next frame screen is displayed by using a volume button 42 (S211). Thus, the desired image is read out from the memory 7f and it is possible to view the desired image on the monitor 2.

In step S211, if it is determined that the viewed image is printed, then printing the image is selected by pressing the "Print Mode" button displayed on the frame screen, using the selection button 46 of the remote controller 3, and determined by pressing the conclusion button 47.

Although it is described that the printer 9 is powered on when the print mode is selected referring to FIG. 32, the printer 9 may be powered on if the power of the printer 9 is off when printing is instructed in step S211, as shown in step S211 to S213 in FIG. 34. Alternatively, the above-mentioned printing instruction is also used as a signal that makes the printer be powered on.

Figure 37:
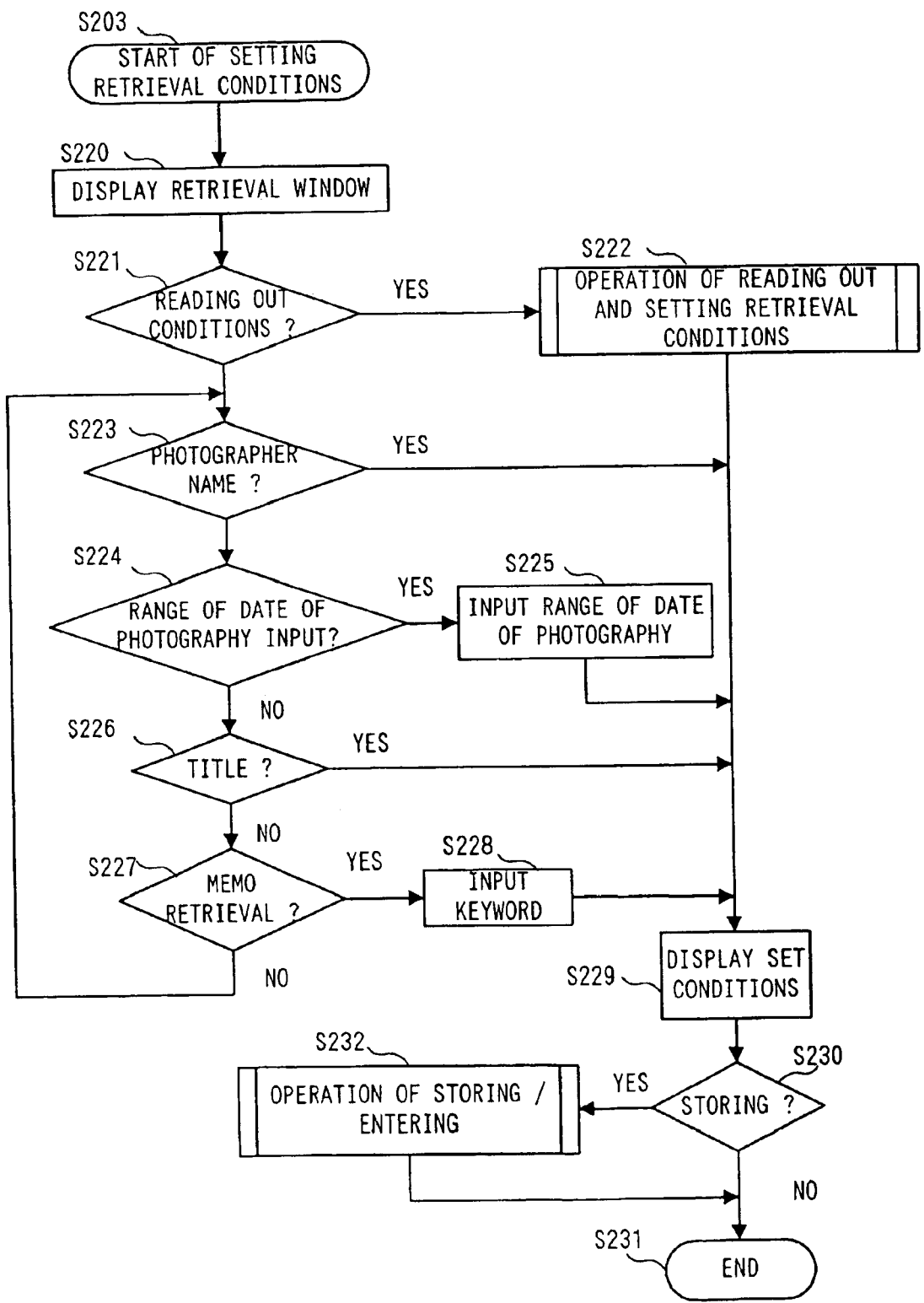
FIG. 37 is an exemplary flowchart showing the operation of the search condition setting process of Second Embodiment.

FIG. 37 is an exemplary flow chart that shows the operation of the search condition setting process. FIG. 38 is an explanatory drawing showing the page of the search condition setting menu displayed on the monitor 2 in step S202.

The search conditions, specifically, include a frame number that is automatically attached to the image at the time of photography, the text data that the user inputs, such as the date and time of photography, the title of the image, the date of battery charge and memos.

The input data such as the title or user's name shown in figures of the present embodiment are used as a folder name, being recorded on a recording medium of the camera at the time of photography. This same folder name is also used in the memory 7f. The search condition items include the folder number in the memory 7f, the date of battery charge, the date of photography, photographer's name, title and memos in the present embodiment.

In step S221, it is determined whether or not the search conditions created in the past are read out from the memory 7f and displayed on the monitor 4. This process, for example, is like the conventional work to take out the photographic album that was arranged in the past. Two alternative operations are selected in step S221. If it is determined that the search conditions created in the past are not read out from the memory 7f and displayed on the monitor 4, then the first operation is performed, advancing to the step S221 to S227. In the first operation, the user can select one among preassigned option items by using the selection button 46 and determine the values with the conclusion button 47 of the remote controller 3. If it is determined that the search conditions created in the past are read out from the memory 7f and displayed on the monitor 2, then the second operation is performed, advancing to step S222, the process of reading out the search condition. The second one is to select the "Reading Out" option item in the "Album" item in the "Search Condition Setting" page, and to determine the album name with the conclusion button 47.

In the first operation, one of the option items in each search condition item that are preassigned is selected, or adequate words are input according to instructions instructed in the "Search Condition Setting" page. In step S223, it is determined whether or not photographer's name is selected. If it is determined that the photographer's name is selected, then the process advances to step S229 and the selected photographer's name is indicated. In FIG. 38, preassigned photographer's name includes "TARO", "HANAKO", and "ICHIRO" as the option items, who are members of a family, and "HANAKO" is selected as the photographer. The option item is described later in the process of entering and saving conditions in step S232.

In step S224, it is determined whether or not the range of the date of photography is selected. If it is determined that the range of the date of photography is selected, then the process advances to step S225 and the range of the date of photography is input therein, and the process advances to step S229. In step S226, it is determined whether or not the title is selected, in the same manner that is performed in step S223. The preassigned title can use the folder name created at the time of shooting, as its own name. If it is determined that the preassigned title is selected, then the process advances to step S229.

In step S227, it is determined whether or not the memos are searched. The memo searching can search memos of text data that were created at the time of shooting or editing an album, with partial match retrieval, over all folders. If it is determined that the memos are searched, then the process advances to step S228 and keywords for retrieval are input therein. Inputting keywords is performed using a character code table, displayed on the monitor 2, by operating the selection button 46 and the conclusion button 47 of the remote controller 3. Inputting keywords may be also performed with a keyboard (not shown) or a pen-input device connected to the CPU of the image storage 7.

Figure 39:
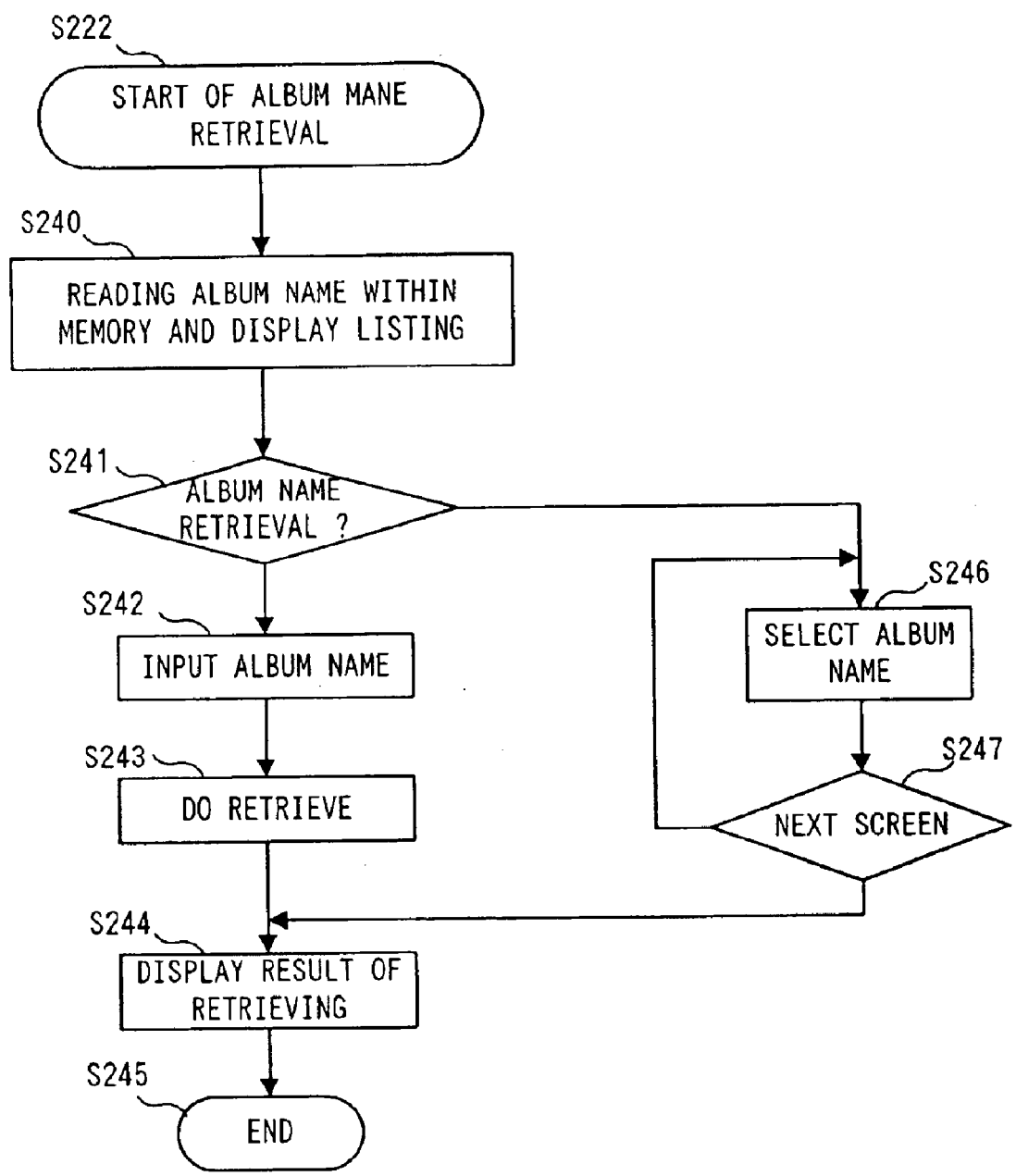
FIG. 39 is an exemplary flowchart illustrating the operation of searching the title of the album of Second Embodiment.

The second operation is performed in the process of reading out the title of the album in step S222. In step S222, the title of the album created in the past, stored in the memory 7f, is read out. FIG. 39 is an exemplary flow chart that shows the operation of searching the title of the album. Referring to FIG. 39, the process starts from step S222 by selecting the "Read Out" option of the "Album" item in the "Search Condition Setting" page shown in FIG. 38, using the selection button 46 of the remote controller 3. In step S240, all search conditions stored in the folder of the titles of the album in the memory 7f are read out and displayed as the listing on the screen. FIG. 40 is an explanatory drawing that shows the page of "Listing of Album Titles".

In this page of "Listing of Album Titles", the title of the album is searched in the same manner as performed in FIG. 35. In the flow of FIG. 39, in step S242 to S243, the required title of the album is input and searched. In step S246 to S247, a title of the album is selected from the displayed listing by operating the selection button 46 and the conclusion button 47 of the remote controller 3. The resulting titles of the album are displayed in step S244.

In step S232 in FIG. 37, the process of saving and entering the search conditions such as the title of the album or the memo is performed.

Figure 41:
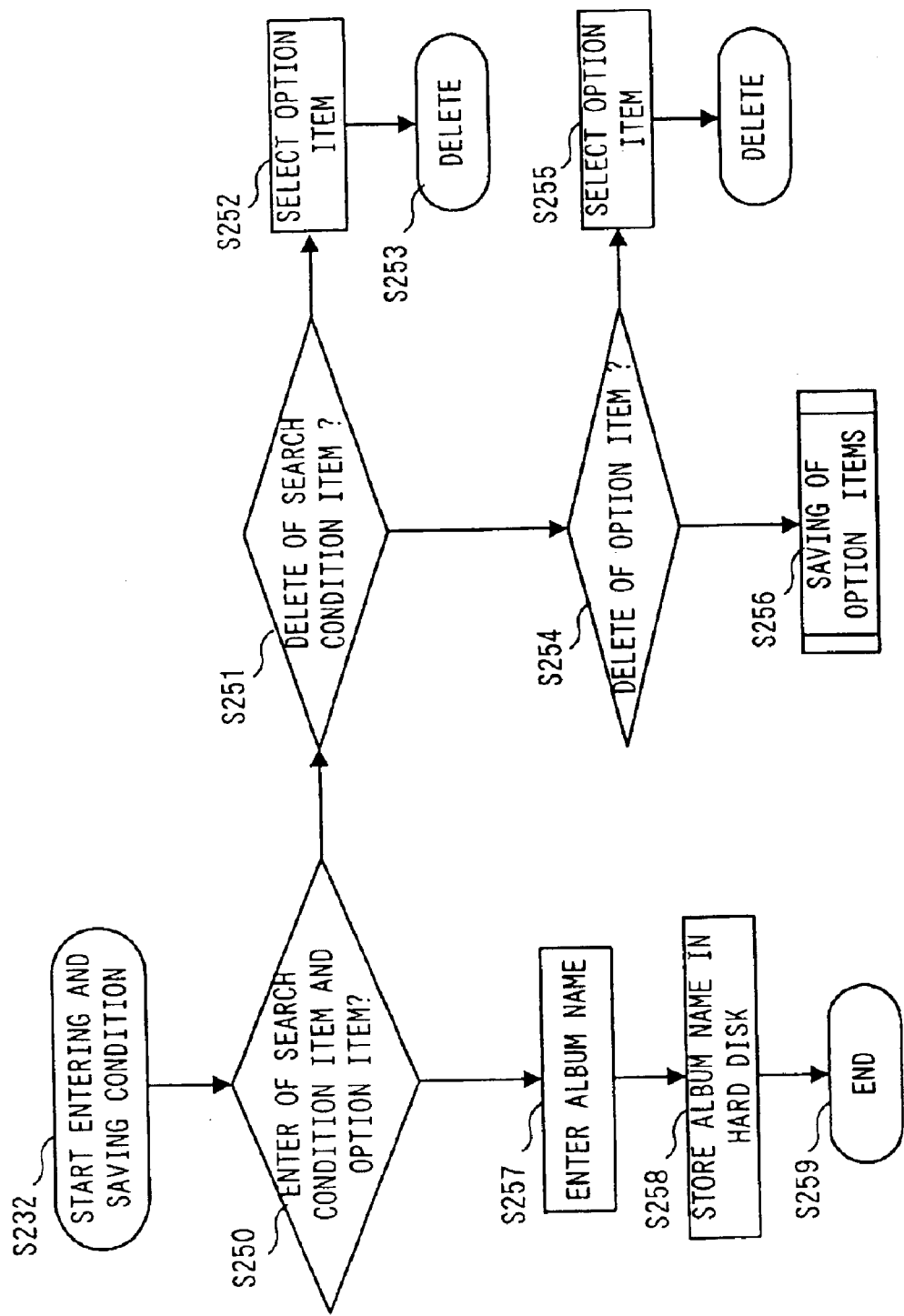
FIG. 41 is an exemplary flowchart showing the operation of saving and entering the search conditions of Second Embodiment.

FIG. 41 is an exemplary flow chart that shows the operation of saving and entering the search conditions. This operation starts when the "Save" option item of the "Album" item in the "Search Condition Setting" page shown in FIG. 38 is selected with the selection button 46 and determined with the conclusion button 47 of the remote controller 3.

In step S250, it is determined whether the search condition item such as the "Title" or the "Date of Photography" is added or deleted, and likewise, it is determined whether the option item in the search condition items is added or deleted. If it is determined that the search condition item or the option item is added or deleted, then the process advances to step S251. If it is determined that the search condition item or the option item is not added or deleted, then the process advances to step S257. In step S257, the operation of entering the title of the album is performed, resulting in the title of the album stored in the memory 7*f*. The title of the album is created by pressing the channel button 43 using the "Character Code Table" and determined by pressing the conclusion button 47, resulting in a file stored in the folder of the title of the album in the memory 7*f*.

Furthermore, in step S250, if it is determined that the search condition item or the option item is deleted or added, pressing the selection button 46 of the remote controller 3 determines it. Step 251 through step 255 process deletion or addition of the search condition item or the option item. If there is not the item to delete, the process advances to step 256 where the option item of the search condition item is added.

Figure 42:
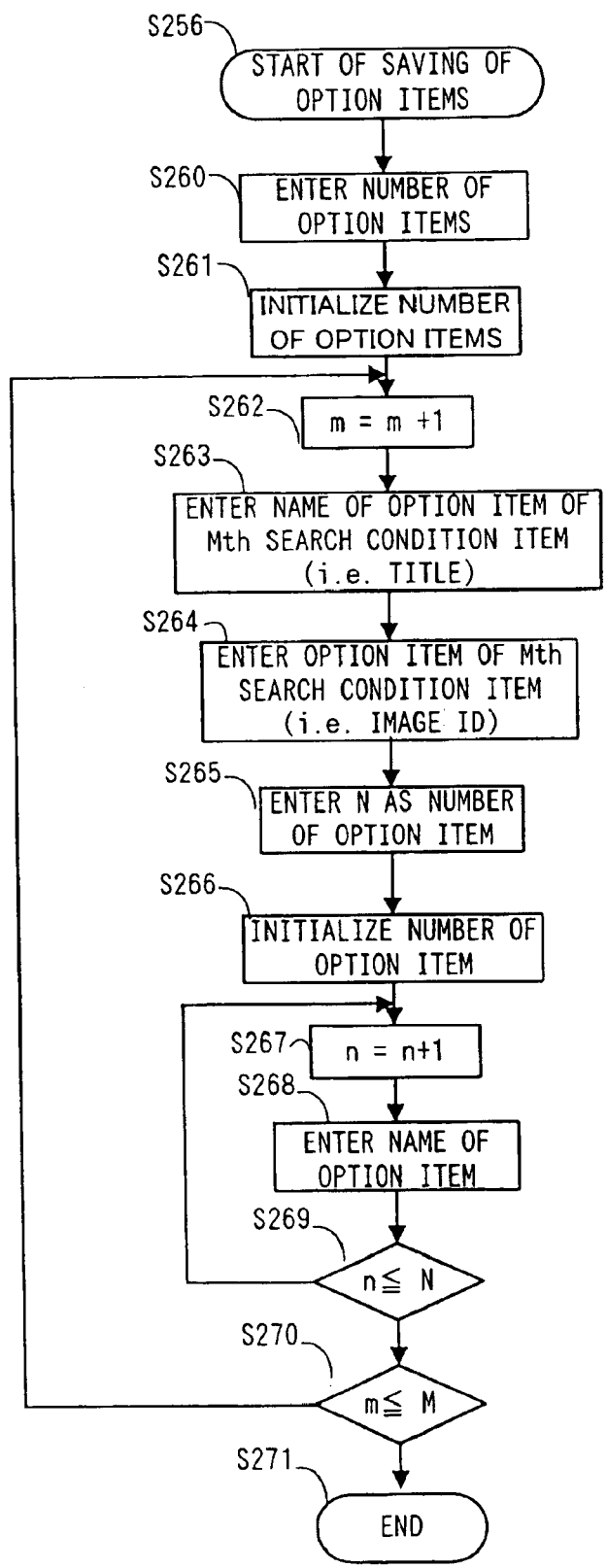
FIG. 42 is an exemplary flowchart showing the operation of entering the search condition option item of Second Embodiment.

FIG. 42 is an exemplary flow chart of operation of assigning an option item of each search condition item in accordance with embodiments of the present invention. The flowchart is performed when search condition items such as "Photographer," "The Date of Photography," "Title," and "Memo" are assigned.

The flowchart is also performed when "Image ID" or "Photographic Condition" is added as search condition. To add "Image ID" as a search condition, the number of option items is entered in step S260, and the search condition name "Image ID" is entered in step S263. In step S264, the option items of "Image ID" such as "99041501", "99040403" and "98040203" are entered. The entering operation of the character such as "Image ID", "99041501", "99040403" and "98040203" is performed by pressing the channel button 43 of the remote controller 3, using "Character Code Table", and determined by pressing the conclusion button 47.

After the process of step S264 is performed, the number of search condition items and option items is entered, and the similar operation previously described is repeated, thereby search condition items being entered.

Thus, the present invention does not need the special remote controller for image storage 7 because the remote controller 3 for a television set is widely used in homes and can activate the image storage 7. Furthermore, even a person that is clumsy at handling a machine can operate it easily because operating procedures are displayed on the monitor.

It is desirable to display a thumbnail of the image that is searched according to the search condition items that are entered by the previously mentioned operation, and to add the thumbnail as the representative image to the "Listing of Album Titles", by adding a new step, where an arbitrary thumbnail among searched images is selected and stored, to the flowchart shown in FIG. 41 between step 250 and S257, because the album desired to view can be surely selected.

When the "Print Mode" menu is selected in "Mode Selection" page 50 shown in FIG. 33, the print mode process is performed. The print mode process is a process that outputs a desired print from the image storage 7. Although one embodiment of print output process is shown in step S207 to S212 in FIG. 34, the present embodiment having higher function will be described as follows. The explanation of the system configuration is omitted because the present embodiment has the same system configuration. The symbols used in the previous embodiment are also used in the present embodiment.

(a) Memory Contents of the Image Storage.

All image data taken by the digital camera are transferred and stored in the memory 7*f* of the image storage 7. Folder name, folder number, file name, or file number designated while being transferred and recorded, or being succeeded by the data given while taking picture, is attached to image data stored in the memory 7*f*. Each image data transferred and stored in the image storage 7 includes comments, for example, the date of photography or various memos attached while taking picture.

A print instruction signal indicating that an image is to be printed is attached to all image data while taking picture. The print instruction signal can be erased by operating the digital camera. Accordingly, in image data stored in the image storage, image data with the print instruction signal intermingle with image data without the print instruction signal.

(b) Selection of Print Image.

A desired print is designated by attaching a print instruction signal while taking picture with a digital camera, or by adding the print instruction signal to a selected and displayed image obtained by album mode processing in the print mode. Further in the print mode, a print condition for attaching comments to a print image or designating trimming may be set up, if necessary. Attaching comments, designating trimming, and adding, deleting and changing print instruction signal are described later in detail.

Attaching comments, designating trimming and processing regarding setting up print instruction signal may be performed in the album mode.

(c) Print.

Print mode will be described in detail by means of a flow chart shown in FIG. 43. The flow chart shows processing performed by the CPU 7*e* that is controller of the image storage 7.

Figure 44:
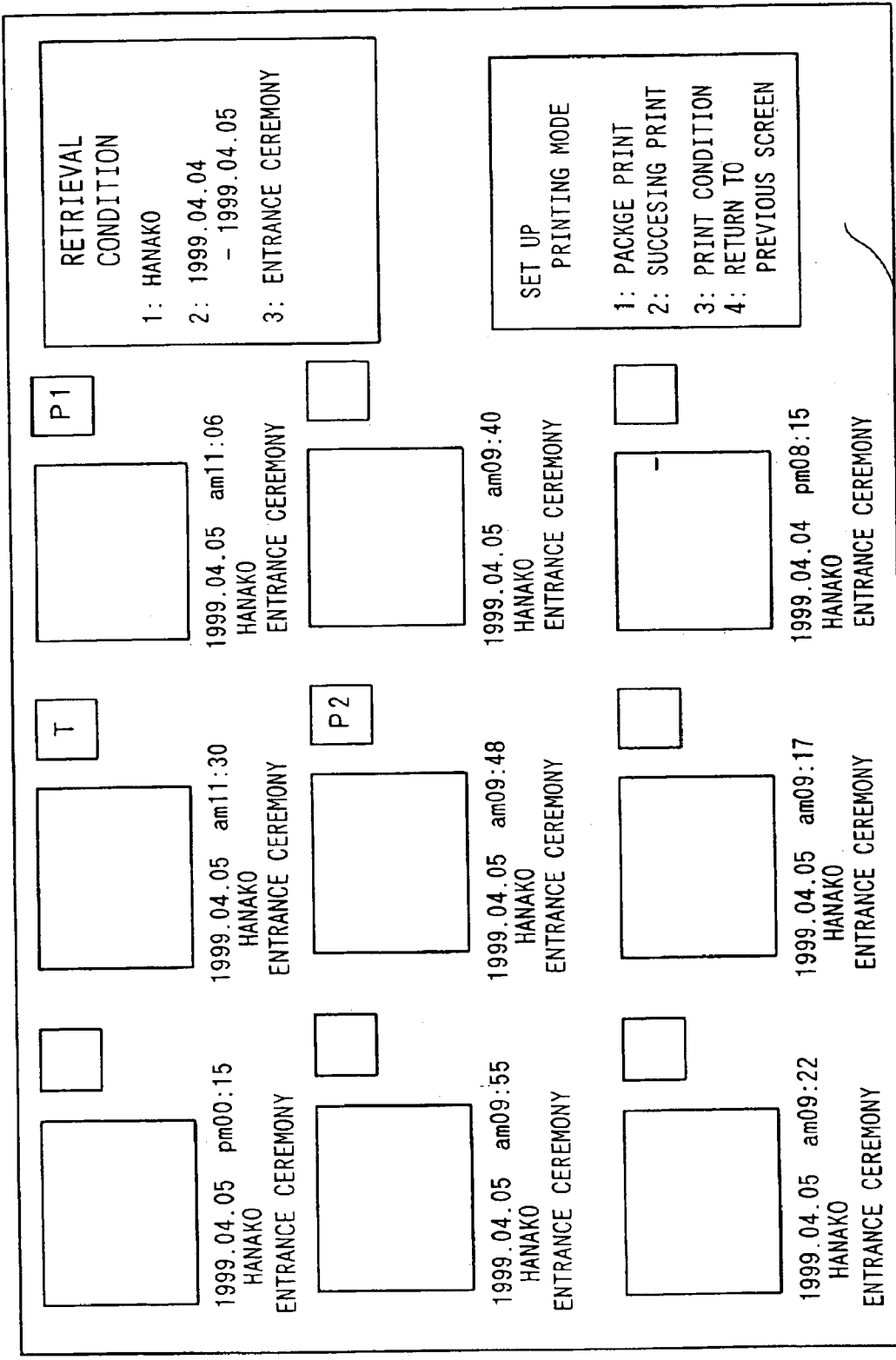
FIG. 44 is an exemplary print mode process menu displayed on the monitor of Second Embodiment.

When print mode starts, the image storage 7 displays print menu 54 shown in FIG. 44 on the monitor 2 superimposing on a current displaying image (S311). In FIG. 44, although it is described an example that when previous mode is the album mode, print menu is superimposed on thumbnail pictures, when previous mode is TV mode, it is superimposed on TV image.

Print menu 54 includes "successive print", "package print" and "setting up print condition". In step 312, processing flow is controlled in accordance with selected menu.

When successive print is selected, flow goes to S313, an image to be printed is selected by album mode function described before, the image is displayed on the monitor 2, and, at the same time, a menu indicating start printing is superimposed on it (S314). Here, it is possible to perform interruption processing to displayed image such as designating trimming (S315), attaching comments (S316), or setting up print condition (S317), if necessary. Each interruption processing will be described later. Above described steps S313 and S314 surrounded by dotted line are album mode function described before. Print starts by pushing down the conclusion button 47 (S318), displayed image on the monitor 2 is printed (S319), the next image is selected (S320), and flow returns to step S313.

When package print is selected in step S312, flow goes to step S321, and a folder including an image to be printed is selected by album mode function. The folder is selected by folder name searched and designated, or by specific image searched. When searched image is included in a plurality of files, image control information for the searched image is written temporarily in a folder automatically produced for printing. When above mentioned folder is produced, the folder is selected for print. Meanwhile, thumbnail pictures or selected images are suitably displayed by album mode function. Further, menu for starting package print is displayed in superimposing manner, flow goes to step S322 by pressing the conclusion button 47, and package print starts.

In package print, all images attached with print instruction signal in the selected folder are printed sequentially with the designated number of print. In step S323, processing flow is controlled in accordance with a mode (previous mode) selected by pushing the selection button 45 of the remote controller 3.

When previous mode is TV mode, flow goes to step S331, and TV mode processing is performed. That is, ordinary TV processing is performed and, at the same time, printing is continued in hidden mode (S332). Then, a signal indicating progress of printing (remaining number of print) or finished printing is displayed on the monitor 2 by interruption (S333). Then, flow goes back to step S311 continuing TV mode processing.

When previous mode is the album mode, flow goes to step S324, and an image under printing is displayed. At a same time, progress of printing is displayed in superimposing manner (S325). When all printing has been completed (S326), "package print completed" is displayed (S327), and the processing is terminated.

Or, in step S324, only images attached with print instruction signal in selected folder are displayed in thumbnail pictures, and progress of printing S325 may be displayed by finished displaying thumbnail picture that is finished printing.

Figure 45:
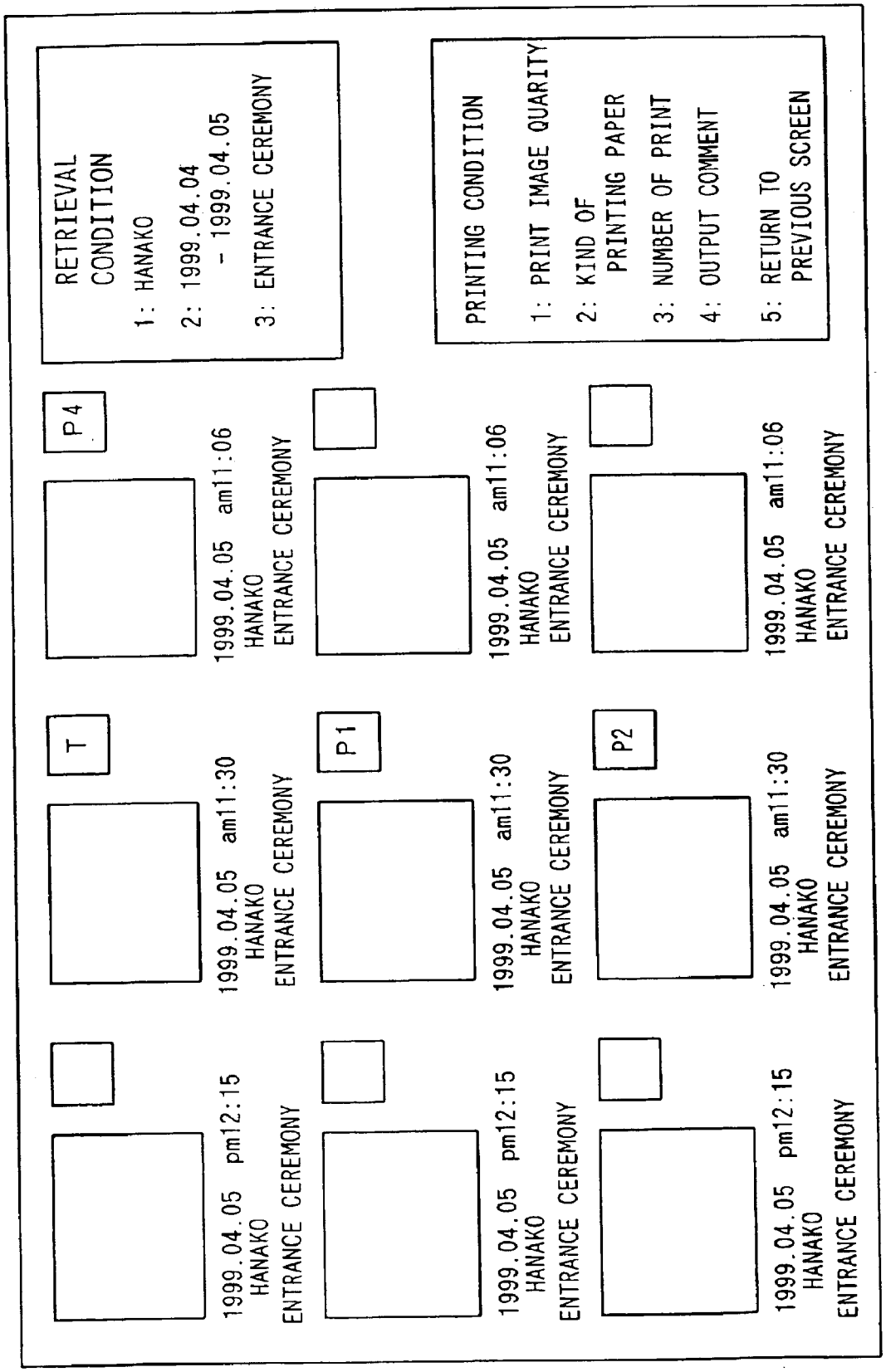
FIG. 45 is an exemplary print condition menu displayed on the monitor of Second Embodiment.

When setting up print condition is selected in step S312, flow goes to step S341, menu for setting up print condition shown in FIG. 45 is displayed on the monitor 2 in superimposing manner. Print condition such as print image quality, a kind of printing paper, the number of print, need to output comment or not, setting up comment, is input and set up by suitably selecting menu. Then, flow goes back to step S311, and print menu is displayed again for further selection. After this, package print is performed under settled print condition. Successive print also performed under settled print condition unless different condition is set in step S317. Although the interruption processing of S317 for setting up print condition is similar to S341, various print condition set in this step is only effective in next print, and print condition is returned to previous setting after finished printing. By the way, a condition thought to be most general is being set to each item by default.

(d) TV Mode Processing.

Figure 46:
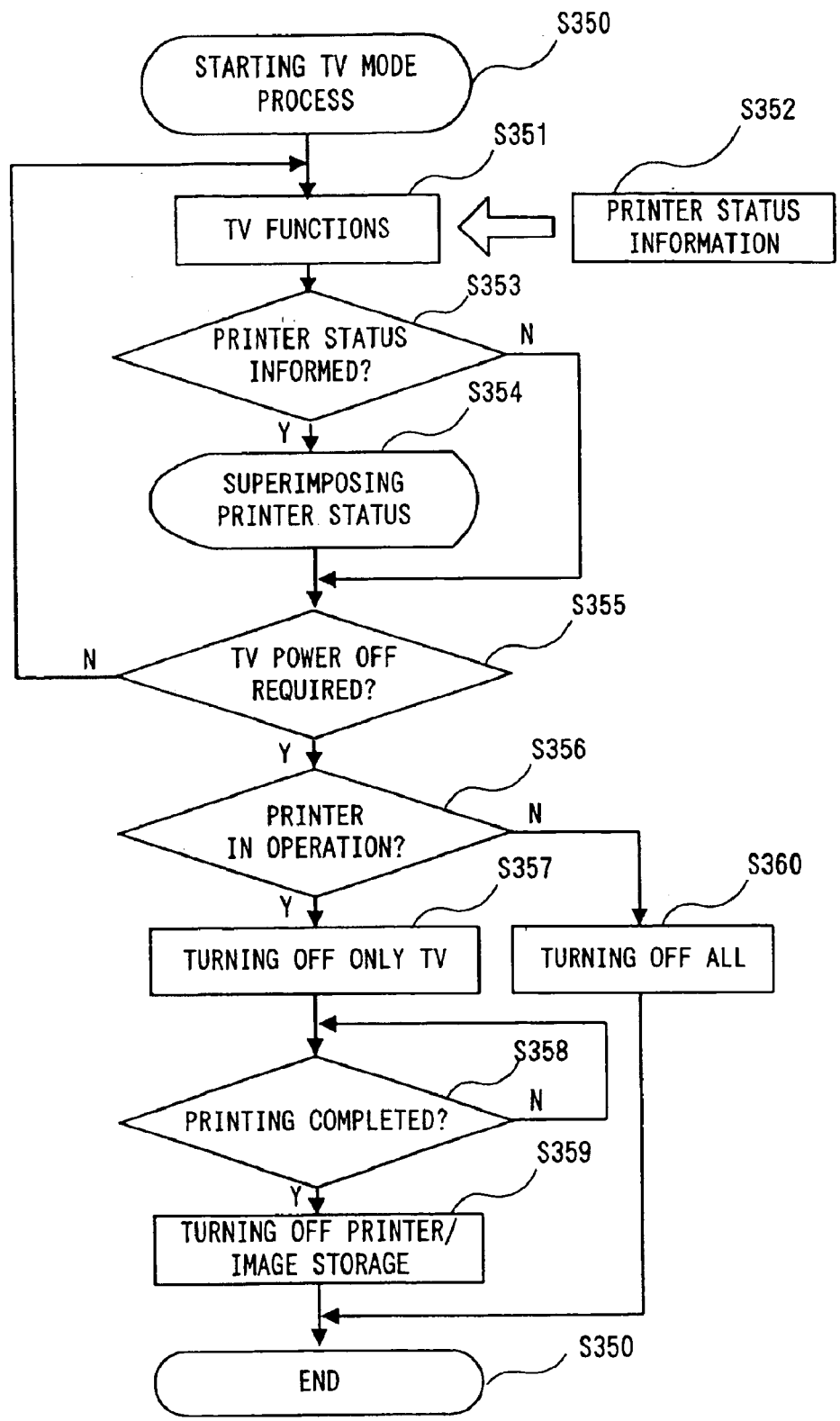
FIG. 46 is an exemplary flowchart showing the operation of television mode process of Second Embodiment.

TV mode processing in step S331 is a similar processing to that in step S303, which makes it possible to watch TV while performing package print. This processing is performed by the CPU 1h of the main body 1. TV mode processing is described below with the help of flow chart shown in FIG. 46.

Figure 43:
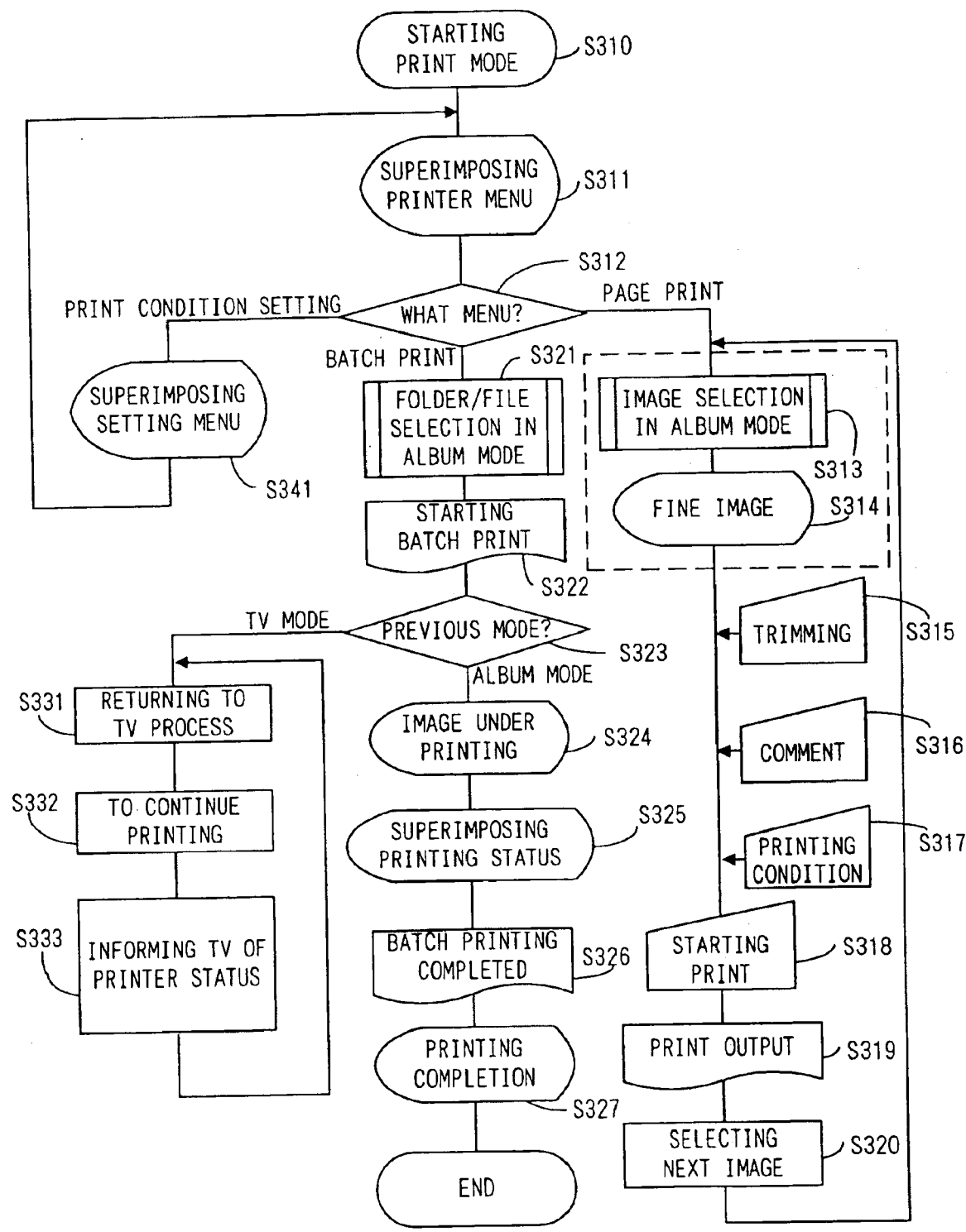
FIG. 43 is an exemplary flowchart showing the operation of print mode process of Second Embodiment.

When TV mode processing starts, the main body 1 receives ordinary TV broadcasting in step S351, and, in step S353, judges whether an interruption signal S352, which indicates progress in printing or finished printing from the CPU 7e of aforementioned the image storage 7 shown as S333 in FIG. 43, is happened or not. When the interruption signal S352 is not happened, flow goes to step S355. When the interruption signal S352 is happened, flow goes to step S354, and progress in printing or finished printing received from the CPU 7e of the image storage 7 is displayed on the monitor 2 in superimposing manner for predetermined time, and, then, flow goes to step S355. In step S355, the CPU 1h detects whether power supply to the main body 1 is turned off or not. When power supply is not turned off, flow goes back to step S351, and TV broadcasting is continued receiving.

When it is detected in step S355 that power supply to the main body 1 is turned off, flow goes to step S356, and whether package print is going on in hidden mode or not is detected. When package print is not going on, flow goes to step S360, power supply to the main body 1, the image storage 7, and the printer 9 is turned off, and, then, processing is terminated. When package print is going on, flow goes to step S357, and power supply to the TV receiver circuit of the main body 1 and the monitor 2 is turned off. Since power supply to the image storage 7 and the printer 9 is not turned off, package print is continued until finished printing is detected in step S358, and signal of progress in printing or finished printing is transmitted to the main body 1 for interruption. When finished printing signal is detected in step S358, flow goes to step S359, power supply to the image storage 7 and the printer 9 is turned off, power supply to the rest of the main body 1 is turned off, and, then, processing is terminated.

By the way, it may be possible to construct such that processing on and after step S356 is mainly performed by the CPU of the image storage 7 to perform same effect as described above by outputting required signal to the main body 1 or the printer if necessary.

When power supply to the TV receiver circuit of the main body 1 is turned off in step S357, the main body 1 records that the processing after step S357 has been performed. When power supply to the main body 1 is turned on next time, a comment that print exists in the printer is displayed. At that time, whether the printer 9 is working or stopping (including power off) is detected. It is desirable to display progress in printing when working, or display "finished printing" when stopping.

Further, the printer may produce electric or acoustic noise during operation, which is liable to disturb watching TV. Therefore, it may be constructed such that when TV mode is started, printing is interrupted and only receiving TV broadcasting is performed in order to be able to watch TV without difficulty, and when power supply to the main body 1 is turned off, or when other than TV mode is selected, TV mode processing is restarted.

In addition, the CPU 1h of the main body 1 may be modified to transmit a control signal to the image storage 4 for making it inoperative when the main body 1 is changed into TV mode.

(e) Processing for Print Instruction Signal.

Selection or designation of image to be printed can be performed by the digital camera as well as by the album mode. That is, image selection in the album mode (S313) and folder selection in the album mode (S321) shown in FIG. 32 include function for selecting image to be printed.

For example, when thumbnail pictures within a scope of desired image data, for example, images in specific folder or images designated by date of photography designated in image selection function for watching are displayed (as shown in FIG. 36), print selection mark P1 (32 in FIG. 36) is displayed simultaneously with the right side of the image (31 in FIG. 36) on which print instruction signal has already been attached by the digital camera. Print selection mark is not attached to the image (33 in FIG. 36) on which print instruction signal is not attached.

As described above, since print instruction signal is automatically attached when taking picture, print instruction signal is attached to the image read in from the digital camera unless print instruction signal is deleted by operating the digital camera. Thereby operation procedure for printing in print mode is simplified.

Print selection mark P1 is displayed simultaneously with any one image selected and displayed from thumbnail pictures by image selection function. The number following the letter "P" of print selection mark denotes the number of prints to be printed. Print selection mark P1 attached by the digital camera denotes one print.

The image storage 7 can attach, change or delete print selection mark to an image displayed on thumbnail pictures by operating the remote controller 3 (in FIG. 31). Specifically, a target image is selected and displayed, and the number following the letter "P" can be increased or decreased by pushing down up button 42A or down button 42B of the volume button 42 of the remote controller 3. In FIG. 36, print selection mark P2 (35) changed by above-mentioned operation is displayed beside image 34, which denotes that the number of pint is two. When the number of print is zero, print instruction signal is deleted and print selection mark is disappeared. If the up button 42A is pushed down while print selection mark is not displayed, then print selection mark P1 appears.

(f) Trimming.

Trimming can be designated to an image displayed in the album mode by using zooming function. Zooming function is activated by pushing down the channel button 43 while an image is displayed. Zooming up or down is performed by pushing down "+" button 43A or "−" button 43B of the channel button 43 respectively. The range of the zoomed image displayed on the monitor 2 becomes the range of printing. When the conclusion button 47 is pushed down while zoomed image is displayed, range of trimming and magnification is added to the image data.

When the image with this information is displayed, a mark T (36 in FIG. 36) indicating that trimming condition is recorded is displayed right side of the image. When images are displayed in due order by pushing the selection button 46, trimming image formed by trimming condition added to the image is displayed after the original image. Therefore, the same trimming image can be printed out in the future. Further, since forming the trimming image is started while displaying original image, apparent time for displaying the trimming image can be short. Since additional recording data to the memory 7f of the image storage 7 for trimming is only trimming condition, data amount for additional recording is small in comparison with recording trimming image.

(g) Output Comment.

Figure 47:
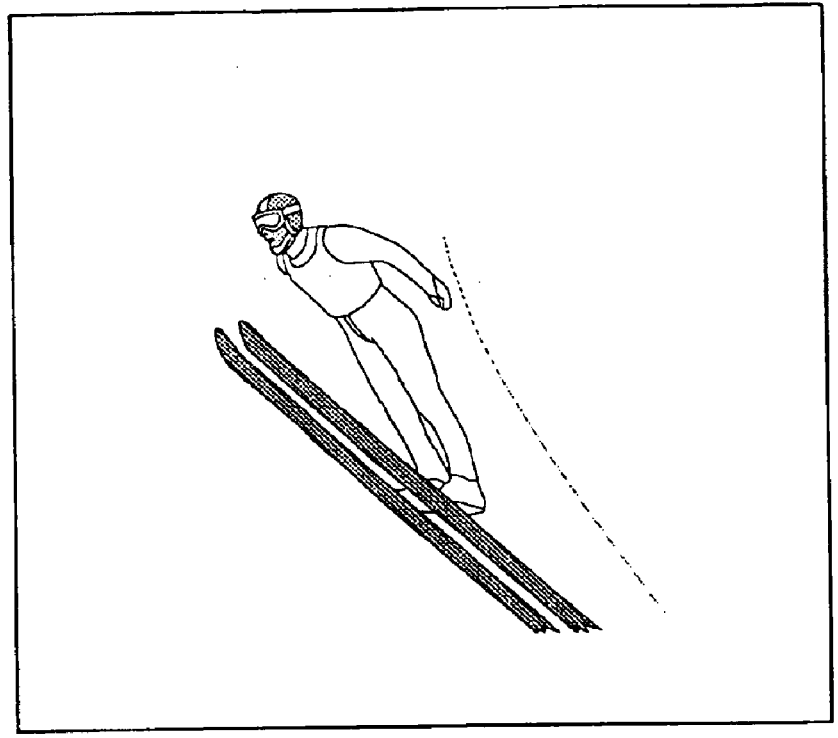
FIG. 47 is an example of the display of a print output of Second Embodiment.

In step S341 for setting up print condition, when comments A and B are set up and "request for outputting comment" is selected, comment attached to the image is printed outside the range of image as shown in FIG. 47. In this case, comment is displayed adjacent to the image in a comment display 62 arranged under an image display area 61 of the image 60 displayed in the album mode. As for the comment, there are a comment A such as date of photography attached at the time of taking picture and a comment B added by using the remote controller 3 in the album mode. These comments A and B can be revised.

If comment A attached at the time of taking picture exists, the comment is displayed in the comment display 62 of the image 60. Then, a cursor is moved to the position for comment B, and additional comment B can be input at the position by using the remote controller 3. Displayed comment can be revised in a overwrite manner by moving a cursor to arbitrary position of the displayed comment, and inputting revised comment.

Furthermore, since comment B added in step S341 for setting up print condition is attached to all prints printed after the setting up, it is convenient to attach same comment. On the other hand, since a comment B attached in step of input print condition (S317) of successive print is effective only in the particular image, it is convenient to attach different comment to each image.

By the way, comment input function (S316) while setting up print condition (S317) can be activated by operating comment input described above by using the numeral button 48 of the remote controller 3 while watching image.

Third Embodiment.

Figure 48:
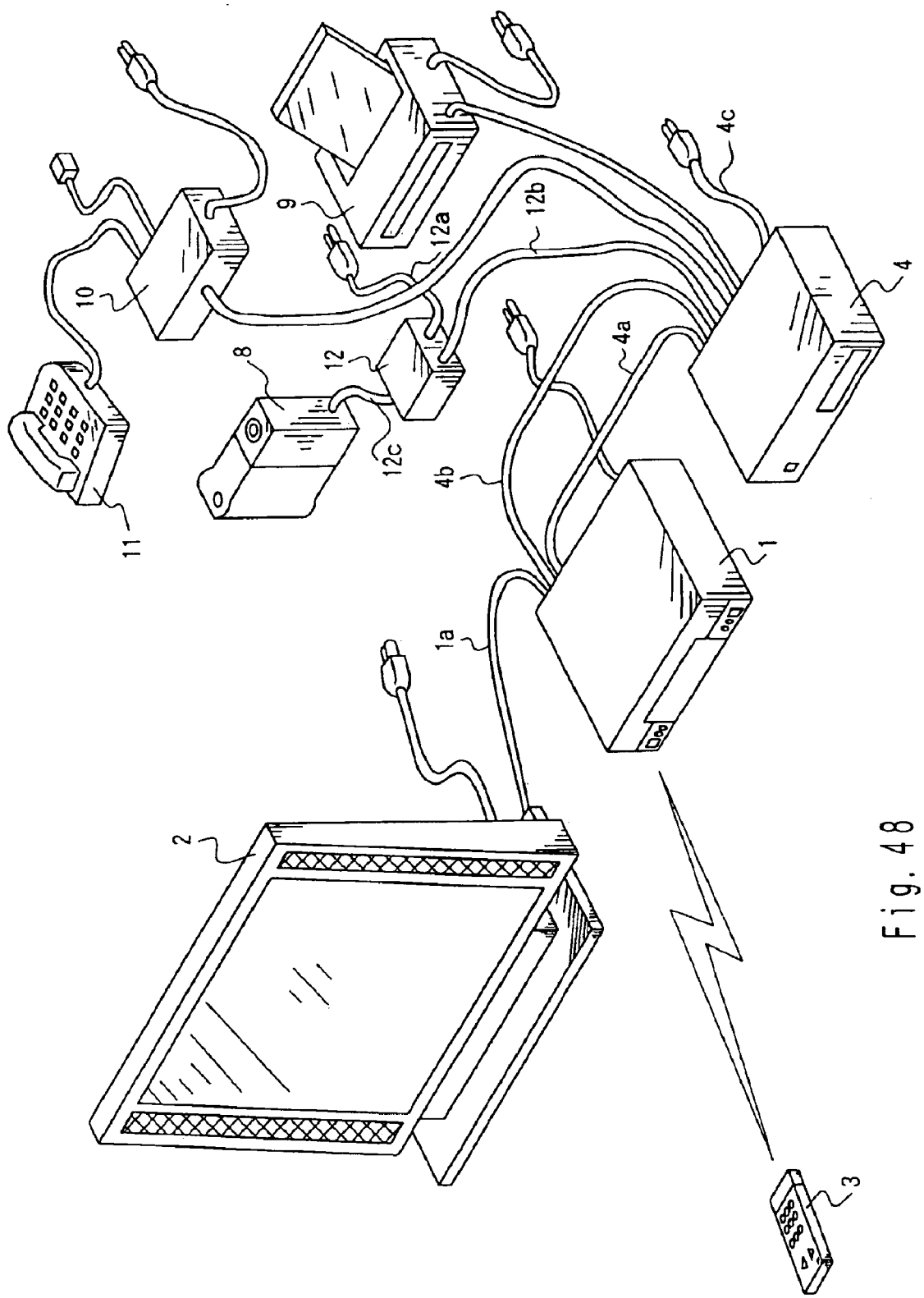
FIG. 48 is an exemplary perspective view of the system design of Third Embodiment.

FIG. 48 is a perspective view of Third Embodiment of the present invention and the configuration of an image storage 4 is the same as that of First Embodiment of FIG. 1. On the other hand, the digital camera 8 is the same as that of Second Embodiment of FIG. 29.

The characteristic of Third Embodiment of FIG. 48 is represented by a complex battery charger 12. A cable 12b connecting complex battery charger 12 and the image storage 4 is of the IEEE 1394 standard and is same as the cable 5a of FIG. 1. On the other hand, a cable 12c connecting complex battery charger 12 and the digital camera 8 is a dedicated standard cable that includes a power supply cable and a signal transmission channel like the cable 8a of FIG. 29. A cable 12a for common power source is the same as the cable 5a of FIG. 1. Since other configuration of the present embodiment is quite similar to that of First Embodiment of FIG. 1, the explanation is omitted.

Figure 49:
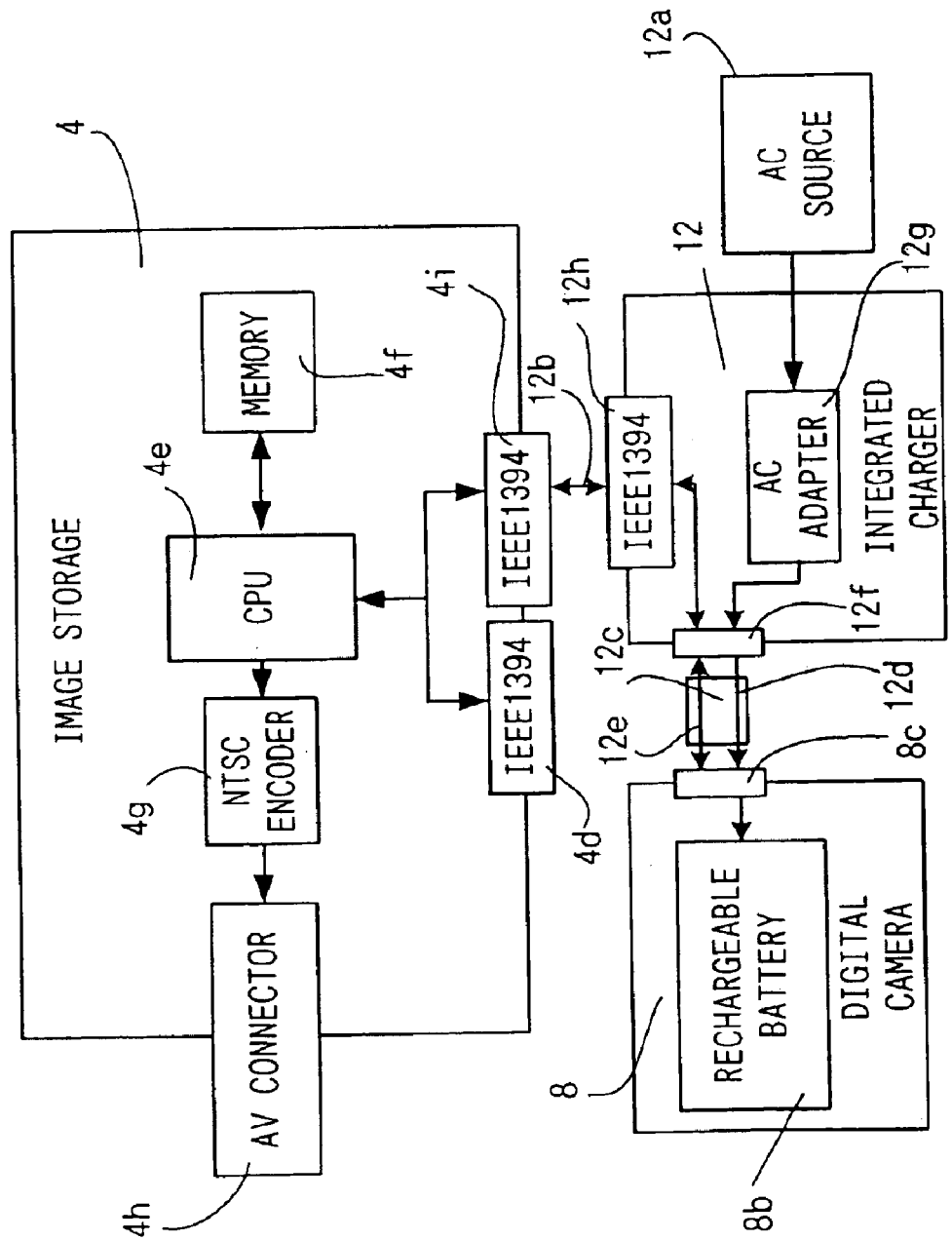
FIG. 49 is an exemplary schematic diagram of system configuration of Third Embodiment.

FIG. 49 is a schematic diagram of the system design for Third Embodiment. In the complex battery charger 12, the cable 12c that includes a recharge cable 12d and a signal transmission channel 12e in conformity with the IEEE 1394 combined in one is connected with a connecting terminal 8c. To cope with this, the complex battery charger 12 has a connecting terminal 12f in which a signal connector in conformity with the IEEE 1394 and a power supply connector are combined in one. The power supply connector of the connecting terminal 12f is connected with an AC adapter 12g and at the same time, the signal connector is connected with an IEEE 1394 terminal 12h. With the IEEE 1394 terminal 12h, the cable 12b of the IEEE 1394 standard is connected. A common power source is supplied to the AC adapter 12g by way of the cable 12a.

In Third Embodiment, complex battery charger 12 is the exclusive accessory for the digital camera 8 and the AC adapter 12g supplies the specific voltage with the digital camera 8. With a different digital camera 8, a different complex battery charger 12 with different voltage is to be supplied to cope with this. Thus, the image storage 4 can be for general-purpose use. The complex battery charger 12 does not need particularly big cost increase since it is formed by only adding to an ordinary battery charger IEEE 1394 terminal to connect with the image storage 4, and, preparing the connecting terminal combining the power supply connector and the signal connector to connect the digital camera 8, and, only wiring them.

Fourth Embodiment.

Figure 50:
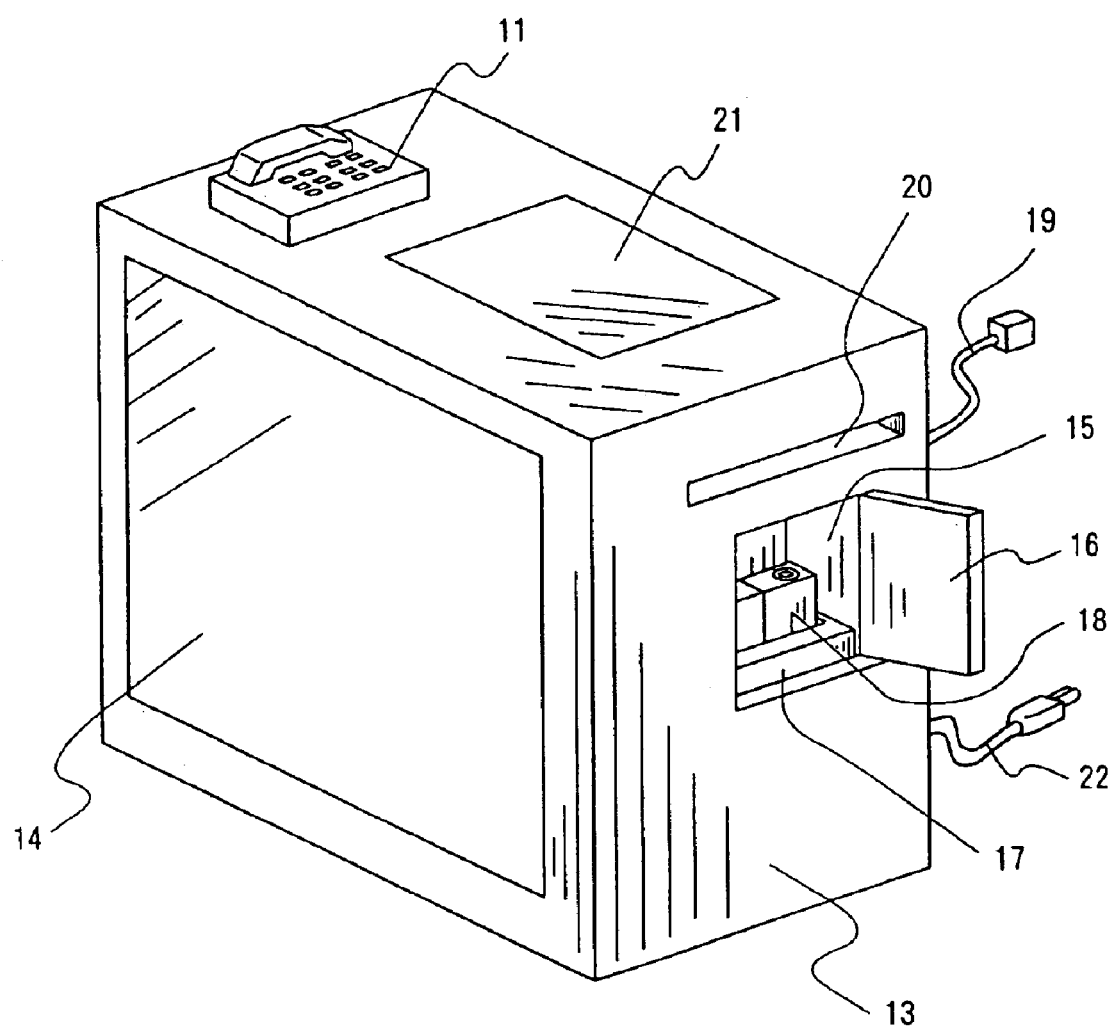
FIG. 50 is an exemplary perspective view of the system of Fourth Embodiment.

FIG. 50 is a perspective view of Fourth Embodiment of the present invention. In this embodiment, each function of First Embodiment of FIG. 1 is integrated in one television set. To illustrate the detail of that in relation with FIG. 1, the main body 1 and the monitor 2 are separate in First Embodiment, but in Fourth Embodiment of FIG. 50, they are configured as an ordinary television set. The main body 1 including a tuner is housed in a case 13 together with a monitor 14. Other functions corresponding to the image storage 4 in First Embodiment are also incorporated in the case 13.

Since in Fourth Embodiment, the main body 1 and functions corresponding to the image storage 4 in First Embodiment are integrated in one as an ordinary television set, it is possible to memorize a program to control the main body 1 as well as image data in a large capacity memory 4f consisting of a hard disc for the image storage 4.

A storage space 15 is for a digital camera 18, and when a door 16 is closed, the digital camera stored is shut tight and is made dust-proof. The storage space 15 is located at the place least affected by the heat and the electromagnetic wave emitted form television set and walls of the storage space may be made heat-resistant and anti-electromagnetic-wave structure as occasion demands.

A docking station 17 in FIG. 50 corresponds to the docking station 5 in FIG. 1 and is exclusively for the digital camera 18 and is interchangeable in accordance with the type of the digital camera. The docking station 17 has standardized a power supply connector and a signal connector, and when it is fixed to the bottom of the storage space 15, these connectors are connected with corresponding connectors of the main body 1. The storage space 15 has enough space so as to cope with various types of cameras and docking stations, and only the connector between the docking station and its arrangement is standardized.

To illustrate the condition of use in Fourth Embodiment, the state that the desired docking station 17 is fixed to the storage space 15 is standby state, and the digital camera 18 is, for example, used outdoors. When coming back home, only opening the door 16 and storing the digital camera 18 on the docking station 17 of the storage space 15 that is the usual storing place, and closing the door 16 finishes the basic procedure. In such using environment, first of all, there is no possibility of losing the digital camera, since it is stored in the fixed storage place all the time. Charge of battery and take-in of images are made automatically during being stored and the memory is emptied out. Therefore, at the time of next use, it won't be necessary to look for the camera and to worry about the power source and free memory space for picture taking. Besides, as pictures taken in the past are surely stored in the image storage of television set, there is no possibility of loosing negatives or prints, as in the case of silver-halide film camera. Required picture can be found without fail, by searching in the image storage with looking at the monitor 14. And, as the image storage is an electronic file, efficient searching method can be conducted.

In Fourth Embodiment of FIG. 50, printer function and communication function are also incorporated inside case 13. A modular jack 19 is for coping with communication inside television set and also for connecting to the telephone 11. The system also includes a printer paper discharge slot 20 and the cover 21 for printer paper supply. Common power source is supplied by way of a cable 22 for all such functions of television set.

Details of functions and operation in Fourth Embodiment of FIG. 50 are basically the same as those in other Embodiments of the present invention, and they are operated by means of a remote controller.

In Fourth Embodiment, a card slot corresponding to the card slot 4s of First Embodiment is prepared in the position not seen in FIG. 50, digital still image can also be input from a card memory inserted in this card slot, apart from by storing the digital camera 18.

Fifth Embodiment.

Another Fifth Embodiment of the present invention will be described below.

Although an image storage and a printer are separate in First Embodiment to Fourth Embodiment, they are combined in one in Fifth Embodiment. Other configurations are the same as those in other Embodiments.

Figure 51A:
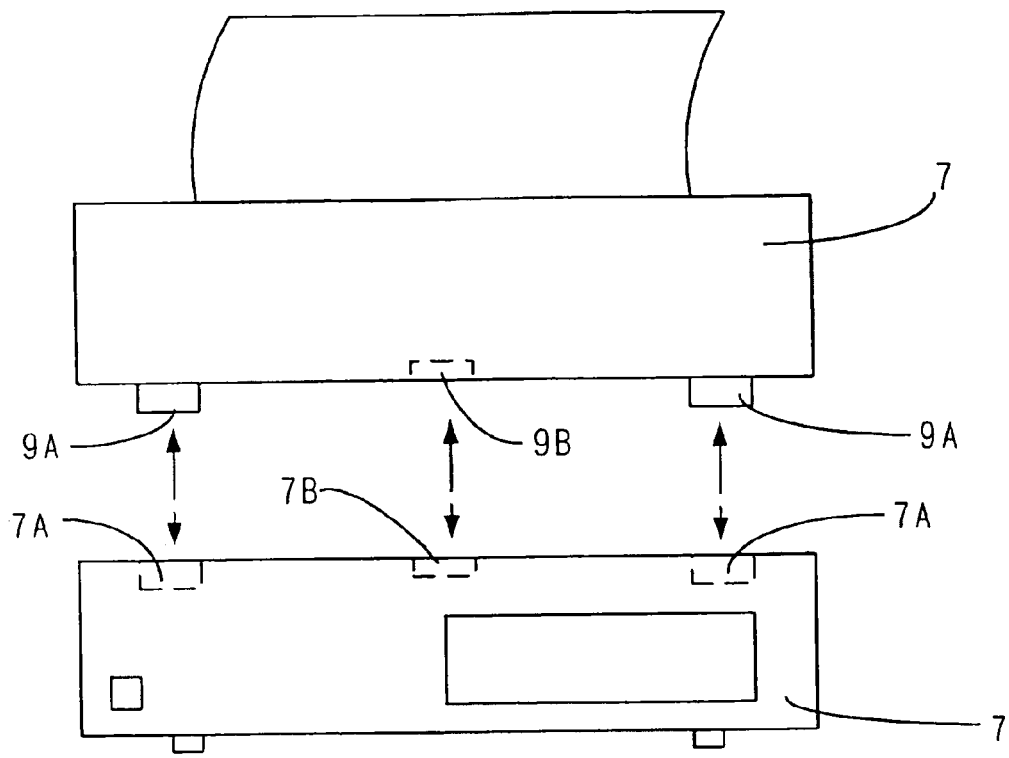
FIG. 51 is an exemplary diagram showing the configuration of the printer of Fifth Embodiment.
Figure 51B:
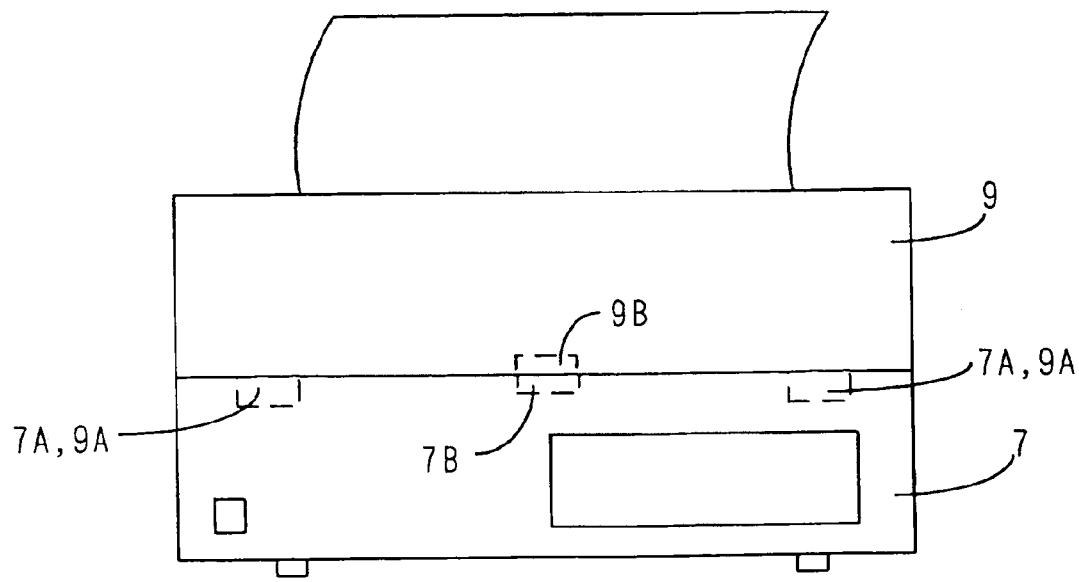

As shown in FIG. 51(a), the printer 9 is formed as a separate unit from the image storage 7 and is mounted on the image storage 7. In the top cover of the image storage 7, alignment means as a hollow 7A is provided for engaging with projected parts 9A arranged in the bottom plate of the printer 9 in order to mount the printer steadily. Signal transmission means 7B and 9B such as a connector terminal and a photo coupler are provided in the top cover of the image storage 7 and bottom plate of the printer 9 to transmit image data and controlling signals between the storage 7 and the printer 9. Therefore, as shown in FIG. 51(b), print output can be ready if the printer 9 is just mounted on at the fixed position of the image storage 7.

Installation space can be saved since the image storage 7 and the printer 9 are integrated in one (vertically). As they can also be separated, when either of them is out of order, that part only can be repaired or exchanged.

According to the present invention, still images taken by a digital camera can be searched, viewed and printed as easily as with conventional silver-halide picture album and television broadcast can be watched as much as possible.

What is claimed is:

1. A digital camera comprising:
   an imaging portion that takes a picture of a subject and generates image data thereof;
   a first terminal that outputs signals based on the image data; and
   a second terminal arranged separately from the first terminal and that outputs signals based on the image data;
   wherein the first terminal outputs digital signals based on the image data in accordance with a data communication interface standard and the second terminal outputs digital signals based on the image data in accordance with the same data communication interface standard as in the first terminal, and the imaging portion, the first terminal and the second terminal are provided in a portable body of the digital camera.

2. The digital camera according to claim 1, wherein the first terminal is connectable with an external storage.

3. The digital camera according to claim 2, wherein the second terminal is connectable with an adapter to relay the signals based on the image data from the digital camera to the external storage.

4. The digital camera according to claim 3, wherein the adapter is connected with the digital camera by putting the digital camera on the adapter.

5. The digital camera according to claim 1, further comprising a third terminal for outputting the signals based on the image data as analog video signals.

6. The digital camera according to claim 1, wherein the digital camera is directly connectable to a printer.

7. The digital camera according to claim 1, wherein the second terminal has a structure different from a structure of the first terminal.

8. A digital camera comprising:

an imaging portion that takes a picture of a subject and generates image data thereof;

a first terminal that outputs signals based on the image data; and a second terminal arranged separately from the first terminal and that outputs signals based on the image data;

wherein the first terminal outputs digital signals based on the image data in accordance with a data communication interface standard and the second terminal outputs digital signals based on the image data in accordance with the same data communication interface standard as in the first terminal, and wherein the second terminal is connected with a docking station to relay the signals based on the image data from the digital camera to an external storage.

9. The digital camera according to claim 8, wherein the docking station is connected with the digital camera by putting the digital camera on the docking station.

10. The digital camera according to claim 8, wherein the second terminal has a structure different from a structure of the first terminal.

* * * * *

UNITED STATES PATENT AND TRADEMARK OFFICE
CERTIFICATE OF CORRECTION

PATENT NO. : 7,062,576 B2
APPLICATION NO. : 10/957591
DATED : June 13, 2006
INVENTOR(S) : Akira Ohmura et al.

It is certified that error appears in the above-identified patent and that said Letters Patent is hereby corrected as shown below:

On the Title Page,

Item (75) should read:

(75) Inventors: Akira Ohmura, Tokyo (JP)

Signed and Sealed this

Fourth Day of December, 2007

JON W. DUDAS
*Director of the United States Patent and Trademark Office*